(12) United States Patent
Glazer et al.

(10) Patent No.: US 12,496,357 B2
(45) Date of Patent: Dec. 16, 2025

(54) COMPOSITIONS AND METHODS FOR TREATING SICKLE CELL DISEASE

(71) Applicant: Yale University, New Haven, CT (US)

(72) Inventors: Peter Glazer, Guilford, CT (US); Elias Quijano, Durham, CT (US); W. Mark Saltzman, New Haven, CT (US); Hee Won Suh, New Haven, CT (US)

(73) Assignee: Yale University, New Haven, CT (US)

( * ) Notice: Subject to any disclaimer, the term of this patent is extended or adjusted under 35 U.S.C. 154(b) by 684 days.

(21) Appl. No.: 17/631,661

(22) PCT Filed: Jul. 31, 2020

(86) PCT No.: PCT/US2020/044506
§ 371 (c)(1),
(2) Date: Jan. 31, 2022

(87) PCT Pub. No.: WO2021/022161
PCT Pub. Date: Feb. 4, 2021

(65) Prior Publication Data
US 2022/0280656 A1 Sep. 8, 2022

Related U.S. Application Data

(60) Provisional application No. 62/881,170, filed on Jul. 31, 2019.

(51) Int. Cl.
| | | |
|---|---|---|
| *C07H 21/02* | (2006.01) | |
| *A61K 9/51* | (2006.01) | |
| *A61K 48/00* | (2006.01) | |
| *C12N 15/113* | (2010.01) | |

(52) U.S. Cl.
CPC ........ *A61K 48/0066* (2013.01); *A61K 9/5146* (2013.01); *A61K 9/5153* (2013.01); *A61K 48/0033* (2013.01); *C12N 15/113* (2013.01); *C12N 2310/15* (2013.01); *C12N 2310/152* (2013.01); *C12N 2310/3181* (2013.01)

(58) Field of Classification Search
CPC ................ C12N 2310/15; C12N 2310/3181
See application file for complete search history.

(56) References Cited

U.S. PATENT DOCUMENTS

| | | |
|---|---|---|
| 3,832,253 A | 8/1974 | Palma |
| 3,854,480 A | 12/1974 | Zaffaroni |
| 4,452,775 A | 6/1984 | Kent |
| 4,667,013 A | 5/1987 | Reichle |
| 4,675,189 A | 6/1987 | Kent |
| 4,714,680 A | 12/1987 | Civin |
| 4,748,034 A | 5/1988 | Rham |
| 4,883,666 A | 11/1989 | Sabel |
| 4,965,204 A | 10/1990 | Civin |
| 5,034,506 A | 7/1991 | Summerton |
| 5,061,620 A | 10/1991 | Tsukamoto |
| 5,075,109 A | 12/1991 | Tice |
| 5,114,719 A | 5/1992 | Sabel |
| 5,133,974 A | 7/1992 | Paradissis |
| 5,239,660 A | 8/1993 | Ooi |
| 5,407,686 A | 4/1995 | Patel |
| 5,422,251 A | 6/1995 | Fresco |
| 5,527,675 A | 6/1996 | Coull |
| 5,539,082 A | 7/1996 | Nielsen |
| 5,601,835 A | 2/1997 | Sabel |
| 5,623,049 A | 4/1997 | Lobberding |
| 5,643,741 A | 7/1997 | Tsukamoto |
| 5,677,136 A | 10/1997 | Simmons |
| 5,698,546 A | 12/1997 | Bridger |
| 5,714,331 A | 2/1998 | Buchardt |
| 5,716,827 A | 2/1998 | Tsukamoto |
| 5,736,152 A | 4/1998 | Dunn |
| 5,736,336 A | 4/1998 | Buchardt |
| 5,750,397 A | 5/1998 | Tsukamoto |
| 5,759,793 A | 6/1998 | Schwartz |
| 5,773,571 A | 6/1998 | Nielsen |
| 5,786,571 A | 7/1998 | Bethel |
| 5,945,337 A | 8/1999 | Brown |
| 5,962,426 A | 10/1999 | Glazer |
| 6,261,841 B1 | 7/2001 | Cohen |

(Continued)

FOREIGN PATENT DOCUMENTS

| | | | |
|---|---|---|---|
| EP | 3388517 | 10/2018 | |
| EP | 3388517 A1 * | 10/2018 | ........... A61K 31/165 |

(Continued)

OTHER PUBLICATIONS

Abes, et al., "Endosome trapping limits the efficiency of splicing correction by PNA-oligolysine conjugates", J. Controll. Rel., 110:595-604 (2006).
Agata, et al., "Expression of the PD-1 antigen on the surface of stimulated mouse T and B lymphocytes", Int. Immunol., 8:765-772 (1996).
Aguado and Lambert, "Controlled-release vaccines—biodegradable polylactide/polyglycolide (PL/PG) microspheres as antigen vehicles", Immunobiology, 184(2-3):113-25 (1992).
Aiuti, et al., "Gene therapy for immunodeficiency due to adenosine deaminase deficiency", N Engl J Med., 360(5):447-458 (2009).
Akinc, et al., "Synthesis of poly(beta-amino ester)s optimized for highly effective gene delivery", Bioconjugate chemistry, 14(5):979-988 (2003).

(Continued)

*Primary Examiner* — Amy Rose Hudson
(74) *Attorney, Agent, or Firm* — Pabst Patent Group LLP

(57) ABSTRACT

Peptide nucleic acid (PNA) oligomers that target the β-globin gene and can increase the frequency of recombination of donor oligonucleotide at the site of a Sickle Cell Disease mutation are provided. Nanoparticle formulations for delivering the PNA oligomers and donor oligonucleotides, and potentiating agents for increase the frequency of recombination of the donor oligonucleotide are also provided. Methods of using the PNA oligomers, donor oligonucleotides, nanoparticles, and potentiating agents for treating Sickle Cell Disease are also provided.

19 Claims, 16 Drawing Sheets

Specification includes a Sequence Listing.

(56) References Cited

U.S. PATENT DOCUMENTS

| | | | |
|---|---|---|---|
| 6,303,376 | B1 | 10/2001 | Glazer |
| 6,326,479 | B1 | 12/2001 | Gildea |
| 6,441,130 | B1 | 8/2002 | Egholm |
| 6,509,323 | B1 | 1/2003 | Davis |
| 6,919,208 | B2 | 7/2005 | Levy |
| 7,078,389 | B2 | 7/2006 | Glazer |
| 7,279,463 | B2 | 10/2007 | Glazer |
| 7,534,448 | B2 | 5/2009 | Saltzman |
| 7,534,449 | B2 | 5/2009 | Saltzman |
| 7,550,154 | B2 | 6/2009 | Saltzman |
| 8,083,088 | B1 | 12/2011 | Thompson |
| 8,658,608 | B2 | 2/2014 | Glazer |
| 8,889,117 | B2 | 11/2014 | Mellman |
| 9,193,758 | B2 | 11/2015 | Ly |
| 9,272,043 | B2 | 3/2016 | Saltzman |
| 11,136,597 | B2 | 10/2021 | Saltzman et al. |
| 2003/0148352 | A1 | 8/2003 | Glazer |
| 2003/0232768 | A1 | 12/2003 | Glazer |
| 2007/0219122 | A1 | 9/2007 | Glazer |
| 2008/0050920 | A1 | 2/2008 | Kawahara |
| 2009/0239789 | A1 | 9/2009 | Saltzman |
| 2009/0269397 | A1 | 10/2009 | Saltzman |
| 2010/0151436 | A1 | 6/2010 | Fong |
| 2010/0172882 | A1 | 7/2010 | Glazer |
| 2011/0008451 | A1 | 1/2011 | Saltzman |
| 2011/0086905 | A1 | 4/2011 | Glazer |
| 2011/0262406 | A1 | 10/2011 | Campo |
| 2011/0268810 | A1 | 11/2011 | Saltzman |
| 2011/0293585 | A1 | 12/2011 | Del Campo |
| 2014/0073041 | A1 | 3/2014 | Kijima |
| 2014/0128570 | A1 | 5/2014 | Ly et al. |
| 2014/0342003 | A1 | 11/2014 | Saltzman |
| 2015/0057505 | A1 | 2/2015 | Bangera |
| 2015/0073041 | A1 | 3/2015 | Saltzman |
| 2015/0118311 | A1 | 4/2015 | Zhou |
| 2015/0125384 | A1 | 5/2015 | Mellman |
| 2016/0251477 | A1 | 9/2016 | Cui |
| 2017/0000737 | A1 | 1/2017 | Deng |
| 2017/0266119 | A1 | 9/2017 | Deng |
| 2017/0283830 | A1 | 10/2017 | Saltzman |
| 2018/0177688 | A1 | 6/2018 | Deng |
| 2018/0256480 | A1 | 9/2018 | Deng |
| 2018/0344655 | A1 | 12/2018 | Saltzman |
| 2020/0113821 | A1 | 4/2020 | Saltzman |
| 2020/0308590 | A1 | 10/2020 | Glazer |
| 2022/0243211 | A1 | 8/2022 | Gupta |
| 2022/0280656 | A1 | 9/2022 | Glazer |
| 2022/0372474 | A1 | 11/2022 | Quijano |

FOREIGN PATENT DOCUMENTS

| | | | | |
|---|---|---|---|---|
| WO | 1993012096 | | 6/1993 | |
| WO | 1995001364 | | 1/1995 | |
| WO | 1996039195 | | 12/1996 | |
| WO | 1996040271 | | 12/1996 | |
| WO | 1996040898 | | 12/1996 | |
| WO | 2002010142 | | 2/2002 | |
| WO | 2003052071 | | 6/2003 | |
| WO | 2008086529 | | 7/2008 | |
| WO | 2010123983 | | 10/2010 | |
| WO | 2011053989 | | 5/2011 | |
| WO | 2011133802 | | 10/2011 | |
| WO | 2011133803 | | 10/2011 | |
| WO | 2013082529 | | 6/2013 | |
| WO | 2015172149 | | 11/2015 | |
| WO | 2015172153 | | 11/2015 | |
| WO | WO-2015172149 | A1 * | 11/2015 | ......... A61K 31/4178 |
| WO | 2016081621 | | 5/2016 | |
| WO | 2016183209 | | 11/2016 | |
| WO | 2016183217 | | 11/2016 | |
| WO | 2017143042 | | 8/2017 | |
| WO | 2017143061 | | 8/2017 | |
| WO | WO-2017143042 | A2 * | 8/2017 | ............. A47J 33/00 |
| WO | 2018187493 | | 10/2018 | |
| WO | WO-2018187493 | A1 * | 10/2018 | ............. A61K 38/18 |

OTHER PUBLICATIONS

Alton, et al., "A randomised, double-blind, placebo-controlled phase IIB clinical trial of repeated application of gene therapy in patients with cystic fibrosis", Thorax, 68(11):1075-7 (2013).

Alton, et al., "Repeated nebulisation of non-viral CFTR gene therapy in patients with cystic fibrosis: a randomised, double-blind, placebo-controlled, phase 2b trial", The Lancet Respiratory Medicine, 3(9):684-691 (2015).

Armitage, et al., "Analysis of PNA Hybridization by Surface Plasmon Resonance", Methods Mol Biol., 1050:159-65 (2014).

Armstrong, et al., "Gene therapy in cystic fibrosis", Arch Dis Child., 99(5):465-8 (2014).

Avitabile, et al., "[gamma] sulphate ONA (PNA S): Highly Selective DNA Binding Molecule Showing Promising Antigene Activity", PLOS One, 7(5): e35774 (2012).

Babar, et al., "Nanoparticle-based therapy in an in vivo microRNA-155 (miR-155)-dependent mouse model of lymphoma", PNAS, 109:E1695-E1704 (2012).

Bahal, et al., "In vivo correction of anaemia in β-thalassemic mice by γPNA-mediated gene editing with nanoparticle delivery", Nature Communications, 7:13304, 14 pages (2016).

Bentin et al., "Structural diversity of target-specific homopyrimidine peptide nucleic acid-dsDNA complexes", Nucl. Acids Res., 34(20): 5790-5799 (2006).

Bentin, et al., "Combined Triplex/Duplex Invasion of Double-Stranded DNA by Tail Clamp Peptide Nucleic Acid", Biochemistry, 42(47): 13987-13995 (2003).

Bertram, "Functionalized poly(lactic-co-glycolic acid) enhances drug delivery and provides chemical moieties for surface engineering while preserving biocompatibility", Acta Biomater. 5:2860-71 (2009).

Blanpain, et al., "Self-Renewal, Multipotency, and the Existence of Two Cell Populations within an Epithelial Stem Cell Niche", Cell, 118(5):635-48 (2004).

Braasch, et al., "Locked nucleic acid (LNA): fine-tuning the recognition of DNA and RNA", Chem. Biol., 8(1):1-7 (2001).

Braden, et al., "Polymeric nanoparticles for sustained down-regulation of annexin A2 lead to reduction in proliferation and migration of prostate cancer cells", Journal of Biomedical Nanotechnology 3:148-159 (2007).

Bramwell, et al., "Particulate delivery systems for biodefense subunit vaccines", Adv. Drug Deliv. Rev., 57(9):1247-65 (2005).

Bruscia, et al., "Assessment of cystic fibrosis transmembrane conductance regulator (CFTR) activity in CFTR-null mice after bone marrow transplantation", PNAS, 103(8):2965-2970 (2006).

Budke, et al., "RI-1: a chemical inhibitor of RAD51 that disrupts homologous recombination in human cells", Nucleic Acids Research, 40(15):7347-7357 (2012).

Burd, et al., "Fetal uptake of intra-amniotically delivered dendrimers in a mouse model of intrauterine inflammation and preterm birth", Nanomedicine: NBM, 10:1343-1351 (2014).

Cartier, et al., "Hematopoietic stem cell gene therapy with a lentiviral vector in X-linked adrenoleukodystrophy", Science, 326(5954):818-23 (2009).

Cheng, et al., "Enhanced siRNA delivery into cells by exploiting the synergy between targeting ligands and cell-penetrating peptides", Biomaterials, 32(26):6194-6203 (2011).

Chin, et al., "Correction of a splice-site mutation in the beta-globin gene stimulated by triplex-forming peptide nucleic acids", PNAS, 105(36):13514-13519 (2008).

Chung, et al., "Generation of AF508-CFTR T84 cell lines by CRISPR/Cas9-mediated genome editing", Biotechnol. Lett., 38(12):2023-2034 (2016).

Conner, et al., "Regulated portals of entry into the cell", Nature, 422(6927):37-44 (2003).

Crane, et al., "Targeted correction and restored function of the CFTR gene in cystic fibrosis induced pluripotent stem cells", Stem Cell Reports, 4(4):569-577 (2015).

Cruz, et al., "Targeted PLGA nano- but not microparticles specifically deliver antigen to human dendritic cells via DC-Sign in vitro", J. Control Release, 144:118-126 (2010).

(56) References Cited

OTHER PUBLICATIONS

Cu, et al., "In vivo distribution of surface-modified PLGA nanoparticles following intravaginal delivery", J Control Release, 156:258-264 (2011).
Cu, et al., "Ligand-modified gene carriers increased uptake in target cells but reduced DNA release and transfection efficiency", Nanomedicine, 6:334-343 (2010).
Cui, et al., "Ex vivo pretreatment of human vessels with siRNA nanoparticles provides protein silencing in endothelial cells", Nature Communications, 8(191):1-11 (2017).
David, et al., "Candidate Disease for Prenatel Gene Therapy", Method in Molecular Biology, 891:10-39 (2012).
Davis, "Cystic fibrosis since 1938", Am J Respir Crit Care Med., 173(5):475-482 (2006).
Davis, et al., "Cystic fibrosis", Pediatr Rev., 22(8):257-64 (2001).
Desai, et al., "The mechanism of uptake of biodegradable microparticles in Caco-2 cells is size dependent", Pharm. Res., 14(11):1568-73 (1997).
Dib, et al., "Laronidase for treating mucopolysaccharidosis type I", Genet. Mol. Res., 6(3):667-74 (2007).
Dragulescu-Andrasi, et al., "A simple gamma-backbone modification preorganizes peptide nucleic acid into a helical structure", Journal of the American Chemical Society, 128(31):10258-67 (2006).
Durland, et al., "Binding of triple helix forming oligonucleotides to sites in gene promoters", Biochemistry, 30(38):9246 (1991).
Egan, et al., "Calcium-pump inhibitors induce functional surface expression of ΔF508-CFTR protein in cystic fibrosis epithelial cells", Nature medicine, 8(5):485-492 (2002).
Egan, et al., "Curcumin, a major constituent of turmeric, corrects cystic fibrosis defects", Science, 304(5670):600-602 (2004).
Endoh, et al., "Cellular siRNA delivery using cell-penetrating peptides modified for endosomal escape", Adv Drug Deliv Rev., 61:704-9 (2009).
Fahmy, et al., "Surface modification of biodegradable polyesters with fatty acid conjugates for improved drug targeting", Biomaterials, 26(28):5727-5736 (2005).
Fanen, et al., "Genetics of cystic fibrosis: CFTR mutation classifications toward genotype-based CF therapies", Int J Biochem Cell Biol, 52:94-102 (2014).
Fields, et al., "Modified poly(lactic-co-glycolic acid) nanoparticles for enhanced cellular uptake and gene editing in the lung", Advanced Healthcare Materials, 4(3):361-366 (2015).
Fields, et al., "Surface modified poly(β amino ester)-containing nanoparticles for plasmid DNA delivery", J Control Release, 164(1):41-8 (2012).
Firth, et al., "Functional Gene Correction for Cystic Fibrosis in Lung Epithelial Cells Generated from Patient iPSCs", Cell Rep, 12(9):1385-1390 (2015).
Gao et al., "Hyperbranched polymers: from synthesis to applications". Prog. Polym. Sci. 29:183-275 (2004).
Glaser, et al., "HDAC inhibitors: clinical update and mechanism-based potential", Biochem. Pharmacol., 74(5):659-671 (2007).
Gruenert, et al., "Established cell lines used in cystic fibrosis research", J Cyst Fibros, 3(Suppl 2):191-196 (2004).
Gupta, et al., "Nanotechnology for delivery of peptide nucleic acids (PNAs)", Journal of Controlled Release, 240:302-311 (2016).
Haapaniemi, et al., "CRISPR-Cas9 genome editing induces a p53-mediated DNA damage response", Nature medicine, 24(7):927-930 (2018).
Hanna, et al. "Treatment of sickle cell anemia mouse model with iPS cells generated from autologous skin", Science, 318:1920-1923 (2007).
Hansen, et al., "High-affinity triplex targeting of double stranded DNA using chemically modified peptide nucleic acid oligomers", Nucl. Acids Res., 37(13): 4498-4507 (2009).
Harrison, et al., "Gene editing & stem cells", J Cyst Fibros, 17(1):10-16 (2018).
He, et al., "The Structure of a γ-modified peptide nucleic acid duplex", Mol. BioSyst,. 6:1619-1629 (2010).
Hoban, et al., "Correction of the sickle cell disease mutation in human hematopoietic stem/progenitor cells", Blood, 125:2597-2604 (2015).
Holt, et al., "Human hematopoietic stem/progenitor cells modified by zinc-finger nucleases targeted to CCR5 control HIV-1 in vivo", Nature biotechnology, 28(8):839-47 (2010).
Hrkach, et al., "Preclinical development and clinical translation of a PSMA-targeted docetaxel nanoparticle with a differentiated pharmacological profile", Sci Transl Med, 4(128):128ra139 (2012).
Huang, et al., "Functional silencing of hepatic microsomal glucose-6-phosphatase gene expression in vivo by adenovirus-mediated delivery of short hairpin RNA", FEBS Lett., 558(1-3):69-73 (2004).
Huang, et al., "Preparation and determination of optical purity of γ-lysine modified peptide nucleic acid analogues", Arch Pharm Res, 35(3):517-522 (2012).
Hubbell, et al., "Chemistry. Nanomaterials for drug delivery", Science, 337:303-5 (2012).
Ihry, et al., "p53 inhibits CRISPR-Cas9 engineering in human pluripotent stem cells", Nature medicine, 24(7):939-946 (2018).
International Search Report for corresponding PCT/US2020/038976 dated Oct. 9, 2020.
International Search Report for PCT application PCT/US2018/026116 dated Jul. 9, 2018.
International Search Report for PCT application PCT/US2020/038972 dated Oct. 20, 2020.
International Search Report for PCT/US2020/044506 dated Oct. 28, 2020.
Jain, et al., "Influence of pendant chiral C(γ)-(alkylideneamino/guanidino) cationic side-chains of PNA backbone on hybridization with complementary DNA/RNA and cell permeability", JOC, 79(20):9567-9577 (2014).
Jarvi, et al., "Development of Cu 2+-Based Distance Methods and Force Field Parameters for the Determination of PNA Conformations and Dynamics by EPR and MD Simulations", Journal of Physical Chemistry Part B, 124(35):7544-7556 (2020).
Jiang, et al., "Biodegradable poly(lactic-co-glycolic acid) microparticles for injectable delivery of vaccine antigens", Adv. Drug Deliv. Rev., 57(3):391-410 (2005).
Johnson, et al., "Efficiency of gene transfer for restoration of normal airway epithelial function in cystic fibrosis", Nature Genetics, 2:21-25 (1992).
Kaihatsu, et al., "Extending recognition by peptide nucleic acids (PNAs): binding to duplex DNA and inhibition of transcription by tail-clamp PNA-peptide conjugates", Biochemistry, 42(47):13996-4003 (2003).
Kamei, et al., "Mechanistic study of the uptake/permeation of cell-penetrating peptides across a caco-2 monolayer and their stimulatory effect on epithelial insulin transport", J Pharm Sci., 102(11):3998-4008 (2013).
Karen, et al., "Angiokeratoma corporis diffusum (Fabry disease)", Dermatol. Online J., 11(4):8 (2005).
Khan, A. et al., "Sustained polymeric delivery of gene silencing antisense ODNs, siRNA, DNAzymes and ribozymes: in vitro and in vivo studies", J Drug Target, 12:393-404 (2004).
Kirillova, et al., "Polyanionic Carboxyethyl Peptide Nucleic Acids (ce-PNAs): Synthesis and DNA Binding", PLOS One, 10(10):e0140468 (2015).
Kittaka, "Chiral peptide nucleic acids with a substituent in the N-(2-aminoethy)glycine backbone", Molecules, 18(1):287-310 (2013).
Konstan, et al., "Compacted DNA Nanoparticles Administered to the Nasal Mucosa of Cystic Fibrosis Subjects are Safe and Demonstrate Partial to Complete Cystic Fibrosis Transmembrane Regulator Reconstitution ", Human Gene Therapy, 15(12):1255-69 (2004).
Koppelhus, et al., "Cellular delivery of peptide nucleic acid (PNA)" Adv. Drug Deliv. Rev., 55(2):267-280 (2003).
Krishnendu, et al., "Core/shell nanoparticles in biomedical applications", Advances in Colloid and Interface Science, 209:8-39 (2014).
Kuhn, et al., "Sequence specificity at targeting double-stranded DNA with a γ-PNA oligomer modified with guanidinium G-clamp nucleobases", Artificial DNA, PNA & XNA, 1(1):45-53(2010).
Larson, et al., "In Utero Gene Therapy", Ochsner J., 2(2):107-110 (2000).

(56) References Cited

OTHER PUBLICATIONS

Lee, et al., "Correction of the ΔF508 Mutation in the Cystic Fibrosis Transmembrane Conductance Regulator Gene by Zinc-Finger Nuclease Homology-Directed Repair", Biores. Open Access, 1(3):99-108 (2012).
Liu, et al., "Inhibition of Histone deacetylase 1 (HDACI) and HDAC2 enhances CRISPR/Cas9 genome editing", Nucleic Acids Res., 48(2):517-532 (2019).
Lorenz, et al., "Steroid and lipid conjugates of siRNAs to enhance cellular uptake and gene silencing in liver cells", Bioorg. Med. Chem. Lett., 14(19):4975-4977 (2004).
Luens, et al., "Thrombopoietin, kit ligand, and flk2/flt3 ligand together induce increased numbers of primitive hematopoietic progenitors from human CD34+Thy-1+Lin-cells with preserved ability to engraft SCID-hu bone", Blood 91:1206-15 (1998).
Ma, et al., "Nuclease-resistant external guide sequence-induced cleavage of target RNA by human ribonuclease P", Antisense Nucleic Acid Drug Dev., 8(5):415-426 (1998).
Magzoub, et al., "N-terminal peptides from unprocessed prion proteins enter cells by micropinocytosis", Biochem Biophys Res Commun., 348:379-85 (2006).
Majumdar, et al., "Targeted gene knockout mediated by triple helix forming oligonucleotides", Nature Genetics, 20(2):212-214 (1998).
Manna, et al., "MiniPEG-γPNA", Methods in Molecular Biology, 1050:1-12 (2014).
Marangi, et al., "Innovative Therapeutic Strategies for Cystic Fibrosis: Moving Forward to CRISPR Technique", Front Pharmacol., 9:396 (2018).
McNeer, et al., "Nanoparticles that deliver triplex-forming peptide nucleic acid molecules correct F508del CFTR in airway epithelium", Nature Communications, 6:6952, 25 pages (2015a).
McNeer, et al., "Correction of F508del CFTR in airway epithelium using nanoparticles delivering triplex-forming PNAs", Nat Commun., 6:6952 (2015b).
McNeer, et al., "Nanoparticles Deliver Triplex-forming PNAs for Site-specific Genomic Recombination in CD34+ Human Hematopoietic Progenitors", Mol. Ther., 19(1): 172-80 (2011).
McNeer, et al., "Systemic delivery of triplex-forming PNA and donor DNA by nanoparticles mediates site-specific genome editing of human hematopoietic cells in vivo", Gene Ther., 20(6):658-669 (2013).
Murata, et al., "Anti-tumor effects of anti-VEGF siRNA encapsulated with PLGA microspheres in mice", J. Control. Release, 126(3):246-54 (2008).
Nansen, et al., "The role of CC chemokine receptor 5 in antiviral immunity", Blood, 99(4):1237-45 (2002).
Nie, et al., "Lysine-based peptide-functionalized PLGA foams for controlled DNA delivery", J. Control. Release, 138(1):64-70 (2009).
Nielsen, et al., "Sequence-selective targeting of duplex DNA by peptide nucleic acids", Current opinion in molecular therapeutics, 12(2):184-191 (2010). Abstract.
Nyce and Metzger, "DNA antisense therapy for asthma in an animal model", Nature, 385:721-5 (1997).
Quijano, et al., "Therapeutic Peptide Nucleic Acids: Principles, Limitations, and Opportunities", Yale J Biol Med., 90(4):583-598 (2017).
Rapireddy, et al., "Strand invasion of mixed-sequence, double-helical B-DNA by γ-peptide nucleic acids containing G-clamp nucleobases under physiological conditions", Biochemistry, 50(19):3913-8 (2011).
Ricciardi, et al., "In utero nanoparticle delivery for site-specific genome editing", Nat. Commun., 9(1):2481 (2018b).
Ricciardi, et al., "Peptide Nucleic Acids as a Tool for Site-Specific Gene Editing", Molecules, 23(3):1-15 (2018a).
Rodriguez, et al., "Minimal "Self" peptides that inhibit phagocytic clearance and enhance delivery of nanoparticles", Science, 339(6122):971-975 (2013).
Rogers, et al., "Site-Directed Recombination via Bifunctional Pna-Dna Conjugates" PNAS, 99(26):16695-16700 (2002).
Rump, et al., "Modification of the plasma clearance and liver uptake of steroid ester-conjugated oligodeoxynucleotides by association with (lactosylated) low-density lipoprotein", Biochem. Pharmacol., 59(11):1407-1416 (2000).
Sahu, et al., "Synthesis and characterization of conformationally preorganized, (R)-diethylene glycol-containing γ-peptide nucleic acids with superior hybridization properties and water solubility", J. Org. Chem., 76:5614-27 (2011).
Sambrook, et al., Molcular Cloning: A Laboratory Manual, 2nd Ed., Cold Spring Harbor Laboratory, Cold Spring Harbor, NY (1989).
Sanz, et al., "Cas9/gRNA targeted excision of cystic fibrosis-causing deep-intronic splicing mutations restores normal splicing of CFTR mRNA", PLoS One, 12(9):e0184009 (2017).
Schleifman, et al., "Triplex-mediated gene modification", Methods in Molecular Biology, 175-190 (2008).
Schleifman, et al., "Site-specific Genome Editing in PBMCs With PLGA Nanoparticle-delivered PNAs Confers HIV-1 Resistance in Humanized Mice", Mol Ther Nucleic Acids, 2(11):e135 (2013).
Schleifman, et al., "Targeted disruption of the CCR5 gene in human hematopoietic stem cells stimulated by peptide nucleic acids", Chem Biol., 18(9):1189-1198 (2011).
Schneider, et al., "In utero gene therapy: The case for", Nature Medicine, 5(3):256-257 (1999).
Schwank, et al., "Functional Repair of CFTR by CRISPR/Cas9 in Intestinal Stem Cell Organoids of Cystic Fibrosis Patients", Cell stem cell, 13(6):653-658 (2013).
Scott, et al., "Molecular genetics of mucopolysaccharidosis type I: diagnostic, clinical, and biological implications", Hum. Mutat. 6:288-302 (1995).
Shenoy, et al., "Calcium-modulated chloride pathways contribute to chloride flux in murine cystic fibrosis-affected macrophages", Pediatric research, 70(5):447-452 (2011).
Skarsgard, "In utero gene delivery using chitosan DNA nanoparticles in mice", Clinical and Investigative Medicine, 34, Abstract (2008).
Smith, et al., "The ATM-Chk2 and ATR-Chk1 pathways in DNA damage signaling and cancer", Adv Cancer Res., 108:73-112 (2010).
Soutschek, et al., "Therapeutic silencing of an endogenous gene by systemic administration of modified siRNAs", Nature, 432(7014):173-178 (2004).
Staff, "An introduction to gene therapy and its potential prenatal use", Acta Obstat. Gynecol. Scand., 80:485-491 (2001).
Staretz-Chacham, et al., "Lysosomal storage disorders in the newborn", Pediatrics, 123(4):1191-207 (2009).
Steinberger, et al., "Functional deletion of the CCR5 receptor by intracellular immunization produces cells that are refractory to CCR5-dependent HIV-1 infection and cell fusion.", Proc. Natl. Acad. Sci. USA., 97(2):805-810 (2000).
Sterchak, et al., "Uncharged stereoregular nucleic acid analogs. 1. Synthesis of a cytosine-containing oligomer with carbamate internucleoside linkages", Organic Chem., 52:4202-6 (1987).
Strug, et al., "Recent advances in developing therapeutics for cystic fibrosis", Hum Mol Genet., 27(R2):R173-R186 (2018).
Suh et al: "Biodegradable bioadhesive nanoparticle incorporation of broad-spectrum organic sunscreen agents", Bioengineering & Translational Medicine, 4(1):129-140 (2018).
Tähtinen, et al., "[gamma]-( S )-Guanidinylmethyl-Modified Triplex-Forming Peptide Nucleic Acids Increase Hoogsteen-Face Affinity for a MicroRNA and Enhance Cellular Uptake", Chembiochem, 20(24):3041-3051 (2019).
Tähtinen, et al., "19 F NMR Spectroscopic Analysis of the Binding Modes in Triple-Helical Peptide Nucleic Acid (PNA)/MicroRNA Complexes", Chemistry—A European Journal, 23(29):7113-7124 (2017).
Tatokoro, et al., "Heat shock protein 90 targeting therapy: state of the art and future perspective", Excli J., 14:48-58 (2015).
Thompson and Eastman, "The cancer therapeutic potential of Chk1 inhibitors: how mechanistic studies impact on clinical trial design", Br J Clin Pharmacol., 76(3):358-69 (2013).
Tietjen, et al., "Ex vivo pretreatment of human vessels with siRNA nanoparticles provides protein silencing in endothelial cells", Nature Communications, 8(1):191 (2017).

(56) References Cited

OTHER PUBLICATIONS

Von Bismark, et al., "IKK NBD peptide inhibits LPS induced pulmonary inflammation and alters sphingolipid metabolism in a murine model", Pulm Pharmacol Ther., 25(3):228-35 (2012).
Waddington, et al., In utero gene transfer of human factor IX to fetal mice can induce postnatal tolerance of the exogenous clotthing factor, Blood, 101:1359-1366 (2013).
Waddington, et al., "In Utero gene therapy: current challenges and perspectives," Molecular Therapy, 11(5):661-676 (2005).
Walkley, "Pathogenic cascades in lysosomal disease—Why so complex", J. Inherit. Metab. Dis., 32(2):181-9 (2009).
Weber, et al., "ATM and ATR as therapeutic targets in cancer", Pharmacology & Therapeutics, 149:124-138 (2015).
Woodrow, et al., "Intravaginal gene silencing using biodegradable polymer nanoparticles densely loaded with small-interfering RNA", Nat Mater, 8:526-33 (2009).
Wynand, et al., "The multifaceted influence of histone deacetylases on DNA damage signalling and DNA repair", Nucleic Acids Research, (2016).
Yamano, et al., "Modified Tat peptide with cationic lipids enhances gene transfection efficiency via temperature-dependent and caveolae-mediated endocytosis", J Control Release, 152(2):278-285 (2011).
Yang, et al., "The effect of hyperbranched polyglycerol coatings on drug delivery using degradable polymer nanoparticles", Biomaterials, 35(24):6595-6602 (2014).
Yeh, et al., "Self-assembled monothiol-terminated hyperbranched polyglycerols on a gold surface: a comparative study on the structure, morphology, and protein adsorption characteristics with linear poly(ethylene glycol)s.", Langmuir. 24(9):4907-16(2008).
Yu, et al., "Novel aptamer-nanoparticle bioconjugates enhances delivery of anticancer drug to MUC1-positive cancer cells in vitro", PLoS One., 6:e24077 (2011).
Yuan, et al., "SiRNA drug delivery by biodegradable polymeric nanoparticles", J Nanoscience and Nanotechnology, 6(9-10):2821-8 (2006).
Zeiher, et al., "A mouse model for the delta F508 allele of cystic fibrosis", J Clin Invest, 96(4):2051-2064 (1995).
Zhang, et al., "engineering biodegradable nanoparticles for drug and gene delivery", Chem. Eng. Prog., 109(3):25-30(2013).
Zhou, et al., "Biodegradable poly(amine-co-ester) terpolymers for targeted gene delivery", Nat Mater., 11(1):82-90 (2012).
Zielke, et al., "Repetitive synchronization of human lymphoblast cultures with excess thymidine", Methods Cell Biol., 8(0):107-121 (1974).

\* cited by examiner

COMPOSITIONS AND METHODS FOR TREATING SICKLE CELL DISEASE

CROSS-REFERENCE TO RELATED APPLICATION

This application is a National Phase application under U.S.C. § 371 of PCT/US2020/044506, filed Jul. 31, 2020, which claims the benefit of and priority to U.S. Ser. No. 62/881,170 filed Jul. 31, 2019 and which are incorporated by referenced herein in their entireties.

REFERENCE TO THE SEQUENCE LISTING

The Sequence Listing submitted as a text file named "YU_7756_PCT_ST25" created on Jul. 30, 2020, and having a size of 12,711 bytes is hereby incorporated by reference pursuant to 37 C.F.R. § 1.52(e)(5).

FIELD OF THE INVENTION

The field of the invention generally relates to triplex-forming molecules for gene editing and methods of use thereof for ex vivo and in vivo gene editing.

BACKGROUND OF THE INVENTION

Sickle cell disease (SCD), one of the most common monogenic diseases in the world, with >250 000 new patients each year, is caused by a single point mutation in the seventh codon of the β-globin gene. Substitution of valine for glutamic acid at position 6 of the β-globin chain in patients with sickle cell anemia predisposes to hemoglobin polymerization, leading to sickle cell rigidity and vasoocclusion with resulting tissue and organ damage. The disease is characterized by anemia and severe acute painful crises with frequent hospitalizations. The average lifespan of subject suffering from SCD is 36 to 40 years of age.

The only currently available cure for SCD is an allogeneic hematopoietic stem cell transplant, though this treatment is complicated by a lack of fully matched donors, and immune complications stemming from mismatched transplants (Hoban, et al., *Blood*, 125:2597-2604 (2015)). There remains a need for improved compositions and methods of treating SCD.

Thus, it is object of the invention to provided compositions and methods for treating SCD.

SUMMARY OF THE INVENTION

Compositions including peptide nucleic acid (PNA) oligomers that target the β-globin gene and methods of use thereof for treating Sickle Cell Disease (SCD) are provided. In some embodiments, the peptide nucleic acid (PNA) oligomers typically include a Hoogsteen binding peptide nucleic acid (PNA) segment composed of PNA residues including the nucleic acid sequence TTJJTJT and a Watson-Crick binding PNA segment composed of PNA residues including the nucleic acid sequence TCTCCT-TAAACCTGT (SEQ ID NO:1) or TCTCCT-TAAACCTGTCTT (SEQ ID NO:2), or a variant thereof with a combination of up to 5 nucleic acid sequence substitutions, additions, insertions, or deletions in the Hoogsteen binding PNA segment, the Watson-Crick binding segment or the combination thereof. Typically, the two segments can bind or hybridize to a target region in the β-globin gene and induce strand invasion, displacement, and formation of a triple-stranded molecule among the two PNA segments and the target region.

In some embodiments, the PNA oligomer includes the nucleic acid sequence TTJJTJT-linker-TCTCCT-TAAACCTGT (SEQ ID NO:3) or TTJJTJT-linker-TCTCCTTAAACCTGTCTT (SEQ ID NO:4), wherein "linker" is a flexible linker, linking the Hoogsteen binding segment to the Watson-Crick binding segment. The PNA oligomer can include the nucleic acid sequence lys-lys-lys-TTJJTJT-OOO-TCTCCTTAAACCTGTCTT-lys-lys-lys (SEQ ID NO:5) (SCD-tcPNA2). In some embodiments, the PNA oligomer is free from substitution at the gamma (γ) position of the PNA residues.

In some embodiments, one or more of the PNA residues in the Hoogsteen binding segment, the Watson-Crick binding segment, or a combination thereof includes a substitution at the gamma (γ) position of one or more PNA residues. In a particular embodiments, the PNA oligomer includes the nucleic acid sequence lys-lys-lys-TTJJTJT-OOO-T<u>c</u> T<u>c</u> C<u>t</u> T<u>a</u> A<u>a</u> C<u>c</u> T<u>g</u> T<u>c</u> T<u>t</u>-lys-lys-lys (SEQ ID NO:5) or lys-lys-lys-TTJJTJT-OOO-<u>t</u> C<u>t</u> C<u>c</u> T<u>t</u> A<u>a</u> A<u>c</u> C<u>t</u> G<u>t</u> C<u>t</u> T-lys-lys-lys (SEQ ID NO:5), wherein the bolded and underlined residues are γ modified PNA. In some embodiments, the modification is miniPEG or serine.

Other PNA oligomer sequences are also provided.

Nanoparticles encapsulating or entrapping PNA oligomers, and optionally donor oligonucleotides having a sequence that can correct a mutation(s) in a cell's genome by recombination induced or enhanced by the peptide nucleic acid oligomer are also provided. The nanoparticles can include a core and shell. The core can include, for example, a hydrophobic polymer. The hydrophobic polymer can be a polyhydroxyester, such as poly(lactic acid), poly(glycolic acid), and poly(lactic acid-co-glycolic acid). The shell can be a hyperbranched polymer such as polyglycerol. In particular embodiments, the nanoparticles are composed of poly(lactic acid) (PLA) and hyperbranched polyglycerol (HPG). In some embodiments, the PLA-HPG show improved nucleic acid loading, improved nucleic acid delivery into cells, and/or improved levels of gene editing relative to PLGA particles. In some embodiments, the nanoparticles have a diameter in the range of 50 nm to 500 nm, or 100 nm to 450 nm, or 200 nm to 400 nm, or 125 nm to 250 nm; or about 150 nm, 200 nm, 250 nm, 300 nm, 350 nm, 400 nm, or 450 nm (by e.g., dynamic light scattering), with or without nucleic acids loaded therein. In some embodiments, the surface charge is neutral or negative, e.g., between about 0 and about −50 mV, or about −10 mV and about −40 mV, or about −20 mV and about −30 mV The particles can be used with any triplex-forming peptide nucleic acid oligomers including, but not limited, that sequences expressly provided herein.

Pharmaceutical compositions including an effective amount of PNA oligomers or nanoparticles are also provided. The compositions can include a donor oligonucleotide.

A targeting moiety, a cell penetrating peptide, or a combination thereof can be associated with, linked, conjugated, or otherwise attached directly or indirectly to the PNA oligomer or the nanoparticles.

The pharmaceutical composition can include a potentiating agent to increase the frequency of recombination of the donor oligonucleotide at a target site in the genome of a population of cells.

In a non-limiting exemplary embodiment, the nanoparticle is a PLA-HPG nanoparticle including a plurality of a PNA oligomer comprising the nucleic acid sequence lyslys-lys-TTJJTJT-OOO-TCTCCTTAAACCTGTCTT-lys-lys-lys (SEQ ID NO:5), optionally lys-lys-lys-TTJJTJT-OOO-T CT Cc TT AA Ac CT GT CT T-lys-lys-lys (SEQ ID NO:5), wherein the bolded and underlined residues are serine γ modified PNA. In more particular embodiments, the number average molecular weight (Mn) of the PLA is about 12 kDa and optionally is 12.7 kDa, and the molecular weight of HPG is low, for example, the number average molecular weight (Mn) of the HPG can be about 5 kDa, and optionally is 5.4 kDa. In some embodiments, the conjugation ratio is about 1 and is optionally 1.3, the HPG (wt %) is about 40% and is optionally 38%, or a combination thereof. Exemplary pharmaceutical compositions of having an effective amount of the nanoparticle may optionally further include a potentiating agent such as vorinostat, RI-1, B0-2, or 3E10 antibody or a fragment thereof.

Methods of using the PNA oligomers, nanoparticles, and pharmaceutical compositions to modify the genome of cells are also provided. For example, the method can include contact cells with PNA oligomers or nanoparticles, typically delivered using a pharmaceutical composition. The contacting can occur in vitro, ex vivo, or in vivo. In some embodiments, the contacting occurs in vivo in a subject with Sickle Cell Disease. The composition can be administered to the subject in an effective amount to correct a Sickle Cell Disease mutation in an effective number of cells to reduce one or more symptoms of the disease or disorder. In some ex vivo embodiments, cells that are autologous cells to a subject are contacted with the composition, and the cells are administered to the subject in an effective amount to treat Sickle Cell Disease.

The methods can include contacting the cells with an effective amount of a potentiating agent to increase the frequency of recombination of the donor oligonucleotide at a target site in the genome of a population of cells. The potentiating agents can be used with any triplex-forming peptide nucleic acid oligomers including, but not limited, that sequences expressly provided herein. The potentiating agent can be a Rad51 modulator that, for example, stimulates or increases Rad51 expression, or decreases or inhibits Rad51 expression. In some embodiments, the potentiating agent is a histone deacetylase inhibitor such as vorinostat.

DETAILED DESCRIPTION OF THE INVENTION

I. Definitions

Figure 1:
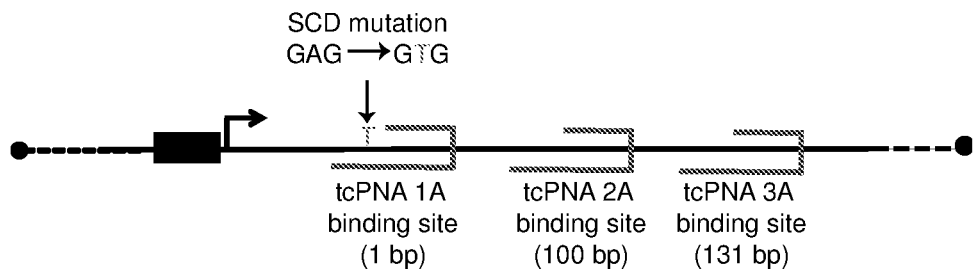
FIG. 1 is a schematic of tcPNA binding to sites near the sickle cell disease (SCD) mutation (GAG→GTG), and the sequences of exemplary tcPNAs targeting the SCD mutation with alternating mini-PEG modified bases along the Watson-Crick domain: SCD-tcPNA 1A: H-KKK-JJTJTTJ-OOO-c T T CT Cc Ac Ag GA GT CAg -KKK-NH2 (SEQ ID NO:14); SCD-tcPNA 2A: H-KKK-TTJJTJT-OOO-T CT C c TT AA Ac CT GT CT T-KKK-NH2 (SEQ ID NO:5); SCD-tcPNA 3A: H-KKK-TJTJTTJT-OOO-T CT Tc Tc T g Tc Tc CA CA T-KKK-NH2 (SEQ ID NO:21). K indicates lysine; J, pseudoisocytosine (for C) for pH-independent triplex formation. O, 8-amino-2,6,10-trioxaoctanoic acid linkers connecting the Hoogsteen and Watson-Crick domains of the tcPNAs, mini-PEG modified bases (bold and underlined) along the Watson-Crick domain.

As used herein, "transformed" and "transfected" encompass the introduction of a nucleic acid into a cell by one of a number of techniques known in the art.

As used herein, the phrase that a molecule "specifically binds" to a target refers to a binding reaction which is determinative of the presence of the molecule in the presence of a heterogeneous population of other biologics. Thus, under designated assay conditions, a specified molecule binds preferentially to a particular target and does not bind in a significant amount to other biologics present in the sample. Specific binding between two entities can be, for example, an affinity of at least $10^6$, $10^7$, $10^8$, $10^9$, or $10^{10}$ $M^{-1}$. Affinities greater than $10^8$ $M^{-1}$ are preferred.

As used herein, the term "carrier" or "excipient" refers to an organic or inorganic ingredient, natural or synthetic inactive ingredient in a formulation, with which one or more active ingredients are combined.

As used herein, the term "pharmaceutically acceptable" means a non-toxic material that does not interfere with the effectiveness of the biological activity of the active ingredients.

As used herein, the terms "effective amount" or "therapeutically effective amount" means a dosage sufficient to alleviate one or more symptoms of a disorder, disease, or condition being treated, or to otherwise provide a desired pharmacologic and/or physiologic effect. The precise dosage will vary according to a variety of factors such as subject-dependent variables (e.g., age, immune system health, etc.), the disease or disorder being treated, as well as the route of administration and the pharmacokinetics of the agent being administered.

As used herein, the term "prevention" or "preventing" means to administer a composition to a subject or a system at risk for or having a predisposition for one or more symptom caused by a disease or disorder to cause cessation of a particular symptom of the disease or disorder, a reduction or prevention of one or more symptoms of the disease or disorder, a reduction in the severity of the disease or disorder, the complete ablation of the disease or disorder, stabilization or delay of the development or progression of the disease or disorder.

The term "subject" or "patient" refers to any mammal who is the target of administration. Thus, the subject can be a human. The subject can be a domesticated, agricultural, or wild animal. Domesticated animals include, for example, dogs, cats, rabbits, ferrets, guinea pigs, hamsters, pigs, monkeys or other primates, and gerbils. Agricultural animals include, for example, horses, cattle, pigs, sheep, rabbits, and goats. The term does not denote a particular age or sex of the subject. In some embodiments, the subject is an embryo or fetus.

II. Compositions

A. Peptide Nucleic Acids

Triplex-forming peptide nucleic acid (PNA) oligomers that can increase recombination of a donor oligonucleotide at the site of the Sickle Cell Disease (SCD) mutation are provided. The compositions, also referred to herein as triplex-forming molecules and PNA oligomers, are typically single stranded and bind to a double stranded nucleic acid molecule, for example duplex DNA, in a sequence-specific manner to form a triple-stranded structure. The single-stranded oligomer typically includes a sequence substantially complementary to the polypurine strand of the polypyrimidine:polypurine target motif.

The triplex-forming molecules can be used to induce site-specific homologous recombination in mammalian cells when combined with donor oligonucleotide, e.g., donor DNA molecules. The donor DNA molecules can contain mutated nucleic acids relative to the target DNA sequence. This is useful to activate, inactivate, or otherwise alter the function of a polypeptide or protein encoded by the targeted duplex DNA.

The triplex-forming molecules bind to a predetermined target region referred to herein as the "target sequence," "target region," or "target site." The target sequence for the triplex-forming molecules can be within or adjacent to a human gene encoding, for example, the beta globin gene. The target sequence can be within the coding DNA sequence of the gene or within an intron. The target sequence can also be within DNA sequences which regulate expression of the target gene, including promoter or enhancer sequences or sites that regulate RNA splicing.

Peptide nucleic acids are polymeric molecules in which the sugar phosphate backbone of an oligonucleotide has been replaced in its entirety by repeating substituted or unsubstituted N-(2-aminoethyl)-glycine residues that are linked by amide bonds. The various nucleobases are linked to the backbone by methylene carbonyl linkages. PNAs maintain spacing of the nucleobases in a manner that is similar to that of an oligonucleotides (DNA or RNA), but because the sugar phosphate backbone has been replaced, classic (unsubstituted) PNAs are achiral and neutrally charged molecules. Peptide nucleic acid oligomers are composed of peptide nucleic acid residues (sometimes referred to as 'residues' or 'monomers'). The nucleobases within each PNA residue can include any of the standard bases (uracil, thymine, cytosine, adenine and guanine) or any of the modified heterocyclic nucleobases described below.

1. Composition of the PNA Residues and Oligomers a. Modifications i. Gamma Modifications Some or all of the PNA residues of the disclosed triplex-forming molecules can unmodified PNA residues, or residues that are modified at the gamma position in the polyamide backbone (γPNAs) as illustrated below (wherein "B" is a nucleobase and "R" is a substitution at the gamma position).

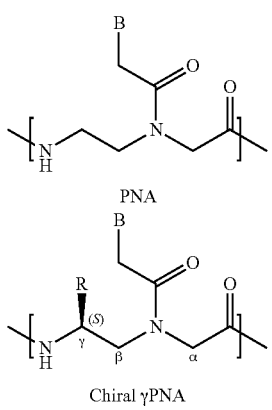

Chiral γPNA

Substitution at the gamma position creates chirality and provides helical pre-organization to the PNA oligomer, yielding substantially increased binding affinity to the target DNA (Rapireddy, et al., *Biochemistry*, 50(19):3913-8 (2011), He et al., "The Structure of a γ-modified peptide nucleic acid duplex", *Mol. BioSyst.* 6:1619-1629 (2010); and Sahu et al., "Synthesis and Characterization of Conformationally Preorganized, (R)-Diethylene Glycol-Containing γ-Peptide Nucleic Acids with Superior Hybridization Properties and Water Solubility", *J. Org. Chem*, 76:5614-5627) (2011)). Other advantageous properties can be conferred depending on the chemical nature of the specific substitution at the gamma position (the "R" group in the illustration of the Chiral γPNA, above).

Chemical structures showing substitution at the γ position of the PNA backbone. PNA oligomers have either no (PNA, left), ethylene glycol (mpγPNA, middle), or hydroxymethyl ($^{ser}$γPNA, right) γ substitution.

to those introduced below. Examples of γ substitution with other side chains include that of alanine, threonine, cysteine, valine, leucine, isoleucine, methionine, proline, phenylalanine, tyrosine, aspartic acid, glutamic acid, asparagine, glutamine, histidine, lysine, arginine, and the derivatives thereof. The "derivatives thereof" as used herein are defined as those chemical moieties that are covalently attached to these amino acid side chains, for instance, to that of serine, cysteine, threonine, tyrosine, aspartic acid, glutamic acid, asparagine, glutamine, lysine, and arginine.

γPNA-containing γPNAs are conformationally preorganized PNAs that may exhibit superior hybridization properties and water solubility as compared to the original PNA design and some other chiral γPNAs.

Sahu et al., describes γPNAs prepared from L-amino acids that adopt a right-handed helix, and γPNAs prepared from D-amino acids that adopt a left-handed helix. Only the right-handed helical γPNAs hybridize to DNA or RNA with high affinity and sequence selectivity.

In some embodiments, tcPNAs are prepared wherein every other PNA residue on the Watson-Crick binding side of the linker is a $^{ser}$γPNA-containing γPNA. Accordingly, for these embodiments, the tail clamp side of the PNA has alternating classic PNA and $^{ser}$γPNA-containing γPNA residues.

ii. Additional PNA Modifications

PNA oligomers can also include other positively charged moieties to increase the solubility of the PNA and increase the affinity of the PNA for duplex DNA. Commonly used positively charged moieties include the amino acids lysine and arginine, although other positively charged moieties may also be useful. Lysine and arginine residues can be added to a bis-PNA linker or can be added to the carboxy or the N-terminus of a PNA strand. Common modifications to PNA oligomers are discussed in Sugiyama and Kittaka,

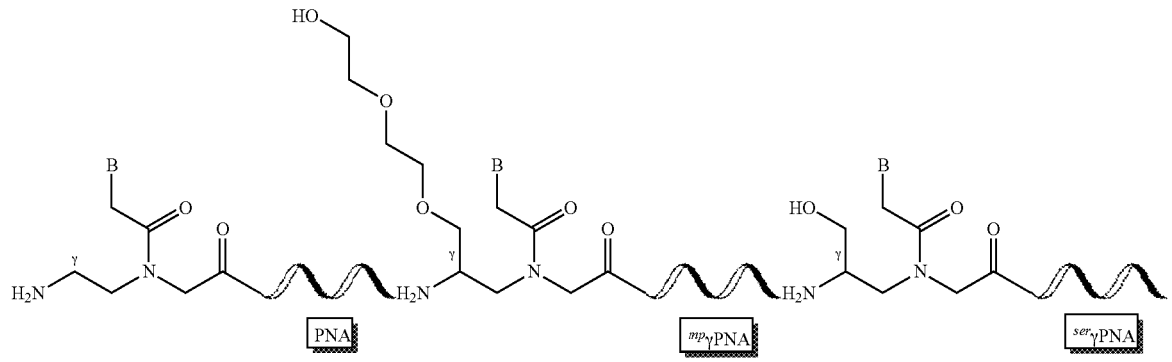

"γPNA" and "gamma PNA" as used herein can refer to individual PNA residues or PNA oligomers that are modified or substituted at the gamma position.

One class of γ substitution is miniPEG, also referred to as "$^{MP}$γPNA". A $^{MP}$γPNA residue is depicted above. "MiniPEG" and "MP" refer to diethylene glycol.

Another of γ substitution is hydroxymethyl, also referred to as "$^{ser}$γPNA". A $^{ser}$γPNA residue is depicted above. "Ser" refers to serine.

Other residues and side chains can be used, and even mixed substitutions can be used to tune the properties of the oligomers. In some embodiments, PNA-mediated gene editing are achieved via additional or alternative γ substitutions or other PNA chemical modifications including but limited

*Molecules*, 18:287-310 (2013)) and Sahu, et al., *J. Org. Chem.*, 76, 5614-5627 (2011), each of which are specifically incorporated by reference in their entireties, and include, but are not limited to, incorporation of charged amino acid residues, such as lysine at the termini or in the interior part of the oligomer; inclusion of polar groups in the backbone, a carboxymethylene bridge in the nucleobases; chiral PNA oligomers bearing substituents on the original N-(2-aminoethyl)glycine backbone; replacement of the original aminoethylglycyl backbone skeleton with a negatively-charged scaffold; conjugation of high molecular weight polyethylene glycol (PEG) to one of the termini; fusion of a PNA oligomer to DNA to generate a chimeric oligomer, redesign of the backbone architecture, conjugation of PNA to DNA or RNA. These modifications improve solubility but often result in reduced binding affinity and/or sequence specificity.

Additionally, any of the triplex-forming sequences can be modified to include guanidine-G-clamp ("G-clamp") PNA residues(s) to enhance PNA oligomer binding to a target site, wherein the G-clamp is linked to the backbone as any other nucleobase would be. γPNAs with substitution of cytosine by G-clamp (9-(2-guanidinoethoxy) phenoxazine), a cytosine analog that can form five H-bonds with guanine, and can also provide extra base stacking due to the expanded phenoxazine ring system and substantially increased binding affinity. In vitro studies indicate that a single G-clamp substitution for C can substantially enhance the binding of a PNA-DNA duplex by 23 C (Kuhn, et al., *Artificial DNA, PNA & XNA*, 1(1):45-53(2010)). As a result, γPNAs containing G-clamp substitutions can have further increased activity.

The structure of a G-clamp monomer-to-G base pair (G-clamp indicated by the "X") is illustrated below in comparison to C-G base pair.

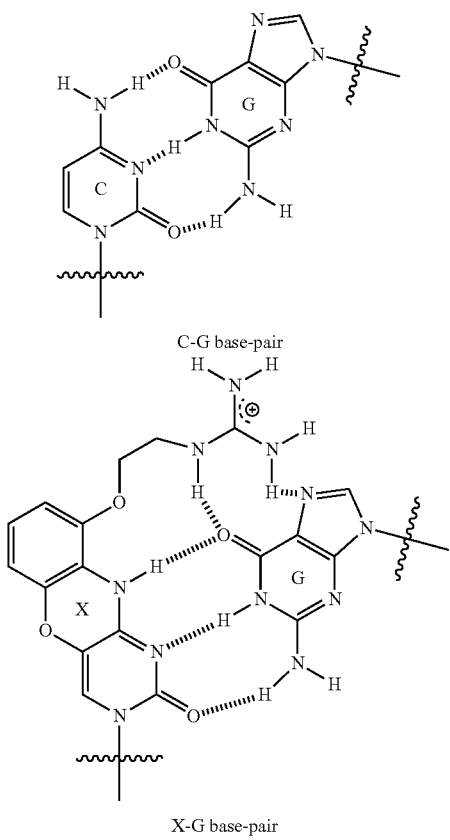

C-G base-pair

X-G base-pair

Some studies have shown improvements using D-amino acids in peptide synthesis.

In some embodiments, the PNA oligomer includes a Hoogsteen binding peptide nucleic acid (PNA) segment and a Watson-Crick binding PNA segment collectively totaling no more than 50 nucleobases in length, wherein the two segments bind or hybridize to a target region of a genomic DNA comprising a polypurine stretch to induce strand invasion, displacement, and formation of a triple-stranded composition among the two PNA segments and the polypurine stretch of the genomic DNA, wherein the Hoogsteen binding segment binds to the target region by Hoogsteen binding for a length of least five nucleobases, and wherein the Watson-Crick binding segment binds to the target region by Watson-Crick binding for a length of least five nucleobases.

The Hoogsteen binding segment can include one or more chemically modified cytosines selected from the group consisting of pseudocytosine, pseudoisocytosine, and 5-methylcytosine. The Watson-Crick binding segment can include a sequence of up to fifteen nucleobases that binds to the target duplex by Watson-Crick binding outside of the triplex. The two segments can be linked by a linker. In some embodiments, all of the peptide nucleic acid residues in the Hoogsteen binding segment only, in the Watson-Crick binding segment only, or across the entire PNA oligomer include a gamma modification of a backbone carbon. In some embodiments, one or more of the peptide nucleic acid residues in the Hoogsteen binding segment only or in the Watson-Crick binding segment only of the PNA oligomer include a gamma modification of a backbone carbon. In some embodiments, alternating peptide nucleic acid residues in the Hoogsteen binding portion only, in the Watson-Crick binding portion only, or across the entire PNA oligomer include a gamma modification of a backbone carbon.

b. Form of the PNA Oligomers

PNAs can bind to DNA via Watson-Crick hydrogen bonds, but with binding affinities significantly higher than those of a corresponding nucleotide composed of DNA or RNA. The neutral backbone of PNAs decreases electrostatic repulsion between the PNA and target DNA phosphates. Under in vitro or in vivo conditions that promote opening of the duplex DNA, PNAs can mediate strand invasion of duplex DNA resulting in displacement of one DNA strand to form a D-loop.

Highly stable triplex PNA:DNA:PNA structures can be formed from a homopurine DNA strand and two PNA strands. The two PNA strands may be two separate PNA molecules (see Bentin et al., *Nucl. Acids Res.*, 34(20): 5790-5799 (2006) and Hansen et al., *Nucl. Acids Res.*, 37(13): 4498-4507 (2009)), or two PNA molecules linked together by a linker of sufficient flexibility to form a single bis-PNA molecule (See: U.S. Pat. No. 6,441,130). In both cases, the PNA molecule(s) forms a triplex "clamp" with one of the strands of the target duplex while displacing the other strand of the duplex target. In this structure, one strand forms Watson-Crick base pairs with the DNA strand in the antiparallel orientation (the Watson-Crick binding portion), whereas the other strand forms Hoogsteen base pairs to the DNA strand in the parallel orientation (the Hoogsteen binding portion). A homopurine strand allows formation of a stable PNA/DNA/PNA triplex. PNA clamps can form at shorter homopurine sequences than those required by triplex-forming oligonucleotides (TFOs) and also do so with greater stability.

Preferably, both the Watson-Crick and Hoogsteen binding portions of the triplex forming molecules are substantially complementary to the target sequence. Although, as with triplex-forming oligonucleotides, a homopurine strand is needed to allow formation of a stable PNA/DNA/PNA triplex, PNA clamps can form at shorter homopurine sequences than those required by triplex-forming oligonucleotides and also do so with greater stability.

Preferably, PNAs are between 6 and 50 nucleobase-containing residues in length. The Watson-Crick portion should be 9 or more nucleobase-containing residues in length, optionally including a tail sequence. More preferably, the Watson-Crick binding portion is between about 9 and 30 nucleobase-containing residues in length, optionally including a tail sequence of between 0 and about 15 nucleobase-containing residues. More preferably, the Watson-Crick binding portion is between about 10 and 25 nucleobase-containing residues in length, optionally including a tail sequence of between 0 and about 10 nucleobase-containing residues in length. In a preferred embodiment, the Watson-Crick binding portion is between 15 and 25 nucleobase-containing residues in length, optionally including a tail sequence of between 5 and 10 nucleobase-containing residues in length. The Hoogsteen binding portion should be 6 or more nucleobase residues in length. Most preferably, the Hoogsteen binding portion is between about 6 and 15 nucleobase-containing residues in length, inclusive.

Although polypurine:polypyrimidine stretches do exist in mammalian genomes, it is desirable to target triplex formation in the absence of this requirement. In some embodiments, triplex-forming molecules include a "tail" added to the end of the Watson-Crick binding portion. Adding additional nucleobases, known as a "tail" or "tail clamp" or "tc", to the Watson-Crick binding portion that bind to the target strand outside the triple helix further reduces the requirement for a polypurine:polypyrimidine stretch and increases the number of potential target sites.

The tail is most typically added to the end of the Watson-Crick binding sequence furthest from the linker. This molecule therefore mediates a mode of binding to DNA that encompasses both triplex and duplex formation (Kaihatsu, et al., *Biochemistry*, 42(47):13996-4003 (2003); Bentin, et al., *Biochemistry*, 42(47):13987-95 (2003)). For example, if the triplex-forming molecules are tail clamp PNA (tcPNA), the PNA/DNA/PNA triple helix portion and the PNA/DNA duplex portion both produce displacement of the pyrimidine-rich strand, creating an altered helical structure that strongly provokes the nucleotide excision repair pathway and activating the site for recombination with a donor DNA molecule (Rogers, et al., *Proc. Natl. Acad. Sci. U.S.A.*, 99(26):16695-700 (2002)).

Tails added to clamp PNAs (sometimes referred to as bis-PNAs) form tail-clamp PNAs (referred to as tcPNAs) that have been described by Kaihatsu, et al., *Biochemistry*, 42(47):13996-4003 (2003); Bentin, et al., *Biochemistry*, 42(47):13987-95 (2003). tcPNAs are known to bind to DNA more efficiently due to low dissociation constants. The addition of the tail also increases binding specificity and binding stringency of the triplex-forming molecules to the target duplex. It has also been found that the addition of a tail to clamp PNA improves the frequency of recombination of the donor oligonucleotide at the target site compared to PNA without the tail.

Traditional nucleic acid TFOs may need a stretch of at least 15 and preferably 30 or more nucleobase-containing residues. Peptide nucleic acids need fewer purines to a form a triple helix, although typically at least 10 or preferably more may be needed. Peptide nucleic acids including a tail, also referred to tail clamp PNAs, or tcPNAs, require even fewer purines to a form a triple helix. A triple helix may be formed with a target sequence containing fewer than 8 purines. Therefore, PNAs should be designed to target a site on duplex nucleic acid containing between 6-30 polypurine:polypyrimidines, preferably, 6-25 polypurine:polypyrimidines, more preferably 6-20 polypurine:polypyrimidines.

The addition of a "mixed-sequence" tail to the Watson-Crick binding strand of the triplex-forming molecules such as PNAs also increases the length of the triplex-forming molecule and, correspondingly, the length of the binding site. This increases the target specificity and size of the lesion created at the target site and disrupts the helix in the duplex nucleic acid, while maintaining a low requirement for a stretch of polypurine:polypyrimidines. Increasing the length of the target sequence improves specificity for the target, for example, a target of 17 base pairs will statistically be unique in the human genome. Relative to a smaller lesion, it is likely that a larger triplex lesion with greater disruption of the underlying DNA duplex will be detected and processed more quickly and efficiently by the endogenous DNA repair machinery that facilitates recombination of the donor oligonucleotide.

In some embodiments a PNA tail clamp system includes:
a) optionally, a positively charged region having a positively charged amino acid subunit, e.g., a lysine subunit;
b) a first region including a plurality of PNA subunits having Hoogsteen homology with a target sequence;
c) a second region including a plurality of PNA subunits having Watson Crick homology binding with the target sequence;
d) a third region including a plurality of PNA subunits having Watson Crick homology binding with a tail target sequence;
e) optionally, a second positively charged region having a positively charged amino acid subunit, e.g., a lysine subunit.

In some embodiments, a linker is disposed between b) and c). In some embodiments, one or more PNA residues of the tail clamp is modified as disclosed herein.

Suitable molecules for use in linkers of bis-PNA molecules include, but are not limited to, 8-amino-3,6-dioxaoctanoic acid, referred to as an O-linker, and 6-aminohexanoic acid. Poly(ethylene) glycol monomers can also be used in bis-PNA linkers. A bis-PNA linker can contain multiple linker residues in any combination of two or more of the foregoing.

PNAs can also include other positively charged moieties to increase the solubility of the PNA and increase the affinity of the PNA for duplex DNA. Commonly used positively charged moieties include the amino acids lysine and arginine (e.g., as additional substituents attached to the C- or N-terminus of the PNA oligomer (or a segment thereof) or as a side-chain modification of the backbone (see Huang et al., *Arch. Pharm. Res.* 35(3): 517-522 (2012) and Jain et al., *JOC*, 79(20): 9567-9577 (2014)), although other positively charged moieties may also be useful (See for Example: U.S. Pat. No. 6,326,479). In some embodiments, the PNA oligomer can have one or more side chain modifications of the backbone.

Peptide nucleic acids are unnatural synthetic polyamides that can be prepared using known methodologies, generally as adapted from peptide synthesis processes.

2. PNA Sequences for SCD Gene Editing

Preferred sequences that target the sickle cell disease mutation in the beta globin gene are also provided below. In some embodiments, one or more of the cytosines of any of disclosed sequence is substituted with a pseudoisocytosine. In some embodiments, all of the cytosines in the Hoogsteen binding portion of a triplex forming molecule are substituted with pseudoisocytosine.

In some embodiments, any of the triplex-forming molecules herein, includes one or more of peptide nucleic acid residues substituted with a side chain (for example miniPEG or amino acid side chain such as a serine side chain) at the alpha, beta and/or gamma position of the backbone. For example, the PNA oligomer can include at least one residue including a gamma modification/substitution of a backbone carbon atom. In some embodiments all of the peptide nucleic acid residues in the Hoogsteen binding portion only, the Watson-Crick binding portion only, or across the entire PNA are substituted with γPNA residues. In particular embodiments, alternating residues are PNA and γPNA in the Hoogsteen binding portion only, the Watson-Crick binding portion only, or across the entire PNA are substituted. In some embodiments, the PNA oligomer includes two or more different modifications of the backbone (e.g. two different types of gamma side chains).

In some embodiments, (1) some or all of the residues in the Watson-Crick binding portion are γPNA residues; (2) some or all of the residues in the Hoogsteen binding portion are γPNA residues; or (3) some or all of the residues (in the Watson-Crick and/or Hoogsteen binding portions) are γPNA residues. Therefore, in some embodiments any of the triplex forming molecules herein is a peptide nucleic acid wherein (1) all of the residues in the Watson-Crick binding portion are γPNA residues and none of the residues is in Hoogsteen binding portion are γPNA residues; (2) all of the residues in the Hoogsteen binding portion are γPNA residues and none of the residues is in Watson-Crick binding portion are γPNA residues; or (3) all of the residues (in the Watson-Crick and Hoogsteen binding portions) are γPNA residues. In some embodiments, at least 10%, 20%, 30%, 40%, 50%, 60%, 70%, 80%, 90%, or 100% of the PNA residues in the Hoogsteen binding segment only, the Watson-Crick binding segment only, or the combination thereof, are γPNA residues. In some embodiments, 1, 2, 3, 4, 5, 6, 7, 8, 9, 10, 11, 12, 13, 14, 15, or more of the PNA residues in the Hoogsteen binding segment only, the Watson-Crick binding segment only, or the combination thereof are γPNA residues. In some embodiments, alternating, or approximately alternative residues, or the Hoogsteen binding segment only, the Watson-Crick binding segment only, or the combination thereof are γPNA residues and unmodified PNA respectively, or unmodified PNA and γPNA residues respectively. The modifications can be the same or different for different residues. For example, in some embodiments, the two or more different residues are modified with different γ modifications (e.g., one or more residues are $^{MP}$γPNA and one or more residues are $^{ser}$γPNA).

In some embodiments, any of the triplex-forming molecules herein, does not include one or more of peptide nucleic acid residues substituted with a side chain. Thus, in some embodiments, the PNA oligomer is free from γPNA residues.

In some embodiments, the triplex-forming molecules are bis-peptide nucleic acids or tail-clamp PNAs with pseudoisocytosine substituted for one or more cytosines, particularly in the Hoogsteen binding portion, and wherein some or all of the PNA residues are γPNA residues.

Any of the triplex-forming molecules herein can have one or more G-clamp-containing residues. For example, one or more cytosines or variant thereof such as pseudoisocytosine in any of the triplex-forming molecules herein can be substituted or otherwise modified to be a clamp-G (9-(2-guanidinoethoxy) phenoxazine).

Any of the triplex-forming molecules herein can include a flexible linker, linking, for example, a Hoogsteen binding domain and a Watson-Crick binding domain to form a bis-PNA or tcPNA. The sequences can be linked with a flexible linker. For example, in some embodiments the flexible linker includes about 1-10, more preferably 2-5, most preferably about 3 units such as 8-amino-2, 6, 10-trioxaoctanoic acid residues. Some molecules include N-terminal or C-terminal non-binding residues, preferably positively charged residues. For example, some molecules include 1-10, preferably 2-6, most preferably about 3 lysines at the N-terminus, the C-terminus, or at both the N-terminus and the C-terminus.

For the disclosed sequences, "J" is pseudoisocytosine, "O" can be a flexible 8-amino-3,6-dioxaoctanoic acid, 6-aminohexanoic acid, or 8-amino-2, 6, 10-trioxaoctanoic acid moiety, "K" and "lys" (or "Lys") are lysine.

PNA oligomer sequences are generally presented in N-terminal-to-C-terminal orientation.

In some embodiments, PNA oligomer sequences can be presented in the form: H-"nucleobase sequence"-NH$_2$ orientation, wherein the H represents the N-terminal hydrogen atom of an unmodified PNA oligomer and the —NH$_2$ represents the C-terminal amide of the polymer. For bis-PNA and tcPNA, the Hoosten-binding portion can be oriented up stream (e.g., at the "H" or N-terminal end of the polyamide) of the linker, while the Watson-Crick binding portion can be oriented downstream (e.g., at the NH$_2$ (C-terminal) end) of the polymer/linker.

In some embodiments, the PNA oligomer has 1, 2, 3, 4, 5, or more substitutions, deletions, and/or insertions in the Hoosteen binding segment only, the Watson-Crick segment region only, or the combination thereof, relative to the exemplary sequences provided below, preferably wherein the PNA oligomer can still form a triplex at the target site. In some embodiments, the PNA oligomer, or segment thereof, has 80%, 85%, 90%, 95%, 96%, 97%, 98%, 99%, or 100% for an oligomer, or segment thereof provided herein.

a. SCD-PNA 2 and Variants Thereof

In the most preferred embodiments, the SCD-PNA is SCD-PNA 2, or a variant or γPNA modified oligomer thereof.

In some embodiments, the triplex-forming molecule is a peptide nucleic acid oligomer that includes the nucleic acid sequence TTCCTCT or TTJJTJT, preferably includes the sequence TTCCTCT or TTJJTJT linked to the sequence TCTCCTT, or more preferably includes the sequence TTCCTCT or TTJJTJT linked to the sequence TCTCCT-TAAACCTGT (SEQ ID NO:1) or TCTCCT-TAAACCTGTCTT (SEQ ID NO:2).

In more specific embodiments, the triplex-forming molecule is a peptide nucleic acid oligomer that includes the nucleic acid sequence:

```
                                        (SEQ ID NO: 3)
TTJJTJT-linker-TCTCCTTAAACCTGT;
or
                                        (SEQ ID NO: 4)
TTJJTJT-linker-TCTCCTTAAACCTGTCTT
``` wherein "linker" is a linker, typically a flexible linker, linking the Hoogsteen binding segment to the Watson-Crick binding segment. In some embodiments, the "linker" in one, two, three, four or more 8-amino-3,6-dioxaoctanoic acid, 6-aminohexanoic acid, or 8-amino-2, 6, 10-trioxaoctanoic acid moieties, or another linker molecule(s) disclosed elsewhere herein.

In some embodiments, the sequence includes one, two, three or more N-terminal or C-terminal non-binding residues, preferably positively charged residues, such as lysines.

In some embodiments, the PNA residues are unmodified. Thus, the PNA oligomer can be composed of PNA monomers that are free from modification. In some embodiments, one or more of the PNA modified, preferably at the gamma position. As discussed herein, the modification can be, for example, mini-PEG or serine.

In specific embodiments for correction of a Sickle Cell Disease Mutation, the triplex forming nucleic acid is a peptide nucleic acid oligomer including the sequence

```
                                          (SEQ ID NO: 6)
lys-lys-lys-TTJJTJT-OOO-T CT CC TT A A AC CT GT-lys-lys-lys;
or (SEQ ID NO: 6)
lys-lys-lys-TTJJTJT-OOO-TC TC CT TA AA CC TG T-lys-lys-lys;
or (SEQ ID NO: 6)
lys-lys-lys-TTJJ TJ T-OOO-TCTCCTTAAACCTGT-lyslys-lys;
or (SEQ ID NO: 6)
lys-lys-lys-TTJJ TJ T-OOO-T CT CC TT AA AC CT GT-lys-lys-lys;
or (SEQ ID NO: 5)
lys-lys-lys-TTJJTJT-OOO-T CT CC TT AA AC CT GT CT T-lys-lys-lys;
or (SEQ ID NO: 5)
lys-lys-lys-TTJJTJT-OOO-TC TC CT TA AA CC TG TC TT-lys-lys-lys;
or (SEQ ID NO: 5)
lys-lys-lys-TTJJ TJ T-OOO-TCTCCTTAAACCTGTCTTlys-lys-lys;
or (SEQ ID NO: 5)
lys-lys-lys-TTJJ TJ T-OOO-T CT CC TT AA A C CT GT CT T-lys-lys-lys
``` wherein the oligomer is free from γPNA modification, wherein one or more of the PNA residues in the Hoogsteen binding segment, the Watson Crick binding segment, or a combination thereof includes a substitution at the gamma (γ) position, or wherein the bolded and underlined residues are γ modified PNA residues, preferably wherein the γ modification is miniPEG or serine.

lys-lys-lys-TTJJTJT-OOO-TCTCCTTAAACCTGTCTT-lys-lys-lys (SEQ ID NO:5), wherein the oligomer is free from γPNA modification is referred to herein as "PNA 2", "tcPNA 2", and "SCD-tcPNA 2".

lys-lys-lys-TTJJTJT-OOO-c Cc CT Tc AA Ac Cc Gc C c T-lys-lys-lys (SEQ ID NO:5), wherein the bolded and underlined residues are γ modified PNA miniPEG is referred to herein as "PNA 2A", "tcPNA 2A", and "SCD-tcPNA 2A".

b. SCD-PNA 1 and Variants Thereof

In some embodiments, the triplex-forming molecule is a peptide nucleic acid oligomer that includes the nucleic acid sequence CCTCTTC or JJTJTTJ, preferably includes the sequence CCTCTTC or JJTJTTJ linked to the sequence CTTCTCC, or more preferably includes the sequence CCTCTTC or JJTJTTJ linked to the sequence CTTCTC-CACAGGAGT (SEQ ID NO:7) or CTTCTCCACAG-GAGTCAG (SEQ ID NO:8) or CTTCTCCACAG-GAGTCAGGTGC (SEQ ID NO:9).

In more specific embodiments, the triplex-forming molecule is a peptide nucleic acid oligomer that includes the nucleic acid sequence:

```
                                          (SEQ ID NO: 10)
    JJTJTTJ-linker-CTTCTCCACAGGAGT;
or (SEQ ID NO: 11)
    JJTJTTJ-linker-CTTCTCCACAGGAGTCAG;
or (SEQ ID NO: 12)
    JJTJTTJ-linker-CTTCTCCACAGGAGTCAGGTGC,
``` wherein "linker" is a linker, typically a flexible linker, linking the Hoogsteen binding segment to the Watson-Crick binding segment. In some embodiments, the "linker" in one, two, three, four or more 8-amino-3,6-dioxaoctanoic acid, 6-aminohexanoic acid, or 8-amino-2, 6, 10-trioxaoctanoic acid moieties, or another linker molecule(s) disclosed elsewhere herein.

In some embodiments, the sequence includes one, two, three or more N-terminal or C-terminal non-binding residues, preferably positively charged residues, such as lysines.

In some embodiments, the PNA residues are unmodified. Thus, the PNA oligomer can be composed of PNA monomers that are free from modification. In some embodiments, one or more of the PNA modified, preferably at the gamma position. As discussed herein, the modification can be, for example, mini-PEG or serine.

In specific embodiments for correction of Sickle Cell Disease Mutation, the triplex forming nucleic acid is a peptide nucleic acid oligomer including the sequence

```
                                          (SEQ ID NO: 13)
lys-lys-lys-JJTJTTJ-OOO-C TT CT CC AC AG G A GT-lys-lys-lys;
or (SEQ ID NO: 13)
lys-lys-lys-JJ TJ TTJ-OOO-CTTCTCCACAGGAGT-lyslys-lys;
or (SEQ ID NO: 14)
lys-lys-lys-JJTJTTJ-OOO-C TT CT CC AC AG G A GT CA G-lys-lys-lys;
or (SEQ ID NO: 14)
lys-lys-lys-JJTJTTJ-OOO-CT TC TC CA CA G G AG TC AG-lys-lys-lys;
or (SEQ ID NO: 14)
lys-lys-lys-JJTJTTJ-OOO-CTTCTCCACAGGAGTCAGlys-lys-lys;
or (SEQ ID NO: 14)
lys-lys-lys-JJ TJ TTJ-OOO-CTTCTCCACAGGAGTCAGlys-lys-lys;
or
```

-continued

```
                                         (SEQ ID NO: 14)
lys-lys-lys-JJ TJ TTJ-OOO-CTTCTCCACAGGAGTCAGlys-lys-lys;
or
                                         (SEQ ID NO: 15)
lys-lys-lys-JJTJTTJ-OOO-CT TC TC CA CA GG AG TC AG GT GC-lys-lys-lys;
or
                                         (SEQ ID NO: 15)
lys-lys-lys-JJTJTTJ-OOO-CTTCTCCACAGGAGTCAGGTGClys-lys-lys;
or
                                         (SEQ ID NO: 15)
lys-lys-lys-JJ TJ TTJ-OOO- CTTCTCCACAGGAGTCAGGTGC-lys-lys-lys;
or
                                         (SEQ ID NO: 15)
lys-lys-lys-JJ TJ TTJ-OOO-CTTCTCCACAGGAGTCAGG TGC-lys-lys-lys;
``` wherein the oligomer is free from γPNA modification, wherein one or more of the PNA residues in the Hoogsteen binding segment, the Watson Crick binding segment, or a combination thereof includes a substitution at the gamma (γ) position, or wherein the bolded and underlined residues are γ modified PNA residues, preferably wherein the γ modification is miniPEG or serine.

lys-lys-lys-JJTJTTJ-OOO-CTTCTCCACAGGAGT-CAG-lys-lys-lys (SEQ ID NO:14), wherein the oligomer is free from γPNA modification is referred to herein as "PNA 1", "tcPNA 1", and "SCD-tcPNA 1".

lys-lys-lys-JJTJTTJ-OOO-c Tt Ct Cc Ac Ag Ga Gc C a G-lys-lys-lys (SEQ ID NO:14), wherein the bolded and underlined residues are γ modified PNA miniPEG is referred to herein as "PNA 1A", "tcPNA 1A", and "SCD-tcPNA 1A".

c. SCD-PNA 3 and Variants Thereof

In some embodiments, the triplex-forming molecule is a peptide nucleic acid oligomer that includes the nucleic acid sequence TCTCTTCT or TJTJTTJT, preferably includes the sequence TCTCTTCT or TJTJTTJT linked to the sequence TCTTCTCT, or more preferably includes the sequence TCTCTTCT or TJTJTTJT linked to the sequence

```
                                         (SEQ ID NO: 16)
          TCTTCTCTGTCTCCAC
or
                                         (SEQ ID NO: 17)
          TCTTCTCTGTCTCCACAT.
```

In more specific embodiments, the triplex-forming molecule is a peptide nucleic acid oligomer that includes the nucleic acid sequence:

```
                                         (SEQ ID NO: 18)
     TJTJTTJT-linker-TCTTCTCTGTCTCCAC;
or
                                         (SEQ ID NO: 19)
     TJTJTTJT-linker-TCTTCTCTGTCTCCACAT,
``` wherein "linker" is a linker, typically a flexible linker, linking the Hoogsteen binding segment to the Watson-Crick binding segment. In some embodiments, the "linker" in one, two, three, four or more 8-amino-3,6-dioxaoctanoic acid, 6-aminohexanoic acid, or 8-amino-2, 6, 10-trioxaoctanoic acid moieties, or another linker molecule(s) disclosed elsewhere herein.

In some embodiments, the sequence includes one, two, three or more N-terminal or C-terminal non-binding residues, preferably positively charged residues, such as lysines.

In some embodiments, the PNA residues are unmodified. Thus, the PNA oligomer can be composed of PNA monomers that are free from modification. In some embodiments, one or more of the PNA modified, preferably at the gamma position. As discussed herein, the modification can be, for example, mini-PEG or serine.

In specific embodiments for correction of Sickle Cell Disease Mutation, the triplex forming nucleic acid is a peptide nucleic acid oligomer including the sequence

```
                                         (SEQ ID NO: 20)
lys-lys-lys-TJTJTTJT-OOO-TC TT CT CT GT CT CC AC-lys-lys-lys;
or
                                         (SEQ ID NO: 20)
lys-lys-lys-TJTJTTJT-OOO-T CT TC TC TG TC TC CA C-lys-lys-lys;
or
                                         (SEQ ID NO: 20)
lys-lys-lys-TJ TJ TTJ T-OOO-TCTTCTCTGTCTCCA C-lys-lys-lys;
or
                                         (SEQ ID NO: 21)
lys-lys-lys-TJTJTTJT-OOO-TC TT CT CT GT CT CC AC AT-lys-lys-lys;
or
                                         (SEQ ID NO: 21)
lys-lys-lys-TJTJTTJT-OOO-T CT TC TC TG TC TC CA CA-T-lys-lys-lys;
or
                                         (SEQ ID NO: 21)
lys-lys-lys-TJ TJ TTJ T-OOO-TCTTCTCTGTCTCCAC AT-lys-lys-lys;
``` wherein the oligomer is free from γPNA modification, wherein one or more of the PNA residues in the Hoogsteen binding segment, the Watson Crick binding segment, or a combination thereof includes a substitution at the gamma (γ) position, or wherein the bolded and underlined residues are γ modified PNA residues, preferably wherein the γ modification is miniPEG or serine.

lys-lys-lys-TJTJTTJT-OOO-TCTTCTCTGTCTCCA-CAT-lys-lys-lys (SEQ ID NO:21), wherein the oligomer is free from γPNA modification is referred to herein as "PNA 3", "tcPNA 3", and "SCD-tcPNA 3".

lys-lys-lys-TJTJTTJT-OOO-t Ct Tc Tc Tg Tc Tc Ca C a T-lys-lys-lys (SEQ ID NO:21), wherein the bolded and underlined residues are γ modified PNA miniPEG is referred to herein as "PNA 3A", "tcPNA 3A", and "SCD-tcPNA 3A".

B. Donor Oligonucleotides

1. Composition of Donor Oligonucleotides

In some embodiments, the composition includes or is administered in combination with a donor oligonucleotide. The donor oligonucleotide can be encapsulated or entrapped in the same or different particles from other active agents such as the triplex forming composition. Generally, in the case of gene editing, the donor oligonucleotide includes a sequence that can correct a mutation(s) in the host genome, though in some embodiments, the donor introduces a mutation that can, for example, reduce expression of an oncogene or a receptor that facilitates HIV infection. In addition to containing a sequence designed to introduce the desired correction or mutation, the donor oligonucleotide may also contain synonymous (silent) mutations (e.g., 2 to 10). The additional silent mutations can facilitate detection of the corrected target sequence using allele-specific PCR of genomic DNA isolated from treated cells. Triplex-forming composition and other gene editing compositions such as those discussed above can increase the rate of recombination of the donor oligonucleotide in the target cells relative to administering donor alone.

The triplex forming molecules including peptide nucleic acids may be administered in combination with, or tethered to, a donor oligonucleotide via a mixed sequence linker or used in conjunction with a non-tethered donor oligonucleotide that is substantially homologous to the target sequence. Triplex-forming molecules can induce recombination of a donor oligonucleotide sequence up to several hundred base pairs away. It is preferred that the donor oligonucleotide sequence targets a region between 0 to 800 bases from the target binding site of the triplex-forming molecules. In some embodiments, the donor oligonucleotide sequence targets a region between 25 to 75 bases from the target binding site of the triplex-forming molecules. In some embodiments, the donor oligonucleotide sequence targets a region about 50 nucleotides from the target binding site of the triplex-forming molecules.

The donor sequence can contain one or more nucleic acid sequence alterations compared to the sequence of the region targeted for recombination, for example, a substitution, a deletion, or an insertion of one or more nucleotides. Successful recombination of the donor sequence results in a change of the sequence of the target region. Donor oligonucleotides are also referred to herein as donor fragments, donor nucleic acids, donor DNA, or donor DNA fragments. This strategy exploits the ability of a triplex to provoke DNA repair, potentially increasing the probability of recombination with the homologous donor DNA. It is understood in the art that a greater number of homologous positions within the donor fragment will increase the probability that the donor fragment will be recombined into the target sequence, target region, or target site. Tethering of a donor oligonucleotide to a triplex-forming molecule facilitates target site recognition via triple helix formation while at the same time positioning the tethered donor fragment for possible recombination and information transfer. Triplex-forming molecules also effectively induce homologous recombination of non-tethered donor oligonucleotides. The term "recombinagenic" as used herein, is used to define a DNA fragment, oligonucleotide, peptide nucleic acid, or composition as being able to recombine into a target site or sequence or induce recombination of another DNA fragment, oligonucleotide, or composition.

Non-tethered or unlinked fragments may range in length from 20 nucleotides to several thousand. The donor oligonucleotide molecules, whether linked or unlinked, can exist in single stranded or double stranded form. The donor fragment to be recombined can be linked or un-linked to the triplex forming molecules. The linked donor fragment may range in length from 4 nucleotides to 100 nucleotides, preferably from 4 to 80 nucleotides in length. However, the unlinked donor fragments have a much broader range, from 20 nucleotides to several thousand. In one embodiment the oligonucleotide donor is between 25 and 80 nucleobases. In a further embodiment, the non-tethered donor oligonucleotide is about 50 to 60 nucleotides in length.

The donor oligonucleotides may contain at least one mutated, inserted or deleted nucleotide relative to the target DNA sequence. Target sequences can be within the coding DNA sequence of the gene or within introns. Target sequences can also be within DNA sequences which regulate expression of the target gene, including promoter or enhancer sequences or sequences that regulate RNA splicing.

The donor oligonucleotides can contain a variety of mutations relative to the target sequence. Representative types of mutations include, but are not limited to, point mutations, deletions and insertions. Deletions and insertions can result in frameshift mutations or deletions. Point mutations can cause missense or nonsense mutations. These mutations may disrupt, reduce, stop, increase, improve, or otherwise alter the expression of the target gene.

Compositions including triplex-forming molecules such as tcPNA may include one or more than one donor oligonucleotides. More than one donor oligonucleotides may be administered with triplex-forming molecules in a single transfection, or sequential transfections. Use of more than one donor oligonucleotide may be useful, for example, to create a heterozygous target gene where the two alleles contain different modifications.

Donor oligonucleotides are preferably DNA oligonucleotides, composed of the principal naturally-occurring nucleotides (uracil, thymine, cytosine, adenine and guanine) as the heterocyclic nucleobases, deoxyribose as the sugar moiety, and phosphate ester linkages. Donor oligonucleotides may include modifications to nucleobases, sugar moieties, or backbone/linkages, as described above, depending on the desired structure of the replacement sequence at the site of recombination or to provide some resistance to degradation by nucleases. One exemplary modification is a thiophosphate ester linkage. Modifications to the donor oligonucleotide should not prevent the donor oligonucleotide from successfully recombining at the recombination target sequence in the presence of triplex-forming molecules.

2. Donors Sequence for Correction of SCD Mutation

In some embodiments, a Sickle Cell Disease mutation can be corrected using a donor having the sequence
5'CTTGCCCCACAGGGCAGTAACGGCAGATTTTTC T̲T̲C̲ CGG CGTTAAATGCACCATGGTGTCTGTTT-GAGGT 3' (SEQ ID NO:24), or a functional fragment thereof that is suitable and sufficient to correct a mutation, wherein the three boxed nucleotides represent the corrected codon 6 which reverts the mutant Valine (associated with human sickle cell disease) back to the wildtype Glutamic acid and nucleotides in bold font (without underlining) represent changes to the genomic DNA but not to the encoded amino acid; or
5'ACAGACACCATGGTGCACCTGACTCCTG A̲GGAGAAGTCT GCCGTTACTGCC 3' (SEQ ID NO:23), or a functional fragment thereof that is suitable and sufficient to correct a mutation, wherein the bolded and underlined residue is the correction, or 5'T(s)T(s)G(s)CCC-CACAGGGCAGTAACGGCAGACTTCTCCTC AGG A̲GTCAGGTGCACCATGGTGTCTGT(s)T(s)T(s)G3' (SEQ ID NO:22), or a functional fragment thereof that is suitable and sufficient to correct a mutation, wherein the bolded and underlined residue is the correction and "(s)" indicates an optional phosphorothiate internucleoside linkage.

C. Nucleobase, Sugar, and Linkage Modifications

Any of the triplex-forming molecules, including PNAs, components thereof, donor oligonucleotides, or other nucleic acids disclosed herein can include one or more modifications or substitutions to the nucleobases or linkages. Although modifications are particularly preferred for use with triplex-forming technologies and typically discussed below with reference thereto, any of the modifications can be utilized in the construction of any of the gene editing compositions, donor, nucleotides, etc. Modifications should not prevent, but preferably enhance the activity, persistence, or function of the gene editing technology. For example, modifications to oligonucleotides for use as triplex-forming molecules should not prevent, but preferably enhance duplex invasion, strand displacement, and/or stabilize triplex formation as described above by increasing specificity or binding affinity of the triplex-forming molecules to the target site. Modified bases and base analogues, modified sugars and sugar analogues and/or various suitable linkages known in the art are also suitable for use in the molecules disclosed herein. Several preferred oligonucleotide compositions including PNA, and modification thereof particularly at the γ position in the PNA backbone, are discussed above. Additional modifications are discussed in more detail below.

1. Nucleobases

The principal naturally-occurring nucleotides include uracil, thymine, cytosine, adenine and guanine as the heterocyclic nucleobases. Gene editing molecules can include chemical modifications to their nucleotide constituents. For example, target sequences with adjacent cytosines can be problematic. Triplex stability is greatly compromised by runs of cytosines, thought to be due to repulsion between the positive charge resulting from the $N^3$ protonation or perhaps because of competition for protons by the adjacent cytosines. Chemical modification of nucleotides including triplex-forming molecules such as PNAs may be useful to increase binding affinity of triplex-forming molecules and/or triplex stability under physiologic conditions.

Chemical modifications of nucleobases or nucleobase analogs may be effective to increase the binding affinity of a nucleotide or its stability in a triplex. Chemically-modified nucleobases include, but are not limited to, inosine, 5-(1-propynyl) uracil (pU), 2-thio uracil, 5-(1-propynyl) cytosine (pC), 5-methylcytosine, 8-oxo-adenine, 2,6-diaminopurine, pseudocytosine, pseudoisocytosine, 5 and 2-amino-5-(2'-deoxy-β-D-ribofuranosyl)pyridine (2-aminopyridine), and various pyrrolo- and pyrazolopyrimidine derivatives. Substitution of 5-methylcytosine or pseudoisocytosine for cytosine in triplex-forming molecules such as PNAs helps to stabilize triplex formation at neutral and/or physiological pH, especially in triplex-forming molecules with isolated cytosines.

2. Backbone

The nucleotide residues of the triplex-forming molecules are connected by an internucleotide bond that refers to a chemical linkage between two nucleoside moieties. Unmodified peptide nucleic acids (PNAs) are synthetic DNA mimics in which the phosphate backbone of the oligonucleotide is replaced in its entirety by repeating N-(2-aminoethyl)-glycine units that are linked by amide bonds. The various nucleobases are linked to the backbone by methylene carbonyl bonds, which allow them to form PNA-DNA or PNA-RNA duplexes via Watson-Crick base pairing with high affinity and sequence-specificity. PNAs maintain spacing of nucleobases that is similar to conventional DNA oligonucleotides, but are achiral and neutrally charged molecules. Peptide nucleic acids are composed of peptide nucleic acid residues.

Other backbone modifications, particularly those relating to PNAs, include peptide and amino acid variations and modifications. Thus, the backbone constituents of PNAs may be peptide linkages, or alternatively, they may be non-peptide linkages. Examples include acetyl caps, amino spacers such as 8-amino-3,6-dioxaoctanoic acid (referred to herein as 0-linkers), amino acids such as lysine are particularly useful if positive charges are desired in the PNA, and the like. Methods for the chemical assembly of PNAs are well known. See, for example, U.S. Pat. Nos. 5,539,082, 5,527,675, 5,623,049, 5,714,331, 5,736,336, 5,773,571 and 5,786,571.

Backbone modifications used to generate triplex-forming molecules should not prevent the molecules from binding with high specificity to the target site and creating a triplex with the target duplex nucleic acid by displacing one strand of the target duplex and forming a clamp around the other strand of the target duplex.

3. Modified Nucleic Acids

Modified nucleic acids in addition to peptide nucleic acids are also useful as triplex-forming molecules. Oligonucleotides are composed a chain of nucleotides which are linked to one another. Canonical nucleotides typically are composed of a nucleobase (nucleic acid base), a sugar moiety attached to the heterocyclic base, and a phosphate moiety which esterifies a hydroxyl function of the sugar moiety. The principal naturally-occurring nucleotides include uracil, thymine, cytosine, adenine and guanine as the heterocyclic nucleobases, and ribose or deoxyribose sugar linked by phosphodiester bonds. As used herein "modified nucleotide" or "chemically modified nucleotide" defines a nucleotide that has a chemical modification of one or more of the nucleobase, sugar moiety or phosphate moiety constituents. Preferably the charge of the modified nucleotide is reduced compared to DNA or RNA oligonucleotides of the same nucleobase sequence. Most preferably the triplex-forming molecules have low negative charge, no charge, or positive charge such that electrostatic repulsion with the nucleotide duplex at the target site is reduced compared to DNA or RNA oligonucleotides with the corresponding nucleobase sequence.

Examples of modified nucleotides with reduced charge include modified internucleotide linkages such as phosphate analogs having achiral and uncharged intersubunit linkages (e.g., Sterchak, E. P. et al., *Organic Chem.*, 52:4202, (1987)), and uncharged morpholino-based polymers having achiral intersubunit linkages (see, e.g., U.S. Pat. No. 5,034,506). Some internucleotide linkage analogs include morpholidate, acetal, and polyamide-linked heterocycles. Locked nucleic acids (LNA) are modified RNA nucleotides (see, for example, Braasch, et al., *Chem. Biol.*, 8(1):1-7 (2001)). LNAs form hybrids with DNA which are more stable than DNA/DNA hybrids, a property similar to that of peptide nucleic acid (PNA)/DNA hybrids. Therefore, LNA can be used just as PNA molecules would be except they have a negatively charged backbone, whereas PNAs generally have a neutrally charged backbone (although certain amino acid side chain modifications can alter the backbone charge). LNA binding efficiency can be increased in some embodiments by adding positive charges to it. Commercial nucleic acid synthesizers and standard phosphoramidite chemistry can be used to make LNAs.

Molecules may also include nucleotides with modified nucleobases, sugar moieties or sugar moiety analogs. Modified nucleotides may include modified nucleobases or base analogs as described above with respect to peptide nucleic acids. Sugar moiety modifications include, but are not limited to, 2'-O-aminoethoxy, 2'-O-amonioethyl (2'-OAE), 2'-O-methoxy, 2'-O-methyl, 2-guanidoethyl (2'-OGE), 2'-O, 4'-C-methylene (LNA), 2'-O-(methoxyethyl) (2'-OME) and 2'-O—(N-(methyl)acetamido) (2'-OMA). 2'-O-aminoethyl sugar moiety substitutions are especially preferred because they are protonated at neutral pH and thus suppress the charge repulsion between the triplex-forming molecule and the target duplex. This modification stabilizes the C3'-endo conformation of the ribose or deoxyribose and also forms a bridge with the i-1 phosphate in the purine strand of the duplex.

D. Gene Editing Potentiating Factors

In some embodiments, the compositions and methods include a potentiating factor. The potentiating factors can be used with any triplex-forming peptide nucleic acids including, but not limited, that sequences expressly provided herein.

Accordingly, compositions and methods of increasing the efficacy of gene editing technology are provided. As used herein a "gene editing potentiating factor" or "gene editing potentiating agent" or "potentiating factor or "potentiating agent" refers a compound that increases the efficacy of editing (e.g., mutation, including insertion, deletion, substitution, etc.) of a gene, genome, or other nucleic acid) by a gene editing technology relative to use of the gene editing technology in the absence of the compound. Preferred gene editing technologies suitable for use alone or more preferably in combination with the potentiating factors are discussed in more detail below. In some embodiments, the potentiating factor is administered as a nucleic acid encoding the potentiating factor. In certain preferred embodiments, the gene editing technology is a triplex-forming γPNA oligomer and donor DNA, optionally, but preferably in a particle composition.

Potentiating factors include, for example, DNA damage or repair-stimulating or -potentiating factors. Preferably the factor is one that engages one or more endogenous high fidelity DNA repair pathways. In some embodiments, the factor is one that modulates expression of Rad51, BRCA2, or a combination thereof. In particular embodiments, the factor decreases Rad51 activity.

As discussed in more detail below, the preferred methods typically include contacting cells with an effective amount of a gene editing potentiating factor. The contacting can occur ex vivo, for example isolated cells, or in vivo following, for example, administration of the potentiating factor to a subject. Exemplary gene editing potentiating agents include receptor tyrosine kinase C-kit ligands, ATR-Chk1 cell cycle checkpoint pathway inhibitors, a DNA polymerase alpha inhibitors, and heat shock protein 90 inhibitors (HSP90i).

In some embodiments, the C-kit ligand is stem cell factor protein or fragment thereof sufficient to causes dimerization of C-kit and activates its tyrosine kinase activity. The C-kit ligand can be a nucleic acid encoding a stem cell factor (SCF) protein or fragment thereof sufficient to causes dimerization of C-kit and activates its tyrosine kinase activity. The nucleic acid can be an mRNA or an expression vector. The SCF can be human SCF or a fragment or variant thereof.

In some embodiments, the potentiating agent is another cytokine or growth factor such as, erythropoietin, GM-CSF, EGF (especially for epithelial cells; lung epithelia for cystic fibrosis), hepatocyte growth factor etc., could similarly serve to boost gene editing potential in bone marrow cells or in other tissues. In some embodiments, gene editing is enhanced in specific cell types using cytokines targeted to these cell types.

It will be appreciated that cytokines and growth factors including SCF can be administered to cells or a subject as protein, or as a nucleic acid encoding protein (transcribed RNA, DNA, DNA in an expression vector). For example, a sequence encoding a protein or growth factor such as SCF can be incorporated into an autonomously replicating plasmid, a virus (e.g., a retrovirus, lentivirus, adenovirus, or herpes virus), or into the genomic DNA of a prokaryote or eukaryote.

In some embodiments, the potentiating factor is a replication modulator that can, for example, manipulate replication progression and/or replication forks. For example, the ATR-Chk1 cell cycle checkpoint pathway has numerous roles in protecting cells from DNA damage and stalled replication, one of the most prominent being control of the cell cycle and prevention of premature entry into mitosis (Thompson and Eastman, *Br J Clin Pharmacol.*, 76(3): 358-369 (2013), Smith, et al., *Adv Cancer Res.*, 108:73-112 (2010)). However, Chk1 also contributes to the stabilization of stalled replication forks, the control of replication origin firing and replication fork progression, and homologous recombination. DNA polymerase alpha also known as Pol a is an enzyme complex found in eukaryotes that is involved in initiation of DNA replication. Hsp90 (heat shock protein 90) is a chaperone protein that assists other proteins to fold properly, stabilizes proteins against heat stress, and aids in protein degradation.

Experimental results show that inhibitors of CHK1 and ATR in the DNA damage response pathway, as well as DNA polymerase alpha inhibitors and HSP90 inhibitors, substantially boost gene editing by triplex-forming PNAs and single-stranded donor DNA oligonucleotides. Accordingly, in some embodiments, the potentiating factor is a CHK1 or ATR pathway inhibitor, a DNA polymerase alpha inhibitor, or an HSP90 inhibitor. The inhibitor can be a functional nucleic acid, for example siRNA, miRNA, aptamers, ribozymes, triplex forming molecules, RNAi, or external guide sequences that targets CHK1, ATR, or another molecule in the ATR-Chk1 cell cycle checkpoint pathway; DNA polymerase alpha; or HSP90 and reduces expression or active of ATR, CHK1, DNA polymerase alpha, or HSP90.

Preferably, the inhibitor is a small molecule. For example, the potentiating factor can be a small molecule inhibitor of ATR-Chk1 Cell Cycle Checkpoint Pathway Inhibitor. Such inhibitors are known in the art, and many have been tested in clinical trials for the treatment of cancer. Exemplary CHK1 inhibitors include, but are not limited to, AZD7762, SCH900776/MK-8776, IC83/LY2603618, LY2606368, GDC-0425, PF-00477736, XL844, CEP-3891, SAR-020106, CCT-244747, Arry-575 (Thompson and Eastman, *Br J Clin Pharmacol.*, 76(3): 358-369 (2013)), and SB218075. Exemplary ATR pathway inhibitors include, but are not limited to Schisandrin B, NU6027, NVP-BEZ235, VE-821, VE-822 (VX-970), AZ20, AZD6738, MIRIN, KU5593, VE-821, NU7441, LCA, and L189 (Weber and Ryan, *Pharmacology & Therapeutics,* 149:124-138 (2015)).

In some embodiments, the potentiating factor is a DNA polymerase alpha inhibitor, such as aphidicolin.

In some embodiments, the potentiating factor is a heat shock protein 90 inhibitor (HSP90i) such as STA-9090 (ganetespib). Other HSP90 inhibitors are known in the art and include, but are not limited to, benzoquinone ansamycin antibiotics such as geldanamycin (GA); 17-AAG (17-Allylamino-17-demethoxy-geldanamycin); 17-DMAG (17-dimethylaminoethylamino-17-demethoxy-geldanamycin) (Alvespimycin); IPI-504 (Retaspimycin); and AUY922 (Tatokoro, et al., *EXCLI J.*, 14:48-58 (2015)).

In some embodiments, the potentiating agent is simulator or inhibitor of Rad51. The examples below illustrate that treatment of cells with B0-2 and RS-2, known inhibitors of RAD51, increased gene editing frequencies to levels as high as ~12%, from ~7% (NP only). RI-1, an irreversible inhibitor of RAD51, showed higher levels of editing at a 1 uM dose, but reduced levels at a 10 uM dose. RS-1, a stimulator of RAD51, reduced editing frequencies at a 1 µM dose, but showed higher levels of editing at a 10 µM dose. SCR-7, an inhibitor of DNA Ligase IV, decreased PNA-mediated gene editing at 1 and 10 µM doses. See, FIG. 11.

In some embodiments, the potentiating agent is a histone deacetylase inhibitor. The inhibitor can be, for example, a Class I, II, III, or Class IV HDAC inhibitor. The inhibitor can act by binding to the zinc-containing catalytic domain of the HDACs. Examples include, but are not limited to, hydroxamic acids (or hydroxamates), such as trichostatin A, cyclic tetrapeptides (such as trapoxin B), and the depsipeptides, benzamides, electrophilic ketones, and the aliphatic acid compounds such as phenylbutyrate and valproic acid. Other HDAC inhibitors include, for example, sirtuins, the hydroxamic acids vorinostat (SAHA), belinostat (PXD101), LAQ824, and panobinostat (LBH589); and the benzamides: entinostat (MS-275), tacedinaline (CI994), and mocetinostat (MGCD0103).

In particular embodiments, the HDAC inhibitor is vorinostat (ZOLINZA®), which is approved by the FDA for the treatment of cutaneous T-cell lymphoma (Glaser KB, *Biochem. Pharmacol.*, 74:659-671 (2007)).

In some embodiments, the potentiating agent is selected from 2,4-Pyridinedicarboxylic Acid, Garcinol, Splitomycin, BML-210, Apicidin, Suberoyl bis Hydroxamic acid, Scriptaid, Nullscript, 5-Aza-2-deoxycitidine, Zebularine, ITSA1, Phenylbutyrate Na, Tranylcypromine, Valproic acid, EX-527, Resveratrol, M-344, Nicotinamide, BML-266, Piceatannol, AGK2, Salermide, MC-1293, Anacardic acid, B2, BIX-01294, Butyrolactone 3, CTPB, Oxamflatin, Sirtinol, NCH-51, CI-994, NSC-3852, Aminoresveratrol, BML-281, Triacetylresveratrol, Trichostatin A, Iso-Nicotinamide, Valproxam, BML-278, SAHA, Fluoro-SAHA, and Suramin Na.

E. Particle Delivery Vehicles

The compositions can include a biodegradable or bioerodible material in which the triplex-forming molecule is embedded or encapsulated.

The particles can be capable of controlled release of the active agent. The particles can be microparticle(s) and/or nanoparticle(s). The particles can include one or more polymers. One or more of the polymers can be a synthetic polymer. The particle or particles can be formed by, for example, single emulsion technique or double emulsion technique or nanoprecipitation.

The disclosed particles can be used with any triplex-forming peptide nucleic acids including, but not limited, that sequences expressly provided herein.

In some embodiments, some of the compositions are packaged in particles and some are not. For example, a triplex-forming molecule and/or donor oligonucleotide can be incorporated into particles while a co-administered potentiating factor is not. In some embodiments, a triplex-forming molecule and/or donor oligonucleotide and a potentiating factor are both packaged in particles. Different compositions can be packaged in the same particles or different particles. For example, two or more active agents can be mixed and packaged together. In some embodiments, the different compositions are packaged separately into separate particles wherein the particles are similarly or identically composed and/or manufactured. In some embodiments, the different compositions are packaged separately into separate particles wherein the particles are differentially composed and/or manufactured.

The delivery vehicles can be nanoscale compositions, for example, 0.5 nm up to, but not including, about 1 micron. In some embodiments, and for some uses, the particles can be smaller, or larger. Thus, the particles can be microparticles, supraparticles, etc. For example, particle compositions can be between about 1 micron to about 1000 microns. Such compositions can be referred to as microparticulate compositions.

Nanoparticles generally refers to particles in the range of less than 0.5 nm up to, but not including, 1,000 nm. In some embodiments, the nanoparticles have a diameter between 500 nm to less than 0.5 nm, or between 50 and 500 nm, or between 50 and 300 nm. Cellular internalization of polymeric particles can highly dependent upon their size, with nanoparticulate polymeric particles being internalized by cells with much higher efficiency than microparticulate polymeric particles. For example, Desai, et al. have demonstrated that about 2.5 times more nanoparticles that are 100 nm in diameter are taken up by cultured Caco-2 cells as compared to microparticles having a diameter on 1 µM (Desai, et al., *Pharm. Res.*, 14:1568-73 (1997)). Nanoparticles also have a greater ability to diffuse deeper into tissues in vivo.

The particles can have a mean particle size. Mean particle size generally refers to the statistical mean particle size (diameter) of the particles in the composition. Two populations can be said to have a substantially equivalent mean particle size when the statistical mean particle size of the first population of particles is within 20% of the statistical mean particle size of the second population of particles; more preferably within 15%, most preferably within 10%.

The weight average molecular weight can vary for a given polymer but is generally from about 1000 Daltons to 1,000, 000 Daltons, 1000 Daltons to 500,000 Dalton, 1000 Daltons to 250,000 Daltons, 1000 Daltons to 100,000 Daltons, 5,000 Daltons to 100,000 Daltons, 5,000 Daltons to 75,000 Daltons, 5,000 Daltons to 50,000 Daltons, or 5,000 Daltons to 25,000 Daltons.

Particles are can be formed of one or more polymers. Exemplary polymers are discussed below. Copolymers such as random, block, or graft copolymers, or blends of the polymers listed below can also be used.

Functional groups on the polymer can be capped to alter the properties of the polymer and/or modify (e.g., decrease or increase) the reactivity of the functional group. For example, the carboxyl termini of carboxylic acid contain polymers, such as lactide- and glycolide-containing polymers, may optionally be capped, e.g., by esterification, and the hydroxyl termini may optionally be capped, e.g. by etherification or esterification.

Copolymers of PEG or derivatives thereof with any of the polymers described below may be used to make the polymeric particles. In certain embodiments, the PEG or derivatives may be located in the interior positions of the copolymer. Alternatively, the PEG or derivatives may locate near or at the terminal positions of the copolymer. For example, one or more of the polymers above can be terminated with a block of polyethylene glycol. In some embodiments, the core polymer is a blend of pegylated polymer and non-pegylated polymer, wherein the base polymer is the same (e.g., PLGA and PLGA-PEG) or different (e.g., PLGA-PEG and PLA). In certain embodiments, the microparticles or nanoparticles are formed under conditions that allow regions of PEG to phase separate or otherwise locate to the surface of the particles. The surface-localized PEG regions alone may perform the function of, or include, the surface-altering agent. In particular embodiments, the particles are prepared from one or more polymers terminated with blocks of polyethylene glycol as the surface-altering material.

In some embodiments, the particles may be used as nucleic acid carriers. In these embodiments, the particles can be formed of one or more cationic polymers which complex with one or more negatively charged nucleic acids.

The cationic polymer can be any synthetic or natural polymer bearing at least two positive charges per molecule and having sufficient charge density and molecular size to bind to nucleic acid under physiological conditions (i.e., pH and salt conditions encountered within the body or within cells). In certain embodiments, the polycationic polymer contains one or more amine residues.

Suitable cationic polymers include, for example, polyethylene imine (PEI), polyallylamine, polyvinylamine, polyvinylpyridine, aminoacetalized poly(vinyl alcohol), acrylic or methacrylic polymers (for example, poly(N,N-dimethylaminoethylmethacrylate)) bearing one or more amine residues, polyamino acids such as polyornithine, polyarginine, and polylysine, protamine, cationic polysaccharides such as chitosan, DEAE-cellulose, and DEAE-dextran, and polyamidoamine dendrimers (cationic dendrimer), as well as copolymers and blends thereof. In some embodiments, the polycationic polymer is poly(amine-co-ester), poly(amine-co-amide) polymer, or poly(amine-co-ester-co-ortho ester).

Cationic polymers can be either linear or branched, can be either homopolymers or copolymers, and when containing amino acids can have either L or D configuration, and can have any mixture of these features. Preferably, the cationic polymer molecule is sufficiently flexible to allow it to form a compact complex with one or more nucleic acid molecules.

In some embodiments, the cationic polymer has a molecular weight of between about 5,000 Daltons and about 100,000 Daltons, more preferably between about 5,000 and about 50,000 Daltons, most preferably between about 10,000 and about 35,000 Daltons.

In particular embodiments, the particles include a hydrophobic polymer, poly(amine-co-ester), poly(amine-co-amide) polymer, or poly(amine-co-ester-co-ortho ester), and optionally, but a shell of, for example, PEG. The core-shell particles can be formed by a co-block polymer. Exemplary polymers are provided below.

1. Exemplary Hydrophobic Polymers

The polymer that forms the core of the particle may be any biodegradable or non-biodegradable synthetic or natural polymer. In a preferred embodiment, the polymer is a biodegradable polymer.

Particles are ideal materials for the fabrication of gene editing delivery vehicles: 1) control over the size range of fabrication, down to 100 nm or less, an important feature for passing through biological barriers; 2) reproducible biodegradability without the addition of enzymes or cofactors; 3) capability for sustained release of encapsulated, protected nucleic acids over a period in the range of days to months by varying factors such as the monomer ratios or polymer size, for example, the ratio of lactide to glycolide monomer units in poly(lactide-co-glycolide) (PLGA); 4) well-understood fabrication methodologies that offer flexibility over the range of parameters that can be used for fabrication, including choices of the polymer material, solvent, stabilizer, and scale of production; and 5) control over surface properties facilitating the introduction of modular functionalities into the surface.

Any number of biocompatible polymers can be used to prepare the particles. In one embodiment, the biocompatible polymer(s) is biodegradable. In another embodiment, the particles are non-degradable. In other embodiments, the particles are a mixture of degradable and non-degradable particles.

Examples of preferred biodegradable polymers include synthetic polymers that degrade by hydrolysis such as poly(hydroxy acids), such as polymers and copolymers of lactic acid and glycolic acid, other degradable polyesters, polyanhydrides, poly(ortho)esters, polyesters, polyurethanes, poly(butyric acid), poly(valeric acid), poly(caprolactone), poly(hydroxyalkanoates), poly(lactide-co-caprolactone), and poly(amine-co-ester) polymers, such as those described in Zhou, et al., *Nature Materials,* 11(1):82-90 (2011), Cui, et al. *Nature Communications,* 8:191 (2017) doi:10.1038/s41467-017-00297-x, and WO 2013/082529, U.S. Published Application No. 2014/0342003, and PCT/US2015/061375.

Preferred natural polymers include alginate and other polysaccharides, collagen, albumin and other hydrophilic proteins, zein and other prolamines and hydrophobic proteins, copolymers and mixtures thereof. In general, these materials degrade either by enzymatic hydrolysis or exposure to water in vivo, by surface or bulk erosion.

Exemplary polymers include, but are not limited to, cyclodextrin-containing polymers, in particular cationic cyclodextrin-containing polymers, such as those described in U.S. Pat. No. 6,509,323.

In some embodiments, non-biodegradable polymers can be used, especially hydrophobic polymers. Examples of preferred non-biodegradable polymers include ethylene vinyl acetate, poly(meth)acrylic acid, copolymers of maleic anhydride with other unsaturated polymerizable monomers, poly(butadiene maleic anhydride), polyamides, copolymers and mixtures thereof, and dextran, cellulose and derivatives thereof.

Other suitable biodegradable and non-biodegradable polymers include, but are not limited to, polyanhydrides, polyamides, polycarbonates, polyalkylenes, polyalkylenes such as polyethylene and polypropylene, polyalkylene glycols such as poly(ethylene glycol) (PEG), polyalkylene oxides (PEO), polyalkylene terephthalates such as poly(ethylene terephthalate) and ethylene vinyl acetate polymer (EVA), polyvinyl alcohols, polyvinyl ethers, polyvinyl esters such as poly(vinyl acetate), polyethylene, polypropylene, poly(vinyl acetate), poly vinyl chloride, polystyrene, polyvinyl halides such as poly(vinyl chloride) (PVC), polyvinylpyrrolidone, polysiloxanes, polyvinylpyrrolidone, polymers of acrylic and methacrylic esters, polysiloxanes, polyurethanes and copolymers thereof, modified celluloses, alkyl cellulose, hydroxyalkyl celluloses, cellulose ethers, cellulose esters, nitro celluloses, hydroxypropylcellulose, cellulose acetate, cellulose propionate, cellulose acetate butyrate, cellulose acetate phthalate, carboxyethyl cellulose, cellulose triacetate, cellulose sulfate sodium salt, and polyacrylates such as poly(methyl methacrylate), poly(ethylmethacrylate), poly(2-hydroxyethyl methacrylate) (pHEMA), poly(butylmethacrylate), poly(isobutylmethacrylate), poly(hexylmethacrylate), poly(isodecylmethacrylate), poly(lauryl methacrylate), poly(phenyl methacrylate), poly(methyl acrylate), poly(isopropyl acrylate), poly(isobutyl acrylate), poly(octadecyl acrylate). These materials may be used alone, as physical mixtures (blends), or as co-polymers.

The polymer may be a bioadhesive polymer that is hydrophilic or hydrophobic. Hydrophilic polymers include CARBOPOL™ (a high molecular weight, crosslinked, acrylic acid-based polymers such as those manufactured by NOVEON™), polycarbophil, cellulose esters, and dextran. Polymers of acrylic acids, include, but are not limited to, poly(methyl(meth)acrylate) (PMMA), poly(ethyl(meth)acrylate), poly(butyl(meth)acrylate), poly(isobutyl(meth)acrylate), poly(hexyl(meth)acrylate), poly(isodecyl(meth)acrylate), poly(lauryl(meth)acrylate), poly(phenyl(meth)acrylate), poly(methyl acrylate), poly(isopropyl acrylate), poly(isobutyl acrylate), and poly(octadecyl acrylate) (jointly referred to herein as "polyacrylic acids").

Release rate controlling polymers may be included in the polymer matrix or in the coating on the formulation. Examples of rate controlling polymers that may be used are hydroxypropylmethylcellulose (HPMC) with viscosities of either 5, 50, 100 or 4000 cps or blends of the different viscosities, ethylcellulose, methylmethacrylates, such as EUDRAGIT® RS100, EUDRAGIT® RL100, EUDRAGIT® NE 30D (supplied by Rohm America). Gastrosoluble polymers, such as EUDRAGIT® E100 or enteric polymers such as EUDRAGIT® L100-55D, L100 and 5100 may be blended with rate controlling polymers to achieve pH dependent release kinetics. Other hydrophilic polymers such as alginate, polyethylene oxide, carboxymethylcellulose, and hydroxyethylcellulose may be used as rate controlling polymers.

These polymers can be obtained from sources such as Sigma Chemical Co., St. Louis, MO; Polysciences, Warrenton, PA; Aldrich, Milwaukee, WI; Fluka, Ronkonkoma, NY; and BioRad, Richmond, CA, or can be synthesized from monomers obtained from these or other suppliers using standard techniques.

In certain embodiments, the hydrophobic polymer is an aliphatic polyester. In preferred embodiments, the hydrophobic polymer is polyhydroxyester such as poly(lactic acid), poly(glycolic acid), or poly(lactic acid-co-glycolic acid).

Other polymers include, but are not limited to, polyalkyl cyanoacralate, polyamino acids such as poly-L-lysine (PLL), poly(valeric acid), and poly-L-glutamic acid, hydroxypropyl methacrylate (HPMA), polyorthoesters, poly(ester amides), poly(ester ethers), polydioxanone and its copolymers, polyhydroxyalkanoates, polypropylene fumarate, polyoxymethylene, poly(butyric acid), trimethylene carbonate, and polyphosphazenes.

The particles can be designed to release molecules to be encapsulated or attached over a period of days to weeks. Factors that affect the duration of release include pH of the surrounding medium (higher rate of release at pH 5 and below due to acid catalyzed hydrolysis of PLGA) and polymer composition. Aliphatic polyesters differ in hydrophobicity and that in turn affects the degradation rate. The hydrophobic poly (lactic acid) (PLA), more hydrophilic poly (glycolic acid) PGA and their copolymers, poly (lactide-co-glycolide) (PLGA) may have different release rates. The degradation rate of these polymers, and often the corresponding drug release rate, can vary from days (PGA) to months (PLA) and is easily manipulated by varying the ratio of PLA to PGA.

In some preferred embodiments, the particles can contain one more of the following polyesters: homopolymers including glycolic acid units, referred to herein as "PGA", and lactic acid units, such as poly-L-lactic acid, poly-D-lactic acid, poly-D,L-lactic acid, poly-L-lactide, poly-D-lactide, and poly-D,L-lactide, collectively referred to herein as "PLA", and caprolactone units, such as poly(8-caprolactone), collectively referred to herein as "PCL"; and copolymers including lactic acid and glycolic acid units, such as various forms of poly(lactic acid-co-glycolic acid) and poly (lactide-co-glycolide) characterized by the ratio of lactic acid:glycolic acid, collectively referred to herein as "PLGA"; and polyacrylates, and derivatives thereof. Exemplary polymers also include copolymers of polyethylene glycol (PEG) and the aforementioned polyesters, such as various forms of PLGA-PEG or PLA-PEG copolymers, collectively referred to herein as "PEGylated polymers". In certain embodiments, the PEG region can be covalently associated with polymer to yield "PEGylated polymers" by a cleavable linker. For example, particles can also contain one or more polymer conjugates containing end-to-end linkages between the polymer and a targeting moiety or a detectable label. For example, a modified polymer can be a PLGA-PEG-peptide block polymer.

The in vivo stability/release of the particles can be adjusted during the production by using polymers such as poly(lactide-co-glycolide) copolymerized with polyethylene glycol (PEG). If PEG is exposed on the external surface, it may increase the time these materials circulate due to the hydrophilicity of PEG.

A shell can also be formed of or contain a hyperbranched polymer (HP) with hydroxyl groups, such as a hyperbranched polyglycerol (HPG), hyperbranched peptides (HPP), hyperbranched oligonucleotides (HON), hyperbranched polysaccharides (HPS), and hyperbranched polyunsaturated or saturated fatty acids (HPF). The HP can be covalently bound to the one or more materials that form the core such that the hydrophilic HP is oriented towards the outside of the particles and the hydrophobic material oriented to form the core.

The HP coating can be modified to adjust the properties of the particles. For example, unmodified HP coatings impart stealth properties to the particles which resist non-specific protein absorption and are referred to as nonbioadhesive nanoparticles (NNPs). Alternatively, the hydroxyl groups on the HP coating can be chemically modified to form functional groups that react with functional groups on tissue or otherwise interact with tissue to adhere the particles to the tissue, cells, or extracellular materials, such as proteins. Such functional groups include, but are not limited to, aldehydes, amines, and O-substituted oximes. Particles with an HP coating chemically modified to form functional groups are referred to as bioadhesive nanoparticles (BNPs). The chemically modified HP coating of BNPs forms a bioadhesive corona of the particle surrounding the hydrophobic material forming the core. See, for example, WO 2015/172149, WO 2015/172153, WO 2016/183209, and U.S. Published Applications 2017/0000737 and 2017/0266119.

Particles can be formed of polymers fabricated from polylactides (PLA) and copolymers of lactide and glycolide (PLGA). These have established commercial use in humans and have a long safety record (Jiang, et al., *Adv. Drug Deliv. Rev.*, 57(3):391-410); Aguado and Lambert, *Immunobiology*, 184(2-3):113-25 (1992); Bramwell, et al., *Adv. Drug Deliv. Rev.*, 57(9):1247-65 (2005)). These polymers have been used to encapsulate siRNA (Yuan, et al., *Jour. Nanosocience and Nanotechnology*, 6:2821-8 (2006); Braden, et al., *Jour. Biomed. Nanotechnology*, 3:148-59 (2007); Khan, et al., *Jour. Drug Target*, 12:393-404 (2004); Woodrow, et al., *Nature Materials*, 8:526-533 (2009)). Murata, et al., *J. Control. Release*, 126(3):246-54 (2008) showed inhibition of tumor growth after intratumoral injection of PLGA microspheres encapsulating siRNA targeted against vascular endothelial growth factor (VEGF). However, these microspheres were too large to be endocytosed (35-45 µm) (Conner and Schmid, Nature, 422(6927):37-44 (2003)) and required release of the anti-VEGF siRNA extracellularly as a polyplex with either polyarginine or PEI before they could be internalized by the cell. These microparticles may have limited applications because of the toxicity of the polycations and the size of the particles. Nanoparticles (100-300 nm) of PLGA can penetrate deep into tissue and are easily internalized by many cells (Conner and Schmid, Nature, 422(6927):37-44 (2003)).

Exemplary particles are described in U.S. Pat. Nos. 4,883,666, 5,114,719, 5,601,835, 7,534,448, 7,534,449, 7,550,154, and 8,889,117, and U.S. Published Application Nos. 2009/0269397, 2009/0239789, 2010/0151436, 2011/0008451, 2011/0268810, 2014/0342003, 2015/0118311, 2015/0125384, 2015/0073041, Hubbell, et al., Science, 337:303-305 (2012), Cheng, et al., Biomaterials, 32:6194-6203 (2011), Rodriguez, et al., Science, 339:971-975 (2013), Hrkach, et al., Sci Transl Med., 4:128ra139 (2012), McNeer, et al., Mol Ther., 19:172-180 (2011), McNeer, et al., Gene Ther., 20:658-659 (2013), Babar, et al., Proc Natl Acad Sci USA, 109:E1695-E1704 (2012), Fields, et al., J Control Release 164:41-48 (2012), and Fields, et al., Advanced Healthcare Materials, 361-366 (2015).

2. Poly(Amine-Co-Esters), Poly(Amine-Co-Amides), and Poly(Amine-Co-Ester-Co-Ortho Esters)

The core of the particles can be formed of or contain one or more poly(amine-co-ester), poly(amine-co-amide), poly (amine-co-ester-co-ortho ester) or a combination thereof. In some embodiments, the particles are polyplexes. In some embodiments, the content of a hydrophobic monomer in the polymer is increased relative the content of the same hydrophobic monomer when used to form polyplexes. Increasing the content of a hydrophobic monomer in the polymer forms a polymer that can form solid core particles in the presence of nucleic acids. Unlike polyplexes, these particles are stable for long periods of time during incubation in buffered water, or serum, or upon administration (e.g., injection) into animals. They also provide for a sustained release of nucleic acids which leads to long term activity. In some aspects, the molecular weight of the polymer is less than 5 kDa, 7.5 kDa, 10 kDa, 20 kDa, or 25 kDa. In some forms the molecular weight of the polymer is between about 1 kDa and about 25 kDa, between about 1 kDa and about 10 kDa, between about 1 kDa and about 7.5 kDa.

The polymers can have the general formula:

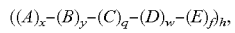

wherein A, B, C, D, and E independently include monomeric units derived from lactones (such as pentadecalactone), a polyfunctional molecule (such as N-methyldiethanolamine), a diacid or diester (such as diethylsebacate), an ortho ester, or polyalkylene oxide (such as polyethylene glycol). In some aspects, the polymers include at least a lactone, a polyfunctional molecule, and a diacid or diester monomeric units. In some aspects, the polymers include at least a lactone, a polyfunctional molecule, an ortho ester, and a diacid or diester monomeric units. In general, the polyfunctional molecule contains one or more cations, one or more positively ionizable atoms, or combinations thereof. The one or more cations are formed from the protonation of a basic nitrogen atom, or from quaternary nitrogen atoms.

In general, x, y, q, w, and f are independently integers from 0-1000, with the proviso that the sum (x+y+q+w+f) is greater than one. h is an integer from 1 to 1000.

In some forms, the percent composition of the lactone can be between about 30% and about 100%, calculated as the mole percentage of lactone unit vs. (lactone unit+diester/diacid). Expressed in terms of molar ratio, the lactone unit vs. (lactone unit+diester/diacid) content is between about 0.3 and about 1. Preferably, the number of carbon atoms in the lactone unit is between about 10 and about 24. In some embodiments, the number of carbon atoms in the lactone unit is between about 12 and about 16. In some embodiments, the number of carbon atoms in the lactone unit is 12 (dodecalactone), 15 (pentadecalactone), or 16 (hexadecalactone).

The molecular weight of the lactone unit in the polymer, the lactone unit's content of the polymer, or both, influences the formation of solid core particles.

Suitable polymers as well as particles and polyplexes formed therefrom are disclosed in WO 2013/082529, WO 2016/183217, U.S. Published Application No. 2016/0251477, U.S. Published Application No. 2015/0073041, U.S. Published Application No. 2014/0073041, and U.S. Pat. No. 9,272,043, each of which is specifically incorporated by reference in entirety.

3. Hyperbranched Polymer-Containing Particles

In a preferred embodiments, the particles are core-shell particles having a core formed of a hydrophobic or poly (amine-co-ester) or poly(amine-co-amide) polymer and a shell formed of a hyperbranched polymer. The core-shell particles can be formed by a co-block polymer. The core-shell particles can be used with any triplex-forming peptide nucleic acids including, but not limited, that sequences expressly provided herein.

The core may vary in size or the core may be formed of two or more layers of hydrophobic material containing the agent, so that the site, duration and manner of release of the active agents are controlled. Cores can be formulated for extended release, rapid release, immediate release, or delayed release.

Suitable hydrophobic or poly(amine-co-ester) or poly (amine-co-amide) polymers from which the core can be formed are discussed above.

Suitable polymers for forming the shell or corona include biodegradable polymeric molecules, such as polyglycerols, polypeptides, oligonucleotides, polysaccharides, and fatty acids. Hyperbranched polyglycerol (HPG) is an exemplary hyperbranched polymer.

a. Compositions i. HPG

In preferred embodiments, the polymer is hyperbranched polyglycerol (HPG), a highly branched polyol containing a polyether scaffold. Hyperbranched polyglycerol can be prepared using techniques known in the art. It can be formed from controlled etherification of glycerol via cationic or anionic ring opening multi-branching polymerization of glycidol. For example, an initiator having multiple reactive sites is reacted with glycidol in the presence of a base to form hyperbranched polyglycerol (HPG). Suitable initiators include, but are not limited to, polyols, e.g., triols, tetraols, pentaols, or greater and polyamines, e.g., triamines, tetraamines, pentaamines, etc. In one embodiment, the initiator is 1,1,1-trihydroxymethyl propane (THP).

A formula for hyperbranched polyglycerol as described in EP 2754684 is

Formula II

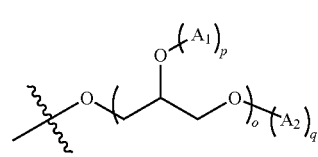

wherein o, p and q are independently integers from 1-100, wherein $A_1$ and $A_2$ are independently

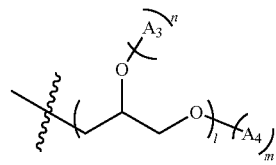

Formula III wherein l, m and n are independently integers from 1-100. wherein $A_3$ and $A_4$ are defined as $A_1$ and $A_2$, with the proviso that $A_3$ and $A_4$ are hydrogen, n and m are each 1 for terminal residues.

The surface properties of the HPG can be adjusted based on the chemistry of vicinal diols. For example, the surface properties can be tuned to provide stealth particles, i.e., particles that are not cleared by the MPS due to the presence of the hydroxyl groups; adhesive (sticky) particles, i.e., particles that adhere to the surface of tissues, for example, due to the presence of one or more reactive functional groups, such as aldehydes, amines, oxime, or O-substituted oxime that can be prepared from the vicinal hydroxyl moieties; or targeting by the introduction of one or more targeting moieties which can be conjugated directly or indirectly to the vicinal hydroxyl moieties. Indirectly refers to transformation of the hydroxy groups to reactive functional groups that can react with functional groups on molecules to be attached to the surface, such as active agents and/or targeting moieties, etc.

The hyperbranched nature of the polyglycerol allows for a much higher density of hydroxyl groups, reactive functional groups, and/or targeting moieties than obtained with linear polyethylene glycol. For example, the particles can have a density of surface functionality (e.g., hydroxyl groups, reactive functional groups, and/or targeting moieties) of at least about 1, 2, 3, 4, 5, 6, 7, or 8 groups/nm$^2$.

The molecular weight of the HPG can vary. For example, in those embodiments wherein the HPG is covalently attached to the materials or polymers that form the core, the molecular weight can vary depending on the molecular weight and/or hydrophobicity of the core materials. The molecular weight of the HPG is generally from about 1,000 to about 1,000,000 Daltons, from about 1,000 to about 500,000 Daltons, from about 1,000 to about 250,000 Daltons, or from about 1,000 to about 100,000 Daltons. In those embodiments wherein the HPG is covalently bound to the core materials, the weight percent of HPG of the copolymer is from about 1% to about 50%, such as about 1, 2, 3, 4, 5, 10, 15, 20, 25, 30, 35, 40, 45 or 50%.

In some embodiments, the HPG is covalently coupled to a hydrophobic material or a more hydrophobic material, such as a polymer. Upon self-assembly, particles are formed containing a core containing the hydrophobic material and a shell or coating of HPG. HPG coupled to the polymer PLA is shown below:

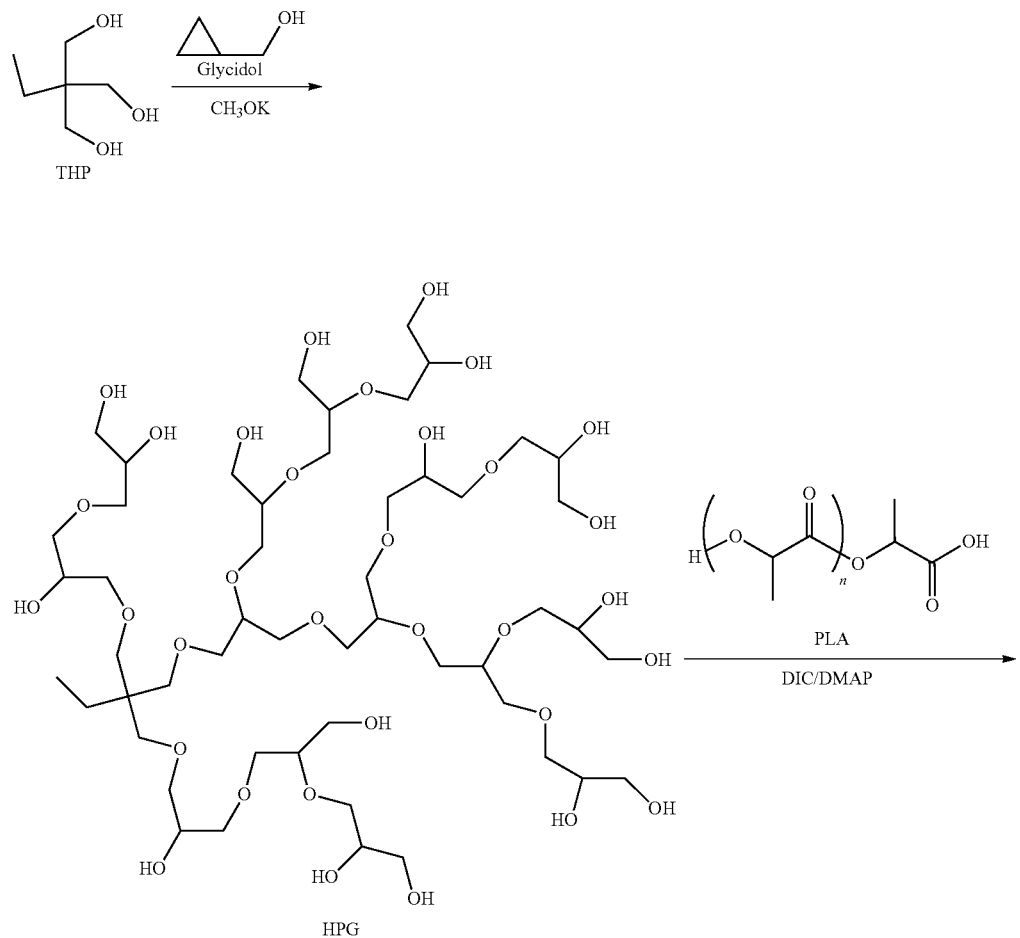

-continued

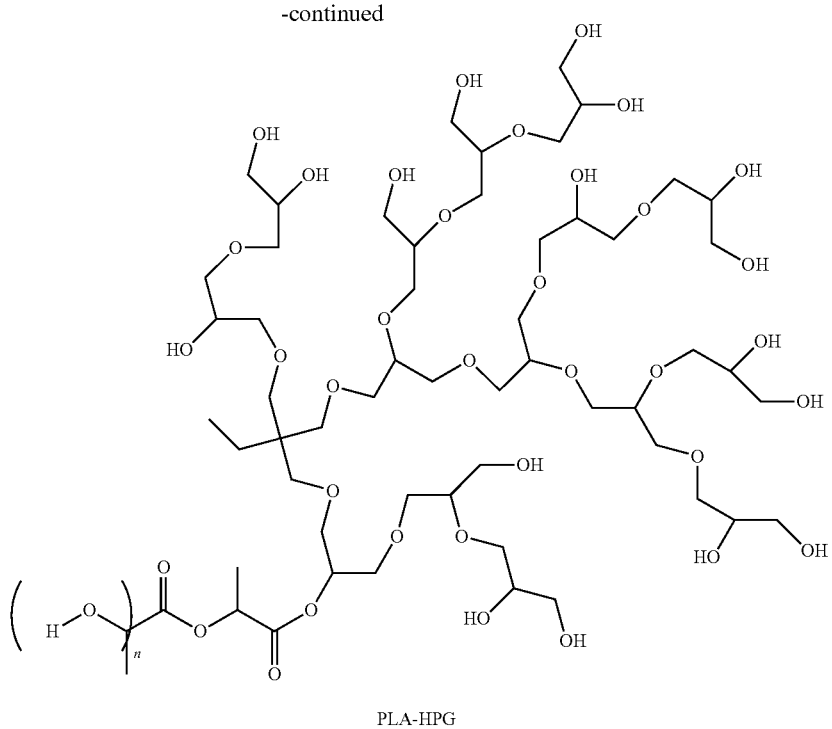

PLA-HPG ii. Other Polymers for Forming a Shell, Corona or Coating

NPs with bioadhesive coronas are not limited to hyperbranched polyglycerols and their associated aldehydes, but may include other biodegradable polymers and molecules such as peptides formed of amino acids and, oligonucleotides formed of nucleic acids, polysaccharides and fatty acids. These polymers or small molecules, when converted to an aldehyde-terminated form, are adhesive.

Suitable materials for forming bioadhesive functional groups are materials that have aldehydes or the potential to form aldehydes following chemical modification (e.g. sodium periodate ($NaIO_4$) treatment). These include polymers of saccharides such as dextran, cellulose, and other starches, polymers of or containing serine amino acids or materials with vicinal diol or serine structure (amine and hydroxyl on neighboring carbons), materials with hydroxyl groups, since the hydroxyl groups can be oxidized to aldehydes by catalysts such as Collins reagent, or any polymeric molecule, such as a dendrimer that may be attached with molecules containing aldehydes or has groups may be converted to aldehydes (Gao and Yan, *Prog. Polym. Sci.* 29:183-275 (2004)).

Below are the vicinal diols (most sugars have vicinal diols) and serine structures, which can be oxidized to aldehydes by $NaIO_4$ treatment.

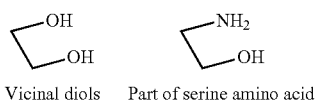

Vicinal diols    Part of serine amino acid

HPG NPs wherein the vicinal diols of the HPG are converted into aldehydes (—CHO) can thus have a HPG-CHO shell and form core-HPG-CHO particles (e.g., PLA-HPG-CHO NPs).

TABLE 1

| A) Polymer | Polymer Source | Inherent Viscosity | Mw (kDa) | Mm (kDa) |
|---|---|---|---|---|
| Poly(lactic acid) (P7) | Lactel | 0.24 | 20.5 | 12.7 |
| Hyperbranched Polyglycerol (PLA-HPG) (H9) | Yale | | | 5.4 |
| Hyperbranched Polyglycerol (PLA-HPG) (H3) | Yale | | | 6.3 |

| B) Polymer | Conjugation Ratio | HPG (wt %) |
|---|---|---|
| P7H9-2 | 1.4 | 38 |
| P7H3-18 | 1.1 | 35 |

Polymers contain repeat units (monomers) chemically bonded into long chains. Chain length can be expressed in terms of the molecular weight of the polymer chain, related to the relative molecular mass of the monomers and the number of monomers connected in the chain. However, synthetic polymers are typically polydisperse in that they contain polymer chains of unequal length, and so the molecular weight is not a single value—the polymer can exist as a distribution of chain lengths and molecular weights. The molecular weight of a polymer can therefore be described as some average molecular weight calculated from the molecular weights of all the chains in the sample. The number average molecular weight (Mn) is the statistical average molecular weight of all the polymer chains in the sample, and can be defined by:

$$Mn = \frac{\sum N_i M_i}{\sum N_i}$$

where Mi is the molecular weight of a chain and Ni is the number of chains of that molecular weight. Mn can be predicted by polymerization mechanisms and is measured by methods that determine the number of molecules in a sample of a given weight; for example colligative methods such as end-group assay.

The weight average molecular weight (Mw) can be defined by:

$$Mw = \frac{\sum N_i M_i^2}{\sum N_i M_i}$$

Compared to Mn, Mw takes into account the molecular weight of a chain in determining contributions to the molecular weight average. The more massive the chain, the more the chain contributes to Mw. Mw is determined by methods that are sensitive to the molecular size rather than just their number, such as light scattering techniques.

iii. Sheddable Polyethylene Glycol (PEG) Coatings

HPG-coated particles can be modified by covalently attaching PEG to the surface. This can be achieved by converting the vicinyl diol groups to aldehydes and then reacting the aldehydes with functional groups on PEG, such as aliphatic amines, aromatic amines, hydrazines and thiols. The linker has end groups such as aliphatic amines, aromatic amines, hydrazines, thiols and O-substituted oxyamines. The bond inserted in the linker can be disulfide, orthoester and peptides sensitive to proteases.

PEG with a functional group or a linker can form a bond with aldehyde on PLA-HPG-CHO and reversed the bioadhesive state of PLA-HPG-CHO to stealth state. This bond or the linker is labile to pH change or high concentration of peptides, proteins and other biomolecules. After administration systematically or locally, the bond attaching the PEG to PLA-HPG-CHO can be reversed or cleaved to release the PEG in response to environment, and expose the bioadhesive PLA-HPG-CHO particles to the environment. Subsequently, the particles will interact with the tissue and attach the particles to the tissues or extracellular materials such as proteins. The environment can be acidic environment in tumors, reducing environment in tumors, protein rich environment in tissues.

B. HP Conjugates or Coatings

Hyperbranched polymers including, but not limited to, hyperbranched polyglycerol (HPG), can be covalently bound to one or more materials, such as a polymer, that form the core of the particles using methodologies known in the art. For example, an HP such as HPG can be covalently coupled to a polymer having carboxylic acid groups, such as PLA, PGA, or PLGA using DIC/DMAP.

The HPG can be initiated from hydroxyl, amine, and carboxylate terminated molecules, such as an alcohol with one or multiple long hydrophobic tail. In another example, the HP, such as HPG, can be initiated from special functionalized initiators to facilitate the conjugation to more materials. These special initiators include disulfide (Yeh et al., *Langmuir.* 24(9):4907-16(2008)).

The HPG can be functionalized to introduce one or more reactive functional groups that alter the surface properties of the particles. The surface of the particles can further be modified with one or more targeting moieties or covalently bound to an HP such as HPG via a coupling agent or spacer in organic such as dichloromethane (DCM), dimethylformamide (DMF), dimethyl sulfoxide (DMSO), tetrahydrofuran (THF), diisopropylcarbodiimide (DIC), 4-(N,N-dimethylamino)pyridine (DMAP), dicyclohexylcarbodiimide (DCC), DIC/DMAP, DCC/DMAP, Acylchloride/pyridine. In some embodiments, the polymer is functionalized/modified before nanoparticle formation.

Alternatively, the targeting moieties may be attached to NPs after the synthesis of NPs in aqueous solution (or other protic solution such as alcohol). As discussed in more detail below, HPG coated NPs can be transformed to aldehyde terminated NPs by $NaIO_4$ treatment (or carboxylic acid terminated by $NaIO_4$ treatment followed by sodium chlorite treatment) so the targeting moieties may be directly covalently attached to NPs via aldehyde (or carboxylic acid) groups on NPs and functional groups (amine, hydrazine, amino-oxy and their derivatives) on the targeting moieties or indirectly attached to the NPs via coupling agents or spacers (such as amino-oxy modified biotin and cysteine).

Certain properties of the PLA-HPG conjugate are important for the observed effects thereof. Because high molecular weight HPG has better resistance to non-specific adsorption to biomolecules, the low molecular weight components can be removed from the synthesized HPG by multiple solvent precipitations and dialysis.

In the preferred embodiment, a polyhydroxy acid such as PLA is selected as the hydrophobic core material because it is biodegradable, has a long history of clinical use, and is the major component of a NP system that is advancing in clinical trials. To covalently attach the PLA to HPG, the previous approach was to first functionalize the HPG with an amine and then conjugate the carboxylic group on PLA to the amine. This approach is efficient but cannot be used to make HPG as surface coatings since any amines that do not react with PLA will lead to a net positive charge on the neutral HPG surface and reduce the ability of HPG to resist adsorption of other molecules on the surface. To avoid this, a one-step esterification between PLA and HPG can be employed, which maintains the charge neutral state of the HPG.

Targeting molecules or agents to be encapsulated or delivered may be associated with the surface of, encapsulated within, surrounded by, and/or distributed throughout the polymeric matrix of the particles.

c. Functionalizing Nanoparticles

Representative methodologies for conjugated molecules to the hydroxy groups on HP are provided. One useful protocol involves the "activation" of hydroxyl groups with carbonyldiimidazole (CDI) in aprotic solvents such as DMSO, acetone, or THF. CDI forms an imidazolyl carbamate complex with the hydroxyl group which may be displaced by binding the free amino group of a ligand such as a protein. The reaction is an N-nucleophilic substitution and results in a stable N-alkylcarbamate linkage of the ligand to the polymer. The "coupling" of the ligand to the "activated" polymer matrix is maximal in the pH range of 9-10 and normally requires at least 24 hrs. The resulting ligand-polymer complex is stable and resists hydrolysis for extended periods of time.

Another coupling method involves the use of 1-ethyl-3-(3-dimethylaminopropyl) carbodiimide (EDAC) or "water-soluble CDI" in conjunction with N-hydroxylsulfosuccinimide (sulfo NHS) to couple the exposed carboxylic groups of polymers to the free amino groups of ligands in a totally aqueous environment at the physiological pH of 7.0. Briefly, EDAC and sulfo-NHS form an activated ester with the carboxylic acid groups of the polymer which react with the amine end of a ligand to form a peptide bond. The resulting peptide bond is resistant to hydrolysis. The use of sulfo-NHS in the reaction increases the efficiency of the EDAC coupling by a factor of ten-fold and provides for exceptionally gentle conditions that ensure the viability of the ligand-polymer complex.

By using either of these protocols it is possible to "activate" almost all polymers containing either hydroxyl or carboxyl groups in a suitable solvent system that will not dissolve the polymer matrix.

A useful coupling procedure for attaching ligands with free hydroxyl and carboxyl groups to polymers involves the use of the cross-linking agent, divinylsulfone. This method would be useful for attaching sugars or other hydroxylic compounds with bioadhesive properties to hydroxylic matrices. Briefly, the activation involves the reaction of divinylsulfone to the hydroxyl groups of the polymer, forming the vinylsulfonyl ethyl ether of the polymer. The vinyl groups will couple to alcohols, phenols and even amines. Activation and coupling take place at pH 11. The linkage is stable in the pH range from 1-8 and is suitable for transit through the intestine.

Alternatively, the hydroxyl groups can be converted to reactive functional group that can react with a reactive functional group on the molecule to be attached. For example, the hydroxyl groups on HP can be converted to aldehydes, amines, or O-substituted oximes, which can react with reactive functional groups on molecules to be attached. Such transformations can be done before or after particle formation.

Any suitable coupling method known to those skilled in the art for the coupling of ligands and polymers with double bonds, including the use of UV crosslinking, may be used for attachment of molecules to the polymer.

Coupling is preferably by covalent binding but it may also be indirect, for example, through a linker bound to the polymer or through an interaction between two molecules such as strepavidin and biotin. It may also be by electrostatic attraction by dip-coating.

The most efficient reaction between —OH and —COOH is to use coupling reagents: DCC/DMAP and DIC/DMAP or activate the —COOH to —COCl and then react with —OH in the presence of pyridine.

The coupling methods can be done before or after particle formation.

i. Exemplary Methods of Functionalization

The functionalization of polymer-HP can be obtained by coupling hydroxyl groups of the HP with a carboxylic group on the ligand. In the Examples below, PLA-HPG polymer was functionalized with the small molecule adenosine, under a carboxylic modified form (2',3'-isopropylideneadenosine-5'-carboxylic acid). PLA-HPG can be added to functional element and dissolved in anhydrous DMF. The solution can be dried with a molecular sieve with DIC and DMAP added to the solution. To purify the polymer, the solution can be added into cold diethyl ether to precipitate the polymer. The polymer precipitate can be collected and dissolved in DCM/TFA mixture (DCM:TFA=2:1) and the reaction shaken at room temperature. The resulting solution can be added into cold diethyl ether and the polymer collected by centrifugation. The polymer can be further purified by redissolving in DCM and precipitating in diethyl ether. To confirm conjugation of functional element to PLA-HPG, the polymers can be dissolved in DMSO-d6 and analyzed by $^1$H NMR. The PLA-HPG-functional element polymer can be then used to form PLA-HPG-functional element nanoparticles using, for example, an emulsion solvent evaporation technique.

Functionalization of pre-formed polymer-HP particles can be carried out by a Schiff base reaction. The hydroxyl groups of the HP at the surface of the particles are first turned into aldehyde groups and further react with an amine group on the ligand. The particles can be first prepared using, for example, an emulsion solvent evaporation technique. They can then be rendered "sticky" by converting the alcohol or hydroxyl groups of the HPG into aldehydes using $NaIO_4$ as introduced above. Following this treatment, the $NaIO_4$ can be quenched using $Na_2SO_3$ and the particles can be incubated with ligand to induce a Schiff base reaction between an amino-oxy group on the ligand (e.g., N-terminus of a peptide) and the aldehyde groups. After incubation, the unreacted ligand is washed by centrifugation, and the remaining reactive aldehyde groups on the HPG can be blocked by hydroxyl amine ($HONH_2$).

As discussed above, "sticky" particles with bioadhesive coronas are not limited to hyperbranched polyglycerols and their associated aldehydes, but may include other biodegradable polymers and molecules such as peptides formed of amino acids and, oligonucleotides formed of nucleic acids, polysaccharides and fatty acids. These polymers or small molecules, when converted to an aldehyde-terminated form, can also be reacted with an amine group on the ligand.

Both conjugation strategies before or after formation of the NPs involve simple and cheap reactions that can be applied to any molecule presenting either a carboxylic group (functionalization before formation of the NPs) or a primary amine group (functionalization after formation of the NPs).

In some embodiments, the nanoparticles are functionalized with two or more moieties. This can be accomplished by any suitable means, including, for example, either one of the above strategies individually, or both in series. For example, in some embodiments, the functionalization of polymer-HP is obtained by coupling hydroxyl groups on the HP with a carboxylic group on two or more different ligands to create two or more different populations of polymer-HP-ligand that can be mixed together to form particles displaying the two or more different ligands. The two or more different ligands can be reacted with the polymer-HP in the same reaction (e.g., using a pool of two or more ligands) or two or more separate reactions. In some embodiments, functionalization of pre-formed polymer-HP particles can be carried out by a Schiff base reaction, wherein hydroxyl groups of the HP at the surface of the particles are first turned into aldehyde groups and further react with an amine group on two or more ligands.

The amount of ligand displayed on the surface of the particles can also be controlled by, for example, forming the particles with a combination of pre-formed polymer-HP-ligand and unfunctionalized polymer-HP. A higher ratio of polymer-HP-ligand to polymer-HP results in a relatively higher display of the ligand on the surface of the particle, and a lower ratio of polymer-HP-ligand to polymer-HP results in a relatively lower display of the ligand on the surface of the particle. In some embodiments, particles formed of a mixture of pre-formed polymer-HP-ligand and unfunctionalized polymer-HP are subjected to a further step that functionalizes the unfunctionalized polymer-HP by, for example, a Schiff base reaction as discussed above. The same principles can be applied to tune the relative display of two, three or more moieties.

F. Polycations

In some embodiments, the nucleic acids are complexed to polycations to increase the encapsulation efficiency of the nucleic acids into the particles. The term "polycation" refers to a compound having a positive charge, preferably at least 2 positive charges, at a selected pH, preferably physiological pH. Polycationic moieties have between about 2 to about 15 positive charges, preferably between about 2 to about 12 positive charges, and more preferably between about 2 to about 8 positive charges at selected pH values.

Many polycations are known in the art. Suitable constituents of polycations include basic amino acids and their derivatives such as arginine, asparagine, glutamine, lysine and histidine; cationic dendrimers; and amino polysaccharides. Suitable polycations can be linear, such as linear tetralysine, branched or dendrimeric in structure.

Exemplary polycations include, but are not limited to, synthetic polycations based on acrylamide and 2-acrylamido-2-methylpropanetrimethylamine, poly(N-ethyl-4-vinylpyridine) or similar quartemized polypyridine, diethylaminoethyl polymers and dextran conjugates, polymyxin B sulfate, lipopolyamines, poly(allylamines) such as the strong polycation poly(dimethyldiallylammonium chloride), polyethyleneimine, polybrene, and polypeptides such as protamine, the histone polypeptides, polylysine, polyarginine and polyornithine.

In one embodiment, the polycation is a polyamine Polyamines are compounds having two or more primary amine groups. In a preferred embodiment, the polyamine is a naturally occurring polyamine that is produced in prokaryotic or eukaryotic cells. Naturally occurring polyamines represent compounds with cations that are found at regularly-spaced intervals and are therefore particularly suitable for complexing with nucleic acids. Polyamines play a major role in very basic genetic processes such as DNA synthesis and gene expression. Polyamines are integral to cell migration, proliferation and differentiation in plants and animals. The metabolic levels of polyamines and amino acid precursors are critical and hence biosynthesis and degradation are tightly regulated. Suitable naturally occurring polyamines include, but are not limited to, spermine, spermidine, cadaverine and putrescine. In a preferred embodiment, the polyamine is spermidine.

In another embodiment, the polycation is a cyclic polyamine Cyclic polyamines are known in the art and are described, for example, in U.S. Pat. No. 5,698,546, WO 1993/012096 and WO 2002/010142. Exemplary cyclic polyamines include, but are not limited to, cyclen.

Spermine and spermidine are derivatives of putrescine (1,4-diaminobutane), which is produced from L-ornithine by action of ODC (ornithine decarboxylase). L-ornithine is the product of L-arginine degradation by arginase. Spermidine is a triamine structure that is produced by spermidine synthase (SpdS) which catalyzes monoalkylation of putrescine (1,4-diaminobutane) with decarboxylated S-adenosylmethionine (dcAdoMet) 3-aminopropyl donor. The formal alkylation of both amino groups of putrescine with the 3-aminopropyl donor yields the symmetrical tetraamine spermine. The biosynthesis of spermine proceeds to spermidine by the effect of spermine synthase (SpmS) in the presence of dcAdoMet. The 3-aminopropyl donor (dcAdoMet) is derived from S-adenosylmethionine by sequential transformation of L-methionine by methionine adenosyltransferase followed by decarboxylation by AdoMetDC (S-adenosylmethionine decarboxylase). Hence, putrescine, spermidine and spermine are metabolites derived from the amino acids L-arginine (L-ornithine, putrescine) and L-methionine (dcAdoMet, aminopropyl donor).

In some embodiments, the particles themselves are a polycation (e.g., a blend of PLGA and poly(beta amino ester).

G. Functional Molecules

Functional molecules can be associated with, linked, conjugated, or otherwise attached directly or indirectly triplex-forming molecules, potentiating agents, or particles utilized for delivery thereof. For example, the composition can include a targeting agent, a cell penetrating peptide, a peptide with a nuclear localization signal, or a combination thereof. In some embodiments, two or more targeting molecules are used. Target agents can be bound or conjugated to particles (e.g., a polymer of the particle).

1. Targeting Molecules

One class of functional elements is targeting molecules. Targeting molecules can be associated with, linked, conjugated, or otherwise attached directly or indirectly to the gene editing molecule, or to a particle or other delivery vehicle thereof.

Targeting molecules can be proteins, peptides, nucleic acid molecules, saccharides or polysaccharides that bind to a receptor or other molecule on the surface of a targeted cell. The degree of specificity and the avidity of binding to the target cells can be modulated through the selection of the targeting molecule. For example, antibodies are very specific. These can be polyclonal, monoclonal, fragments, recombinant, or single chain, many of which are commercially available or readily obtained using standard techniques.

Examples of moieties include, for example, targeting moieties which provide for the delivery of molecules to specific cells, e.g., antibodies to hematopoietic stem cells, $CD34^+$ cells, epithelial cells, T cells or any other preferred cell type, as well as receptor and ligands expressed on the preferred cell type. In some embodiments, the moieties target hematopoietic stem cells.

In some embodiments, the targeting molecule targets a cell surface protein.

The choice of targeting molecule will depend on the method of administration of the particle composition and the cells or tissues to be targeted. The targeting molecule may generally increase the binding affinity of the particles for cell or tissues or may target the particle to a particular tissue in an organ or a particular cell type in a tissue.

2. Protein Transduction Domains and Fusogenic Peptides

Other functional elements that can be associated with, linked, conjugated, or otherwise attached directly or indirectly to the triplex-forming molecule, potentiating agent, or to a particle or other delivery vehicle thereof, include protein transduction domains and fusogenic peptides.

For example, the efficiency of particle delivery systems can also be improved by the attachment of functional ligands to the particle surface. Potential ligands include, but are not limited to, small molecules, cell-penetrating peptides (CPPs), targeting peptides, antibodies or aptamers (Yu, et al., *PLoS One.*, 6:e24077 (2011), Cu, et al., *J Control Release*, 156:258-264 (2011), Nie, et al., *J Control Release*, 138:64-70 (2009), Cruz, et al., *J Control Release*, 144:118-126 (2010)). Attachment of these moieties serves a variety of different functions; such as inducing intracellular uptake, endosome disruption, and delivery of the plasmid payload to the nucleus. There have been numerous methods employed to tether ligands to the particle surface. One approach is direct covalent attachment to the functional groups on PLGA NPs (Bertram, *Acta Biomater.* 5:2860-2871 (2009)).

Another approach utilizes amphiphilic conjugates like avidin palmitate to secure biotinylated ligands to the NP surface (Fahmy, et al., *Biomaterials*, 26:5727-5736 (2005), Cu, et al., *Nanomedicine*, 6:334-343 (2010)). This approach produces particles with enhanced uptake into cells, but reduced pDNA release and gene transfection, which is likely due to the surface modification occluding pDNA release. In a similar approach, lipid-conjugated polyethylene glycol (PEG) is used as a multivalent linker of penetratin, a CPP, or folate (Cheng, et al., *Biomaterials*, 32:6194-6203 (2011)).

These methods, as well as other methods discussed herein, and others methods known in the art, can be combined to tune particle function and efficacy. In some preferred embodiments, PEG is used as a linker for linking functional molecules to particles. For example, DSPE-PEG (2000)-maleimide is commercially available and can be used utilized for covalently attaching functional molecules such as CPP.

"Protein Transduction Domain" or PTD refers to a polypeptide, polynucleotide, or organic or inorganic compounds that facilitates traversing a lipid bilayer, micelle, cell membrane, organelle membrane, or vesicle membrane. A PTD attached to another molecule facilitates the molecule traversing membranes, for example going from extracellular space to intracellular space, or cytosol to within an organelle. PTA can be short basic peptide sequences such as those present in many cellular and viral proteins. Exemplary protein transduction domains that are well-known in the art include, but are not limited to, the Antennapedia PTD and the TAT (transactivator of transcription) PTD, poly-arginine, poly-lysine or mixtures of arginine and lysine, HIV TAT (YGRKKRRQRRR (SEQ ID NO:25) or RKKRRQRRR (SEQ ID NO:26), 11 arginine residues, VP22 peptide, and an ANTp peptide (RQIKIWFQNRRMKWKK) (SEQ ID NO:27) or positively charged polypeptides or polynucleotides having 8-15 residues, preferably 9-11 residues. Short, non-peptide polymers that are rich in amines or guanidinium groups are also capable of carrying molecules crossing biological membranes. Penetratin and other derivatives of peptides derived from antennapedia (Cheng, et al., *Biomaterials*, 32(26):6194-203 (2011) can also be used. Results show that penetratin in which additional Args are added, further enhances uptake and endosomal escape, and IKK NBD, which has an antennapedia domain for permeation as well as a domain that blocks activation of NFkB and has been used safely in the lung for other purposes (von Bismarck, et al., *Pulmonary Pharmacology & Therapeutics*, 25(3):228-35 (2012), Kamei, et al., *Journal Of Pharmaceutical Sciences*, 102(11):3998-4008 (2013)).

A "fusogenic peptide" is any peptide with membrane destabilizing abilities. In general, fusogenic peptides have the propensity to form an amphiphilic alpha-helical structure when in the presence of a hydrophobic surface such as a membrane. The presence of a fusogenic peptide induces formation of pores in the cell membrane by disruption of the ordered packing of the membrane phospholipids. Some fusogenic peptides act to promote lipid disorder and in this way enhance the chance of merging or fusing of proximally positioned membranes of two membrane enveloped particles of various nature (e.g. cells, enveloped viruses, liposomes). Other fusogenic peptides may simultaneously attach to two membranes, causing merging of the membranes and promoting their fusion into one. Examples of fusogenic peptides include a fusion peptide from a viral envelope protein ectodomain, a membrane-destabilizing peptide of a viral envelope protein membrane-proximal domain from the cytoplasmic tails.

Other fusogenic peptides often also contain an amphiphilic-region. Examples of amphiphilic-region containing peptides include: melittin, magainins, the cytoplasmic tail of HIV1 gp41, microbial and reptilian cytotoxic peptides such as bomolitin 1, pardaxin, mastoparan, crabrolin, cecropin, entamoeba, and staphylococcal α-toxin; viral fusion peptides from (1) regions at the N terminus of the transmembrane (TM) domains of viral envelope proteins, e.g. HIV-1, SIV, influenza, polio, rhinovirus, and coxsackie virus; (2) regions internal to the TM ectodomain, e.g. semliki forest virus, sindbis virus, rota virus, rubella virus and the fusion peptide from sperm protein PH-30: (3) regions membrane-proximal to the cytoplasmic side of viral envelope proteins e.g. in viruses of avian leukosis (ALV), Feline immunodeficiency (FIV), Rous Sarcoma (RSV), Moloney murine leukemia virus (MoMuLV), and spleen necrosis (SNV).

In particular embodiments, a functional molecule such as a CPP is covalently linked to DSPE-PEG-maleimide functionalized particles such as PBAE/PLGA blended particles using known methods such as those described in Fields, et al., *J Control Release*, 164(1):41-48 (2012). For example, DSPE-PEG-function molecule can be added to the 5.0% PVA solution during formation of the second emulsion. In some embodiments, the loading ratio is about 5 nmol/mg ligand-to-polymer ratio.

In some embodiments, the functional molecule is a CPP such as those above, or mTAT (HIV-1 (with histidine modification) HHHHRKKRRQRRRRHHHHH (SEQ ID NO:28) (Yamano, et al., *J Control Release*, 152:278-285 (2011)); or bPrPp (Bovine prion) MVKSKIGSWILVLFVAMWS DVGLCKKRPKP (SEQ ID NO:29) (Magzoub, et al., *Biochem Biophys Res Commun.*, 348:379-385 (2006)); or MPG (Synthetic chimera: SV40 Lg T. Ant.+HIV gb41 coat) GALFLGFLGAAGSTMGAWSQPKKKRKV (SEQ ID NO:30) (Endoh, et al., *Adv Drug Deliv Rev.*, 61:704-709 (2009)).

III. Methods of Use

The disclosed compositions can be used for in vitro, ex vivo, and in vivo gene editing. The methods typically include contacting a cell with an effective amount of triplex-forming molecule such as a PNA oligomer, preferably a bis-PNA oligomer or tail-clamp PNA, preferably in combination with a donor oligonucleotide, optionally in combination with a potentiating agent, optionally wherein one or more of the foregoing are encapsulated or incorporated into a delivery vehicle, preferably a polymeric nanoparticle, to modify the cell's genome at a site in the β-globin gene leading to Sickle Cell Disease.

In some embodiments, the canonical sickle mutation in the DNA of a patient's hematopoietic stem cells is corrected such that those cells differentiate into erythroid cells that permanently produce wild-type (WT) adult β-globin under the regulation of the endogenous transcriptional control elements, in an effective amount to treat the disease. As discussed in more detail below, in some embodiments, the gene correction occurs in vivo by administering the subject an effective amount of a disclosed composition.

In some embodiments, the methods include correction of the subject's own hematopoietic stem cells (HSCs) ex vivo, followed by reinfusion of those modified cells. In some embodiments, the treated subject is administered a sufficient number of modified cells to produce functioning erythrocytes throughout life.

Typically, the subject has a genomic mutation that causes substitution of valine for glutamic acid at position 6 of the β-globin chain. In some embodiments, the subject has sickle cell anemia.

A. Methods of Treatment

The methods typically include contracting cells with an effective amount of one or more of the disclosed compositions. The contacting can occur in vitro, ex vivo or in vivo. The contacting can be or otherwise result in transfection or transformation of the cells with the composition(s). In preferred embodiments, the method includes contacting a population of target cells with an effective amount of the composition, to modify the genomes of a sufficient number of cells to achieve a therapeutic result.

For example, the effective amount or therapeutically effective amount can be a dosage sufficient to treat, inhibit, or alleviate one or more symptoms of sickle cell disease, sickle cell anemia, or a related disease or disorder, or to otherwise provide a desired pharmacologic and/or physiologic effect, for example, reducing, inhibiting, or reversing one or more of the underlying pathophysiological mechanisms underlying a disease or disorder.

The molecules can be administered in an effective amount to induce formation of a triple helix at the target site. An effective amount of triplex-forming molecules may also be an amount effective to increase the rate of recombination of a donor fragment relative to administration of the donor fragment in the absence of the gene editing technology.

The formulation is made to suit the mode of administration. Pharmaceutically acceptable carriers are determined in part by the particular composition being administered, as well as by the particular method used to administer the composition. Accordingly, there is a wide variety of suitable formulations of pharmaceutical compositions containing the nucleic acids. The precise dosage will vary according to a variety of factors such as subject-dependent variables (e.g., age, immune system health, clinical symptoms etc.).

The disclosed compositions can be administered to or otherwise contacted with target cells once, twice, or three time daily; one, two, three, four, five, six, seven times a week, one, two, three, four, five, six, seven or eight times a month. For example, in some embodiments, the composition is administered every two or three days, or on average about 2 to about 4 times a week.

In some embodiments, the potentiating agent is administered to the subject prior to administration of the triplex-forming molecule to the subject. The potentiating agent can be administered to the subject, for example, 1, 2, 3, 4, 5, 6, 8, 10, 12, 18, or 24 hours, or 1, 2, 3, 4, 5, 6, or 7 days, or any combination thereof prior to administration of the gene editing technology to the subject.

In some embodiments, the triplex-forming molecule is administered to the subject prior to administration of the potentiating agent to the subject. The gene editing technology can be administered to the subject, for example, 1, 2, 3, 4, 5, 6, 8, 10, 12, 18, or 24 hours, or 1, 2, 3, 4, 5, 6, or 7 days, or any combination thereof prior to administration of the potentiating agent to the subject.

In preferred embodiments, the compositions are administered in an amount effective to induce gene modification in at least one target allele to occur at frequency of at least 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, or 25% of target cells. In some embodiments, particularly ex vivo applications, gene modification occurs in at least one target allele at a frequency of about 0.1-25%, or 0.5-25%, or 1-25% 2-25%, or 3-25%, or 4-25% 5-25% or 6-25%, or 7-25%, or 8-25%, or 9-25%, or 10-25%, 11-25%, or 12-25%, or 13%-25% or 14%-25% or 15-25%, or 2-20%, or 3-20%, or 4-20% or 5-20% or 6-20%, or 7-20%, or 8-20%, or 9-20%, or 10-20%, 11-20%, or 12-20%, or 13%-20% or 14%-20% or 15-20%, 2-15%, or 3-15%, or 4-15% or 5-15% or 6-15%, or 7-15%, or 8-15%, or 9-15%, or 10-15%, 11-15%, or 12-15%, or 13%-15% or 14%-15%.

In some embodiments, particularly in vivo applications, gene modification occurs in at least one target allele at a frequency of about 0.1% to about 10%, or about 0.2% to about 10%, or about 0.3% to about 10%, or about 0.4% to about 10%, or about 0.5% to about 10%, or about 0.6% to about 10%, or about 0.7% to about 10%, or about 0.8% to about 10%, or about 0.9% to about 10%, or about 1.0% to about 10%, or about 1.1% to about 10%, or about 1.1% to about 10%, 1.2% to about 10%, or about 1.3% to about 10%, or about 1.4% to about 10%, or about 1.5% to about 10%, or about 1.6% to about 10%, or about 1.7% to about 10%, or about 1.8% to about 10%, or about 1.9% to about 10%, or about 2.0% to about 10%, or about 2.5% to about 10%, or about 3.0% to about 10%, or about 3.5% to about 10%, or about 4.0% to about 10%, or about 4.5% to about 10%, or about 5.0% to about 10%.

In some embodiments, gene modification occurs with low off-target effects. In some embodiments, off-target modification is undetectable using routine analysis such as those described in the Examples below. In some embodiments, off-target incidents occur at a frequency of 0-1%, or 0-0.1%, or 0-0.01%, or 0-0.001%, or 0-0.0001%, or 0-0000.1%, or 0-0.000001%. In some embodiments, off-target modification occurs at a frequency that is about $10^2$, $10^3$, $10^4$, or $10^5$-fold lower than at the target site.

In general, by way of example only, dosage forms useful in the disclosed methods can include doses in the range of about $10^2$ to about $10^{50}$, or about $10^5$ to about $10^{40}$, or about $10^{10}$ to about $10^{30}$, or about $10^{12}$ to about $10^{20}$ copies of triplex-forming molecules and optionally donor oligonucleotide per dose. In particular embodiments, about $10^{13}$, $10^{14}$, $10^{15}$, $10^{16}$, or $10^{17}$ copies of triplex-forming molecules and optionally donor oligonucleotide are administered to a subject in need thereof.

In other embodiments, dosages are expressed in moles. For example, in some embodiments, the dose of triplex-forming molecules and optionally donor oligonucleotide is about 0.1 nmol to about 100 nmol, or about 0.25 nmol to about 50 nmol, or about 0.5 nmol to about 25 nmol, or about 0.75 nmol to about 7.5 nmol.

In other embodiments, dosages are expressed in molecules per target cell. For example, in some embodiments, the dose of triplex-forming molecules and optionally donor oligonucleotide is about $10^2$ to about $10^{50}$, or about $10^5$ to about $10^{15}$, or about $10^7$ to about $10^{12}$, or about $10^8$ to about $10^{11}$ copies of the triplex-forming molecules and optionally donor oligonucleotide per target cell.

In other embodiments, dosages are expressed in mg/kg, particularly when expressed as an in vivo dosage of triplex-forming molecules and optionally donor oligonucleotide packaged in a nanoparticle with or without functional molecules. Dosages can be, for example 0.1 mg/kg to about 1,000 mg/kg, or 0.5 mg/kg to about 1,000 mg/kg, or 1 mg/kg to about 1,000 mg/kg, or about 10 mg/kg to about 500 mg/kg, or about 20 mg/kg to about 500 mg/kg per dose, or 20 mg/kg to about 100 mg/kg per dose, or 25 mg/kg to about 75 mg/kg per dose, or about 25, 30, 35, 40, 45, 50, 55, 60, 65, 70, or 75 mg/kg per dose.

In other embodiments, dosages are expressed in mg/ml, particularly when expressed as an ex vivo dosage of triplex-forming molecules and optionally donor oligonucleotide packaged in a nanoparticle with or without functional molecules. Dosages can be, for example 0.01 mg/ml to about 100 mg/ml, or about 0.5 mg/ml to about 50 mg/ml, or about 1 mg/ml to about 10 mg/ml per dose to a cell population of $10^6$ cells.

As discussed above, triplex-forming molecules can be administered without, but is preferably administered with at least one donor oligonucleotide. Such donors can be administered at similar dosages as the triplex-forming molecules. Compositions should include an amount of donor fragment effective to recombine at the target site in the presence of a triplex forming molecule.

The methods can include contacting cells with an effective amount of a potentiating agent. Preferably the amount of potentiating agent is effective to increase gene modification when used in combination with a triplex-forming molecule and optionally donor oligonucleotide, compared to using the triplex-forming molecule and optionally donor oligonucleotide in the absence of the potentiating agent.

Exemplary dosages for SCF include, about 0.01 mg/kg to about 250 mg/kg, or about 0.1 mg/kg to about 100 mg/kg, or about 0.5 mg/kg to about 50 mg/kg, or about 0.75 mg/kg to about 10 mg/kg.

Dosages for CHK1 inhibitors are known in the art, and many of these are in clinical trial. Accordingly, the dosage can be selected by the practitioner based on known, preferred human dosages. In preferred embodiments, the dosage is below the lowest-observed-adverse-effect level (LOAEL), and is preferably a no observed adverse effect level (NOAEL) dosage.

Exemplary dosages of Vorinostat are about 0.01 mg/kg to about 250 mg/kg.

Exemplary dosages of RI-1 are between 0.01 mg/kg to about 50 mg/kg.

Exemplary dosages of B0-2 are between 0.01 mg/kg and 50 mg/kg.

Dosages of some potentiating agents are exemplified below.

1. Ex Vivo Gene Therapy

In some embodiments, ex vivo gene therapy of cells is used for the treatment of a genetic disorder in a subject. For ex vivo gene therapy, cells are isolated from a subject and contacted ex vivo with the compositions to produce cells containing mutations in or adjacent to genes. In a preferred embodiment, the cells are isolated from the subject to be treated or from a syngeneic donor. Target cells are removed from a subject prior to contacting with a gene editing composition and preferably a potentiating factor. The cells can be hematopoietic progenitor or stem cells. In a preferred embodiment, the target cells are CD34$^+$ hematopoietic stem cells. Hematopoietic stem cells (HSCs), such as CD34+ cells are multipotent stem cells that give rise to all the blood cell types including erythrocytes. Therefore, CD34+ cells can be isolated from a patient with, for example, thalassemia, sickle cell disease, or a lysosomal storage disease, the mutant gene altered or repaired ex-vivo using the disclosed compositions and methods, and the cells reintroduced back into the patient as a treatment or a cure.

Stem cells can be isolated and enriched by one of skill in the art. Methods for such isolation and enrichment of CD34$^+$ and other cells are known in the art and disclosed for example in U.S. Pat. Nos. 4,965,204; 4,714,680; 5,061,620; 5,643,741; 5,677,136; 5,716,827; 5,750,397 and 5,759,793. As used herein in the context of compositions enriched in hematopoietic progenitor and stem cells, "enriched" indicates a proportion of a desirable element (e.g. hematopoietic progenitor and stem cells) which is higher than that found in the natural source of the cells. A composition of cells may be enriched over a natural source of the cells by at least one order of magnitude, preferably two or three orders, and more preferably 10, 100, 200 or 1000 orders of magnitude.

In humans, CD34$^+$ cells can be recovered from cord blood, bone marrow or from blood after cytokine mobilization effected by injecting the donor with hematopoietic growth factors such as granulocyte colony stimulating factor (G-CSF), granulocyte-monocyte colony stimulating factor (GM-CSF), stem cell factor (SCF) subcutaneously or intravenously in amounts sufficient to cause movement of hematopoietic stem cells from the bone marrow space into the peripheral circulation. Initially, bone marrow cells may be obtained from any suitable source of bone marrow, e.g. tibiae, femora, spine, and other bone cavities. For isolation of bone marrow, an appropriate solution may be used to flush the bone, which solution will be a balanced salt solution, conveniently supplemented with fetal calf serum or other naturally occurring factors, in conjunction with an acceptable buffer at low concentration, generally from about 5 to 25 mM. Convenient buffers include Hepes, phosphate buffers, lactate buffers, etc.

Cells can be selected by positive and negative selection techniques. Cells can be selected using commercially available antibodies which bind to hematopoietic progenitor or stem cell surface antigens, e.g. CD34, using methods known to those of skill in the art. For example, the antibodies may be conjugated to magnetic beads and immunogenic procedures utilized to recover the desired cell type. Other techniques involve the use of fluorescence activated cell sorting (FACS). The CD34 antigen, which is found on progenitor cells within the hematopoietic system of non-leukemic individuals, is expressed on a population of cells recognized by the monoclonal antibody My-10 (i.e., express the CD34 antigen) and can be used to isolate stem cell for bone marrow transplantation. My-10 deposited with the American Type Culture Collection (Rockville, Md.) as HB-8483 is commercially available as anti-HPCA 1. Additionally, negative selection of differentiated and "dedicated" cells from human bone marrow can be utilized, to select against substantially any desired cell marker. For example, progenitor or stem cells, most preferably CD34$^+$ cells, can be characterized as being any of CD3$^-$, CD7$^-$, CD8$^-$, CD10$^-$, CD14$^-$, CD15$^-$, CD19$^-$, CD20$^-$, CD33, Class II HLA$^+$ and Thy-1$^+$.

Once progenitor or stem cells have been isolated, they may be propagated by growing in any suitable medium. For example, progenitor or stem cells can be grown in conditioned medium from stromal cells, such as those that can be obtained from bone marrow or liver associated with the secretion of factors, or in medium including cell surface factors supporting the proliferation of stem cells. Stromal cells may be freed of hematopoietic cells employing appropriate monoclonal antibodies for removal of the undesired cells.

The isolated cells are contacted ex vivo with a combination of triplex-forming molecules and donor oligonucleotides in amounts effective to cause the desired mutations in or adjacent to genes in need of repair or alteration, for example the human beta-globin or α-L-iduronidase gene. These cells are referred to herein as modified cells. Methods for transfection of cells with oligonucleotides and peptide nucleic acids are well known in the art (Koppelhus, et al., *Adv. Drug Deliv. Rev.,* 55(2): 267-280 (2003)). It may be desirable to synchronize the cells in S-phase to further increase the frequency of gene correction. Methods for synchronizing cultured cells, for example, by double thymidine block, are known in the art (Zielke, et al., *Methods Cell Biol.*, 8:107-121 (1974)).

The modified cells can be maintained or expanded in culture prior to administration to a subject. Culture conditions are generally known in the art depending on the cell type. Conditions for the maintenance of $CD34^+$ in particular have been well studied, and several suitable methods are available. A common approach to ex vivo multi-potential hematopoietic cell expansion is to culture purified progenitor or stem cells in the presence of early-acting cytokines such as interleukin-3. It has also been shown that inclusion, in a nutritive medium for maintaining hematopoietic progenitor cells ex vivo, of a combination of thrombopoietin (TPO), stem cell factor (SCF), and flt3 ligand (Flt-3L; i.e., the ligand of the flt3 gene product) was useful for expanding primitive (i.e., relatively non-differentiated) human hematopoietic progenitor cells in vitro, and that those cells were capable of engraftment in SCID-hu mice (Luens et al., 1998, Blood 91:1206-1215). In other known methods, cells can be maintained ex vivo in a nutritive medium (e.g., for minutes, hours, or 3, 6, 9, 13, or more days) including murine prolactin-like protein E (mPLP-E) or murine prolactin-like protein F (mPIP-F; collectively mPLP-E/IF) (U.S. Pat. No. 6,261,841). It will be appreciated that other suitable cell culture and expansion method can be used in accordance with the invention as well. Cells can also be grown in serum-free medium, as described in U.S. Pat. No. 5,945,337.

In another embodiment, the modified hematopoietic stem cells are differentiated ex vivo into $CD4^+$ cells culture using specific combinations of interleukins and growth factors prior to administration to a subject using methods well known in the art. The cells may be expanded ex vivo in large numbers, preferably at least a 5-fold, more preferably at least a 10-fold and even more preferably at least a 20-fold expansion of cells compared to the original population of isolated hematopoietic stem cells.

In another embodiment cells for ex vivo gene therapy, the cells to be used can be dedifferentiated somatic cells. Somatic cells can be reprogrammed to become pluripotent stem-like cells that can be induced to become hematopoietic progenitor cells. The hematopoietic progenitor cells can then be treated with triplex-forming molecules and donor oligonucleotides as described above with respect to $CD34^+$ cells to produce recombinant cells having one or more modified genes. Representative somatic cells that can be reprogrammed include, but are not limited to fibroblasts, adipocytes, and muscles cells. Hematopoietic progenitor cells from induced stem-like cells have been successfully developed in the mouse (Hanna, J. et al. *Science*, 318:1920-1923 (2007)).

To produce hematopoietic progenitor cells from induced stem-like cells, somatic cells are harvested from a host. In a preferred embodiment, the somatic cells are autologous fibroblasts. The cells are cultured and transduced with vectors encoding Oct4, Sox2, Klf4, and c-Myc transcription factors. The transduced cells are cultured and screened for embryonic stem cell (ES) morphology and ES cell markers including, but not limited to AP, SSEA1, and Nanog. The transduced ES cells are cultured and induced to produce induced stem-like cells. Cells are then screened for CD41 and c-kit markers (early hematopoietic progenitor markers) as well as markers for myeloid and erythroid differentiation.

The modified hematopoietic stem cells or modified induced hematopoietic progenitor cells are then introduced into a subject. Delivery of the cells may be effected using various methods and includes most preferably intravenous administration by infusion as well as direct depot injection into periosteal, bone marrow and/or subcutaneous sites.

The subject receiving the modified cells may be treated for bone marrow conditioning to enhance engraftment of the cells. The recipient may be treated to enhance engraftment, using a radiation or chemotherapeutic treatment prior to the administration of the cells. Upon administration, the cells will generally require a period of time to engraft. Achieving significant engraftment of hematopoietic stem or progenitor cells typically takes weeks to months.

A high percentage of engraftment of modified hematopoietic stem cells is not envisioned to be necessary to achieve significant prophylactic or therapeutic effect. It is expected that the engrafted cells will expand over time following engraftment to increase the percentage of modified cells. It is expected that engraftment of only a small number or small percentage of modified hematopoietic stem cells will be required to provide a prophylactic or therapeutic effect.

In preferred embodiments, the cells to be administered to a subject will be autologous, e.g. derived from the subject, or syngenic.

In some embodiments, the compositions and methods can be used to edit embryonic genomes in vitro. The methods typically include contacting an embryo in vitro with an effective amount of potentiating agent and gene editing technology to induce at least one alteration in the genome of the embryo. Most preferably the embryo is a single cell zygote, however, treatment of male and female gametes prior to and during fertilization, and embryos having 2, 4, 8, or 16 cells and including not only zygotes, but also morulas and blastocytes, are also provided. Typically, the embryo is contacted with the compositions on culture days 0-6 during or following in vitro fertilization.

The contacting can be adding the compositions to liquid media bathing the embryo. For example, the compositions can be pipetted directly into the embryo culture media, whereupon they are taken up by the embryo.

2. In Vivo Gene Therapy

The disclosed compositions can be administered directly to a subject for in vivo gene therapy.

a. Pharmaceutical Formulations

The disclosed compositions are preferably employed for therapeutic uses in pharmaceutical composition or formulation including a suitable pharmaceutical carrier or excipient. Such pharmaceutical compositions include an effective amount of one or more composition, which can be any one or more of the compositions ands compounds discussed herein. For example, a pharmaceutical composition can include a pharmaceutically acceptable carrier and an effective amount of a PNA oligomer alone or in combination with donor oligonucleotides, each or both as free molecules, or one or both packaged into the same or different particles, preferably nanoparticles, including but not limited to nanoparticles for of PLGA or HPG-PLA.

It is understood by one of ordinary skill in the art that nucleotides administered in vivo are taken up and distributed to cells and tissues (Huang, et al., *FEBS Lett.*, 558(1-3):69-73 (2004)). For example, Nyce, et al. have shown that antisense oligodeoxynucleotides (ODNs) when inhaled bind to endogenous surfactant (a lipid produced by lung cells) and are taken up by lung cells without a need for additional carrier lipids (Nyce, et al., *Nature*, 385:721-725 (1997)). Small nucleic acids are readily taken up into T24 bladder carcinoma tissue culture cells (Ma, et al., *Antisense Nucleic Acid Drug Dev.*, 8:415-426 (1998)).

The disclosed compositions including triplex-forming molecules, such as TFOs and PNAs, and donor fragments may be in a formulation for administration topically, locally or systemically in a suitable pharmaceutical carrier. Remington's Pharmaceutical Sciences, 15th Edition by E. W. Martin (Mark Publishing Company, 1975), discloses typical carriers and methods of preparation. The compound may also be encapsulated in suitable biocompatible microcapsules, microparticles, nanoparticles, or microspheres formed of biodegradable or non-biodegradable polymers or proteins or liposomes for targeting to cells. Such systems are well known to those skilled in the art and may be optimized for use with the appropriate nucleic acid.

Various methods for nucleic acid delivery are described, for example, in Sambrook et al., *Molecular Cloning: A Laboratory Manual*, Cold Spring Harbor Laboratory, New York (1989); and Ausubel, et al., *Current Protocols in Molecular Biology*, John Wiley & Sons, New York (1994). Such nucleic acid delivery systems include the desired nucleic acid, by way of example and not by limitation, in either "naked" form as a "naked" nucleic acid, or formulated in a vehicle suitable for delivery, such as in a complex with a cationic molecule or a liposome forming lipid, or as a component of a vector, or a component of a pharmaceutical composition. The nucleic acid delivery system can be provided to the cell either directly, such as by contacting it with the cell, or indirectly, such as through the action of any biological process. The nucleic acid delivery system can be provided to the cell by endocytosis, receptor targeting, coupling with native or synthetic cell membrane fragments, physical means such as electroporation, combining the nucleic acid delivery system with a polymeric carrier such as a controlled release film or nanoparticle or microparticle, using a vector, injecting the nucleic acid delivery system into a tissue or fluid surrounding the cell, simple diffusion of the nucleic acid delivery system across the cell membrane, or by any active or passive transport mechanism across the cell membrane. Additionally, the nucleic acid delivery system can be provided to the cell using techniques such as antibody-related targeting and antibody-mediated immobilization of a viral vector.

Formulations for topical administration may include ointments, lotions, creams, gels, drops, suppositories, sprays, liquids and powders. Conventional pharmaceutical carriers, aqueous, powder or oily bases, or thickeners can be used as desired.

Formulations suitable for parenteral administration, such as, for example, by intraarticular (in the joints), intravenous, intramuscular, intradermal, intraperitoneal, and subcutaneous routes, include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions, solutions or emulsions that can include suspending agents, solubilizers, thickening agents, dispersing agents, stabilizers, and preservatives.

Formulations for injection may be presented in unit dosage form, e.g., in ampules or in multi-dose containers, optionally with an added preservative. The compositions may take such forms as sterile aqueous or nonaqueous solutions, suspensions and emulsions, which can be isotonic with the blood of the subject in certain embodiments. Examples of nonaqueous solvents are polypropylene glycol, polyethylene glycol, vegetable oil such as olive oil, sesame oil, coconut oil, arachis oil, peanut oil, mineral oil, injectable organic esters such as ethyl oleate, or fixed oils including synthetic mono or di-glycerides. Aqueous carriers include water, alcoholic/aqueous solutions, emulsions or suspensions, including saline and buffered media. Parenteral vehicles include sodium chloride solution, 1,3-butandiol, Ringer's dextrose, dextrose and sodium chloride, lactated Ringer's or fixed oils. Intravenous vehicles include fluid and nutrient replenishers, and electrolyte replenishers (such as those based on Ringer's dextrose). Preservatives and other additives may also be present such as, for example, antimicrobials, antioxidants, chelating agents and inert gases. In addition, sterile, fixed oils are conventionally employed as a solvent or suspending medium. For this purpose any bland fixed oil including synthetic mono- or di-glycerides may be employed. In addition, fatty acids such as oleic acid may be used in the preparation of injectables. Carrier formulation can be found in Remington's Pharmaceutical Sciences, Mack Publishing Co., Easton, Pa. Those of skill in the art can readily determine the various parameters for preparing and formulating the compositions without resort to undue experimentation.

The disclosed compositions alone or in combination with other suitable components, can also be made into aerosol formulations (i.e., they can be "nebulized") to be administered via inhalation. Aerosol formulations can be placed into pressurized acceptable propellants, such as dichlorodifluoromethane, propane, nitrogen, and air. For administration by inhalation, the compounds are delivered in the form of an aerosol spray presentation from pressurized packs or a nebulizer, with the use of a suitable propellant.

In some embodiments, the compositions include pharmaceutically acceptable carriers with formulation ingredients such as salts, carriers, buffering agents, emulsifiers, diluents, excipients, chelating agents, fillers, drying agents, antioxidants, antimicrobials, preservatives, binding agents, bulking agents, silicas, solubilizers, or stabilizers. In one embodiment, the triplex-forming molecules and/or donor oligonucleotides are conjugated to lipophilic groups like cholesterol and lauric and lithocholic acid derivatives with C32 functionality to improve cellular uptake. For example, cholesterol has been demonstrated to enhance uptake and serum stability of siRNA in vitro (Lorenz, et al., *Bioorg. Med. Chem. Lett.*, 14(19):4975-4977 (2004)) and in vivo (Soutschek, et al., *Nature*, 432(7014):173-178 (2004)). In addition, it has been shown that binding of steroid conjugated oligonucleotides to different lipoproteins in the bloodstream, such as LDL, protect integrity and facilitate biodistribution (Rump, et al., *Biochem. Pharmacol.*, 59(11):1407-1416 (2000)). Other groups that can be attached or conjugated to the compound described above to increase cellular uptake, include acridine derivatives; cross-linkers such as psoralen derivatives, azidophenacyl, proflavin, and azidoproflavin; artificial endonucleases; metal complexes such as EDTA-Fe (II) and porphyrin-Fe(II); alkylating moieties; nucleases such as alkaline phosphatase; terminal transferases; abzymes; cholesteryl moieties; lipophilic carriers; peptide conjugates; long chain alcohols; phosphate esters; radioactive markers; non-radioactive markers; carbohydrates; and polylysine or other polyamines U.S. Pat. No. 6,919,208 to Levy, et al., also describes methods for enhanced delivery. These pharmaceutical formulations may be manufactured in a manner that is itself known, e.g., by means of conventional mixing, dissolving, granulating, levigating, emulsifying, encapsulating, entrapping or lyophilizing processes.

b. Methods of Administration

In general, methods of administering compounds, including oligonucleotides and related molecules, are well known in the art. In particular, the routes of administration already in use for nucleic acid therapeutics, along with formulations in current use, provide preferred routes of administration and formulation for the triplex-forming molecules described above. Preferably the compositions are injected into the organism undergoing genetic manipulation, such as an animal requiring gene therapy.

The disclosed compositions can be administered by a number of routes including, but not limited to, oral, intravenous, intraperitoneal, intramuscular, transdermal, subcutaneous, topical, sublingual, rectal, intranasal, pulmonary, and other suitable means. The compositions can also be administered via liposomes. Such administration routes and appropriate formulations are generally known to those of skill in the art.

Administration of the formulations may be accomplished by any acceptable method which allows the gene editing compositions to reach their targets.

Any acceptable method known to one of ordinary skill in the art may be used to administer a formulation to the subject. The administration may be localized (i.e., to a particular region, physiological system, tissue, organ, or cell type) or systemic, depending on the condition being treated.

Injections can be e.g., intravenous, intradermal, subcutaneous, intramuscular, or intraperitoneal. In some embodiments, the injections can be given at multiple locations. Implantation includes inserting implantable drug delivery systems, e.g., microspheres, hydrogels, polymeric reservoirs, cholesterol matrixes, polymeric systems, e.g., matrix erosion and/or diffusion systems and non-polymeric systems, e.g., compressed, fused, or partially-fused pellets. Inhalation includes administering the composition with an aerosol in an inhaler, either alone or attached to a carrier that can be absorbed. For systemic administration, it may be preferred that the composition is encapsulated in liposomes.

The compositions may be delivered in a manner which enables tissue-specific uptake of the agent and/or nucleotide delivery system. Techniques include using tissue or organ localizing devices, such as wound dressings or transdermal delivery systems, using invasive devices such as vascular or urinary catheters, and using interventional devices such as stents having drug delivery capability and configured as expansive devices or stent grafts.

The formulations may be delivered using a bioerodible implant by way of diffusion or by degradation of the polymeric matrix. In certain embodiments, the administration of the formulation may be designed so as to result in sequential exposures to the composition, over a certain time period, for example, hours, days, weeks, months or years. This may be accomplished, for example, by repeated administrations of a formulation or by a sustained or controlled release delivery system in which the compositions are delivered over a prolonged period without repeated administrations. Administration of the formulations using such a delivery system may be, for example, by oral dosage forms, bolus injections, transdermal patches or subcutaneous implants. Maintaining a substantially constant concentration of the composition may be preferred in some cases.

Other delivery systems suitable include time-release, delayed release, sustained release, or controlled release delivery systems. Such systems may avoid repeated administrations in many cases, increasing convenience to the subject and the physician. Many types of release delivery systems are available and known to those of ordinary skill in the art. They include, for example, polymer-based systems such as polylactic and/or polyglycolic acids, polyanhydrides, polycaprolactones, copolyoxalates, polyesteramides, polyorthoesters, polyhydroxybutyric acid, and/or combinations of these. Microcapsules of the foregoing polymers containing nucleic acids are described in, for example, U.S. Pat. No. 5,075,109. Other examples include non-polymer systems that are lipid-based including sterols such as cholesterol, cholesterol esters, and fatty acids or neutral fats such as mono-, di- and triglycerides; hydrogel release systems; liposome-based systems; phospholipid based-systems; silastic systems; peptide based systems; wax coatings; compressed tablets using conventional binders and excipients; or partially fused implants. Specific examples include erosional systems in which the oligonucleotides are contained in a formulation within a matrix (for example, as described in U.S. Pat. Nos. 4,452,775, 4,675,189, 5,736,152, 4,667,013, 4,748,034 and 5,239,660), or diffusional systems in which an active component controls the release rate (for example, as described in U.S. Pat. Nos. 3,832,253, 3,854,480, 5,133, 974 and 5,407,686). The formulation may be as, for example, microspheres, hydrogels, polymeric reservoirs, cholesterol matrices, or polymeric systems. In some embodiments, the system may allow sustained or controlled release of the composition to occur, for example, through control of the diffusion or erosion/degradation rate of the formulation containing the triplex-forming molecules and donor oligonucleotides. In addition, a pump-based hardware delivery system may be used to deliver one or more embodiments.

Examples of systems in which release occurs in bursts include systems in which the composition is entrapped in liposomes which are encapsulated in a polymer matrix, the liposomes being sensitive to specific stimuli, e.g., temperature, pH, light or a degrading enzyme and systems in which the composition is encapsulated by an ionically-coated microcapsule with a microcapsule core degrading enzyme. Examples of systems in which release of the inhibitor is gradual and continuous include, e.g., erosional systems in which the composition is contained in a form within a matrix and effusional systems in which the composition permeates at a controlled rate, e.g., through a polymer. Such sustained release systems can be in the form of pellets, or capsules.

Use of a long-term release implant may be particularly suitable in some embodiments. "Long-term release," as used herein, means that the implant containing the composition is constructed and arranged to deliver therapeutically effective levels of the composition for at least 30 or 45 days, and preferably at least 60 or 90 days, or even longer in some cases. Long-term release implants are well known to those of ordinary skill in the art, and include some of the release systems described above.

Suitable subjects include, but are not limited to mammals such as a human or other primate, a rodent such as a mouse or rat, or an agricultural or domesticated animal such as a dog, cat, cow, horse, pig, or sheep. The subject can be an adult, child, infant, or a multi-cell or single-cell embryo. The methods can include in utero delivery of the composition to an embryo or fetus in need thereof.

The in utero methods typically include in utero administration to an embryo or fetus of an effective amount of gene editing composition. Routes of administration include traditional routes such as to intramuscular, intraperitoneal, spinal canal, lumina, lateral cerebral ventricles, puncture of the fetal heart, placental cord insertion, the intrahepatic umbilical vein, intraplacental, yolk sac vessels, intra-organ (e.g., other organs and tissues, including brain, muscle, heart, etc.) and other disclosed herein and in Waddington, et al., "In Utero gene therapy: current challenges and perspectives," *Molecular Therapy*, Volume 11, Issue 5, May 2005, Pages 661-676.

In some embodiments the route of administration is via an intravenous or intra-amniotic injection or infusion. The compositions can be administered during in utero surgery.

Thus, the methods can used to deliver effective amounts of compositions to the embryo or fetus, or cells thereof, without delivering an effective amount of the composition to the mother of the embryo or fetus, or her cells. For example, in some gene editing embodiments, the target embryo or fetus is contacted with an effective amount of the composition to alter the genomes of a sufficient number of its cells to reduce or prevent one or more symptoms of a target genetic disease. At the same time, the amount, route of delivery, or combination thereof may not be effective to alter genome of a sufficient number of the mother's cells to change her phenotype.

In some methods the compositions can be administered by injection or infusion intravascularly into the vitelline vein, or umbilical vein, or an artery such as the vitelline artery of an embryo or fetus. Additionally (to injection into the vitelline vein) or alternatively, the same or different compositions can be administered by injection or infusion into the amniotic cavity. During physiologic mammalian fetal development, the fetus breaths amniotic fluid into and out of the developing lungs, providing the necessary forces to direct lung development and growth. Developing fetuses additionally swallow amniotic fluid, which aids the formation of the gastrointestinal tract. Introduction of a nanoparticulate composition into the amniotic fluid at gestational ages after the onset of fetal breathing and swallowing resulted in delivery to the lung and gut, respectively, with increased intensity of accumulation at the later gestational ages, while administration before the onset of fetal breathing and swallowing did not lead to any detectable particle accumulation within the fetus.

The methods can be carried out at any time it is technically feasible to do so and the method are efficacious.

In a human, the process of injection can be performed in a manner similar to amniocentesis, during which an ultrasound-guided needle is inserted into the amniotic sac to withdraw a small amount of amniotic fluid for genetic testing. A glass pipette is an exemplary needle-like tool amenable for shape and size modification for piercing through the amniotic membrane via a tiny puncture, and dispensing formulation into the uterus.

The composition can be administered to a fetus, embryo, or to the mother or other subject when the fetus or embryo is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 weeks of age.

In some embodiments, the methods are carried out at a gestational time point during which agents can be safely delivered via the umbilical vessels. In some methods in utero administration is carried out on or after the gestational equivalent of E1S, E15.5, or E16 of a mouse (e.g., a human or mammal's gestational age equivalent to murine gestational age E15, E15.5, or E16). Typically intraamniotic injection is carried out on or after the gestational equivalent of E16 or E16.5, or on or after fetal breathing and/or swallowing has begun.

In other embodiments, intraamniotic injection is carried out on or after the gestational equivalent of E14, E15, E16, E17, E18, E19, E20, or E21 of a rat (e.g., a human or other mammal's gestational age equivalent to rat gestational age E14, E15, E16, E17, E18, E19, E20, or E21).

The disclosed compositions and methods can be further understood through the following numbered paragraphs.
1. A peptide nucleic acid (PNA) oligomer comprising a Hoogsteen binding peptide nucleic acid (PNA) segment comprising PNA residues comprising the nucleic acid sequence TTJJTJT and a Watson-Crick binding PNA segment comprising PNA residues comprising the nucleic acid sequence TCTCCTTAAACCTGT (SEQ ID NO:1) or TCTCCTTAAACCTGTCTT (SEQ ID NO:2),
or a variant thereof comprising a combination of up to 5 nucleic acid sequence substitutions, additions, insertions, or deletions in the Hoogsteen binding PNA segment, the Watson-Crick binding segment or the combination thereof,
wherein the two segments can bind or hybridize to a target region in the β-globin gene and induce strand invasion, displacement, and formation of a triple-stranded molecule among the two PNA segments and the target region.
2. The PNA oligomer of paragraph 1, comprising the nucleic acid sequence TTJJTJT-linker-TCTCCT-TAAACCTGT (SEQ ID NO:3) or TTJJTJT-linker-TCTCCTTAAACCTGTCTT (SEQ ID NO:4), wherein "linker" is a flexible linker, linking the Hoogsteen binding segment to the Watson-Crick binding segment.
or a variant thereof comprising a combination of up to 5 nucleic acid sequence substitutions, additions, insertions, or deletions in the Hoogsteen binding PNA segment, the Watson-Crick binding segment or the combination thereof.
3. The PNA oligomer of paragraphs 1 or 2, comprising the nucleic acid sequence TTJJTJT-linker-TCTCCT-TAAACCTGT (SEQ ID NO:3) or TTJJTJT-linker-TCTCCTTAAACCTGTCTT (SEQ ID NO:4), wherein "linker" is a flexible linker, linking the Hoogsteen binding segment to the Watson-Crick binding segment.
4. The PNA oligomer of any one of paragraphs 1-3, comprising the nucleic acid sequence TTJJTJT-linker-TCTCCTTAAACCTGTCTT (SEQ ID NO:4), wherein "linker" a flexible linker.
5. The PNA oligomer of any one of paragraphs 1-4, wherein the oligomer is free from gamma (γ) modifications in the PNA residues.
6. The PNA oligomer of paragraph 5, comprising the nucleic acid sequence lys-lys-lys-TTJJTJT-OOO-TCTCCTTAAACCTGTCTT-lys-lys-lys (SEQ ID NO:5) (SCD-tcPNA2).
7. The PNA oligomer of any one of paragraphs 1-4, wherein one or more of the PNA residues in the Hoogsteen binding segment, the Watson-Crick binding segment, or a combination thereof comprises a substitution at the gamma (γ) position of one or more PNA residues.
8. The PNA oligomer of paragraph 7, comprising the nucleic acid sequence lys-lys-lys-TTJJTJT-OOO-Tc T c Ct Ta Aa Cc Tg Tc Tt -lys-lys-lys (SEQ ID NO:5) or lys-lys-lys-TTJJTJT-OOO-t Ct Cc Tt Aa Ac C t Gt Ct T-lys-lys-lys (SEQ ID NO:5), wherein the bolded and underlined residues are γ modified PNA.
9. The PNA oligomer of paragraph 8, wherein the modification is miniPEG.
10. The PNA oligomer of paragraph 8, wherein the modification is serine.
11. A nanoparticle encapsulating or entrapping the PNA oligomer of any one of paragraphs 1-10.
12. The nanoparticle of paragraph 11 further comprising a donor oligonucleotide comprising a sequence that can correct a mutation(s) in a cell's genome by recombination induced or enhanced by the peptide nucleic acid oligomer.
13. The nanoparticle of paragraph 12, wherein the nanoparticles comprise a core and shell.

14. The nanoparticle of paragraph 13, wherein the core comprises a hydrophobic polymer.
15. The nanoparticle of paragraph 14, wherein the hydrophobic polymer is a polyhydroxyester.
16. The nanoparticle of paragraph 15, wherein the polyhydroxyester is selected from poly(lactic acid), poly(glycolic acid), and poly(lactic acid-co-glycolic acid).
17. The nanoparticle of paragraph 16, wherein the polyhydroxyester is poly(lactic acid).
18. The nanoparticle of any of paragraphs 13-17, wherein the shell is a hyperbranched polymer.
19. The nanoparticle of paragraph 18, wherein the hyperbranched polymer is hyperbranched polyglycerol (HPG).
20. The nanoparticle of paragraph 19, wherein core is poly(lactic acid) (PLA) and the shell is hyperbranched polyglycerol (HPG), optionally according to Table 1, optionally wherein the nanoparticle is P7H9-2.
21. A pharmaceutical composition comprising an effective amount of the PNA oligomer of any one of paragraphs 1-10.
22. The pharmaceutical composition of paragraph 21 further comprising a donor oligonucleotide comprising a sequence that can correct a mutation(s) in a cell's genome by recombination induced or enhanced by the peptide nucleic acid oligomer.
23. A pharmaceutical composition comprising an effective amount of the nanoparticle of any one of paragraphs 11-20.
24. The pharmaceutical composition of any one of paragraphs 21-23 further comprising a targeting moiety, a cell penetrating peptide, or a combination thereof associated with, linked, conjugated, or otherwise attached directly or indirectly to the PNA oligomer or the nanoparticles.
25. The pharmaceutical composition of any one of paragraphs 21-24 further comprising a potentiating agent to increase the frequency of recombination of the donor oligonucleotide at a target site in the genome of a population of cells.
26. A method of modifying the genome of cells comprising contacting the cells with the pharmaceutical composition of any one of paragraphs 21-25.
27. The method of paragraph 26 wherein the contacting occurs in vitro, ex vivo, or in vivo.
28. The method of paragraph 27, wherein the contacting occurs in vivo in a subject with Sickle Cell Disease.
29. The method of paragraph 28, wherein the pharmaceutical composition is administered to the subject in an effective amount to correct a Sickle Cell Disease mutation in an effective number of cells to reduce one or more symptoms of the disease or disorder.
30. The method of paragraph 27, wherein the contacting occurs ex vivo, the cells are autologous cells to a subject, and the cells are administered to the subject in an effective amount to treat Sickle Cell Disease.
31. The method of any one of paragraphs 26-30 further comprising contacting the cells with an effective amount of a potentiating agent to increase the frequency of recombination of the donor oligonucleotide at a target site in the genome of the cells.
32. The method of paragraph 31, wherein the potentiating agent is a Rad51 modulator.
33. The method of paragraph 32, wherein potentiating agent stimulates or increases Rad51 expression.
34. The method of paragraph 33, wherein the potentiating agent decreases or inhibits Rad51 expression.
35. The method of paragraph 31, wherein the potentiating agent is a histone deacetylase inhibitor.
36. The method of paragraph 35, wherein the histone deacetylase inhibitor is vorinostat.
37. A pharmaceutical composition comprising a triplex-forming peptide nucleic acid oligomer and histone deacetylase inhibitor.
38. A pharmaceutical composition comprising a triplex-forming peptide nucleic acid oligomer and a potentiating agent selected from vorinostat, 2,4-Pyridinedicarboxylic Acid, Garcinol, Splitomycin, BML-210, Apicidin, Suberoyl bis Hydroxamic acid, Scriptaid, Nullscript, 5-Aza-2-deoxycitidine, Zebularine, ITSA1, Phenylbutyrate Na, Tranylcypromine, Valproic acid, EX-527, Resveratrol, M-344, Nicotinamide, BML-266, Piceatannol, AGK2, Salermide, MC-1293, Anacardic acid, B2, BIX-01294, Butyrolactone 3, CTPB, Oxamflatin, Sirtinol, NCH-51, CI-994, NSC-3852, Aminoresveratrol, BML-281, Triacetylresveratrol, Trichostatin A, Iso-Nicotinamide, Valproxam, BML-278, SAHA, Fluoro-SAHA, and Suramin Na.
39. The pharmaceutical composition of paragraphs 37 or 38 further comprising donor oligonucleotide.
40. The pharmaceutical composition of any one of paragraphs 37-39, wherein the peptide oligomer, donor oligonucleotide, potentiating agent, or a combination thereof is formulated in the same or different nanoparticles.
41. A method of modifying the genome of cells comprising contacting the cells with the pharmaceutical composition of any one of paragraphs 37-40.
42. A method of modifying the genome of cells comprising contacting the cells with an effective amount of a triplex-forming peptide nucleic acid oligomer and a histone deacetylase inhibitor.
43. A method of modifying the genome of cells comprising contacting the cells with an effective amount of a triplex-forming peptide nucleic acid and a potentiating agent selected from vorinostat, 2,4-Pyridinedicarboxylic Acid, Garcinol, Splitomycin, BML-210, Apicidin, Suberoyl bis Hydroxamic acid, Scriptaid, Nullscript, 5-Aza-2-deoxycitidine, Zebularine, ITSA1, Phenylbutyrate Na, Tranylcypromine, Valproic acid, EX-527, Resveratrol, M-344, Nicotinamide, BML-266, Piceatannol, AGK2, Salermide, MC-1293, Anacardic acid, B2, BIX-01294, Butyrolactone 3, CTPB, Oxamflatin, Sirtinol, NCH-51, CI-994, NSC-3852, Aminoresveratrol, BML-281, Triacetylresveratrol, Trichostatin A, Iso-Nicotinamide, Valproxam, BML-278, SAHA, Fluoro-SAHA, and Suramin Na.
44. The method of any one of paragraphs 41-43 wherein the contacting occurs in vitro, ex vivo, or in vivo.
45. The method of any one of paragraphs 41-44 further comprising administering the subject donor oligonucleotide.
46. The method of any one of paragraphs 41-45, wherein the peptide oligomer, donor oligonucleotide, potentiating agent, or a combination thereof is formulated in the same or different nanoparticles.
47. The method of any one of paragraphs 41-46 wherein genome modification is increased in the presence of the histone deacetylase inhibitor or potentiating agent relative to absence of the histone deacetylase inhibitor or potentiating agent.

48. The method of any one of paragraphs 41-47 wherein the peptide nucleic acid oligomer comprises a Hoogsteen binding domain and a Watson-Crick binding domain.

49. The method of any one of paragraphs 41-48 wherein the triplex-forming peptide nucleic acid oligomer is a bis- or tail-clamp peptide nucleic acid oligomer.

50. The method of any one of paragraphs 41-49, wherein the peptide nucleic acid oligomer comprises one or more residues comprising one or more modifications at the gamma position.

51. A peptide nucleic acid (PNA) oligomer comprising a Hoogsteen binding peptide nucleic acid (PNA) segment comprising PNA residues comprising the nucleic acid sequence JJTJTTJ and a Watson-Crick binding PNA segment comprising PNA residues comprising the nucleic acid sequence CTTCTCCACAGGAGT (SEQ ID NO:7) or CTTCTCCACAGGAGTCAG (SEQ ID NO:8) or CTTCTCCACAGGAGTCAGGTGC (SEQ ID NO:9), or a variant thereof comprising a combination of up to 5 nucleic acid sequence substitutions, additions, insertions, or deletions in the Hoogsteen binding PNA segment, the Watson-Crick binding segment or the combination thereof, wherein the two segments can bind or hybridize to a target region in the β-globin gene and induce strand invasion, displacement, and formation of a triple-stranded molecule among the two PNA segments and the target region.

52. The PNA oligomer of paragraph 51, comprising the nucleic acid sequence JJTJTTJ-linker-CTTCTCCACAGGAGT (SEQ ID NO:10); or JJTJTTJ-linker-CTTCTCCACAGGAGTCAG (SEQ ID NO:11); or JJTJTTJ-linker-CTTCTCCACAGGAGTCAGGTGC (SEQ ID NO:12), wherein "linker" is a flexible linker, linking the Hoogsteen binding segment to the Watson-Crick binding segment.

or a variant thereof comprising a combination of up to 5 nucleic acid sequence substitutions, additions, insertions, or deletions in the Hoogsteen binding PNA segment, the Watson-Crick binding segment or the combination thereof.

53. The PNA oligomer of paragraphs 51 or 52, comprising the nucleic acid sequence JJTJTTJ-linker-CTTCTCCACAGGAGT (SEQ ID NO:10); or JJTJTTJ-linker-CTTCTCCACAGGAGTCAG (SEQ ID NO:11); or JJTJTTJ-linker-CTTCTCCACAGGAGTCAGGTGC (SEQ ID NO:12), wherein "linker" is a flexible linker, linking the Hoogsteen binding segment to the Watson-Crick binding segment.

54. The PNA oligomer any one of paragraphs 51-53, comprising the nucleic acid sequence JJTJTTJ-linker-CTTCTCCACAGGAGTCAG (SEQ ID NO:11), wherein "linker" a flexible linker.

55. The PNA oligomer of any one of paragraphs 51-54, wherein the oligomer is free from gamma (γ) modifications in the PNA residues.

56. The PNA oligomer of paragraph 5, comprising the nucleic acid sequence lys-lys-lys-lys-lys-lys-JJTJTTJ-OOO-CTTCTCCACAGGAGTCAG-lys-lys-lys (SEQ ID NO:14) (SCD-tcPNA1).

57. The PNA oligomer of any one of paragraphs 51-54, wherein one or more of the PNA residues in the Hoogsteen binding segment, the Watson-Crick binding segment, or a combination thereof comprises a substitution at the gamma (γ) position of one or more PNA residues.

58. The PNA oligomer of paragraph 57, comprising the nucleic acid sequence lys-lys-lys-JJTJTTJ-OOO-$\underline{c}$ T $\underline{T}$ C $\underline{T}$ C$\underline{c}$ A$\underline{c}$ A$\underline{g}$ G$\underline{a}$ G$\underline{t}$ C$\underline{a}$ G-lys-lys-lys (SEQ ID NO:14), wherein the bolded and underlined residues are γ modified PNA.

59. A peptide nucleic acid (PNA) oligomer comprising a Hoogsteen binding peptide nucleic acid (PNA) segment comprising PNA residues comprising the nucleic acid sequence TJTJTTJT and a Watson-Crick binding PNA segment comprising PNA residues comprising the nucleic acid sequence TCTTCTCTGTCTCCAC (SEQ ID NO:16) or TCTTCTCTGTCTCCACAT (SEQ ID NO:17), or a variant thereof comprising a combination of up to 5 nucleic acid sequence substitutions, additions, insertions, or deletions in the Hoogsteen binding PNA segment, the Watson-Crick binding segment or the combination thereof, wherein the two segments can bind or hybridize to a target region in the β-globin gene and induce strand invasion, displacement, and formation of a triple-stranded molecule among the two PNA segments and the target region.

60. The PNA oligomer of paragraph 59, comprising the nucleic acid sequence TJTJTTJT-linker-TCTTCTCTGTCTCCAC (SEQ ID NO:18); or TJTJTTJT-linker-TCTTCTCTGTCTCCACAT (SEQ ID NO:19), wherein "linker" is a flexible linker, linking the Hoogsteen binding segment to the Watson-Crick binding segment.

or a variant thereof comprising a combination of up to 5 nucleic acid sequence substitutions, additions, insertions, or deletions in the Hoogsteen binding PNA segment, the Watson-Crick binding segment or the combination thereof.

61. The PNA oligomer of paragraphs 59 or 60, comprising the nucleic acid sequence TJTJTTJT-linker-TCTTCTCTGTCTCCAC (SEQ ID NO:18); or TJTJTTJT-linker-TCTTCTCTGTCTCCACAT (SEQ ID NO:19), wherein "linker" is a flexible linker, linking the Hoogsteen binding segment to the Watson-Crick binding segment.

62. The PNA oligomer of any one of paragraphs 59-61, comprising the nucleic acid sequence TJTJTTJT-linker-TCTTCTCTGTCTCCACAT (SEQ ID NO:19), wherein "linker" a flexible linker.

63. The PNA oligomer of any one of paragraphs 59-62, wherein the oligomer is free from gamma (γ) modifications in the PNA residues.

64. The PNA oligomer of paragraph 63, comprising the nucleic acid sequence lys-lys-lys-lys-lys-lys-TJTJTTJT-OOO-TCTTCTCTGTCTCCACAT-lys-lys-lys (SEQ ID NO:21) (SCD-tcPNA1).

65. The PNA oligomer of any one of paragraphs 59-62, wherein one or more of the PNA residues in the Hoogsteen binding segment, the Watson-Crick binding segment, or a combination thereof comprises a substitution at the gamma (γ) position of one or more PNA residues.

66. The PNA oligomer of paragraph 65, comprising the nucleic acid sequence lys-lys-lys-lys-lys-lys-TJTJTTJT-OOO-$\underline{\mathbf{T}}$ C $\underline{\mathbf{T}}$ T$\underline{\mathbf{c}}$ T$\underline{\mathbf{c}}$ T$\underline{\mathbf{g}}$ T$\underline{\mathbf{c}}$ T$\underline{\mathbf{c}}$ C$\underline{\mathbf{a}}$ C$\underline{\mathbf{a}}$ T-lys-lys-lys (SEQ ID NO:21), wherein the bolded and underlined residues are γ modified PNA.

67. A nanoparticle encapsulating or entrapping the PNA oligomer of any one of paragraphs 51-66.
68. The nanoparticle of paragraph 67 further comprising a donor oligonucleotide comprising a sequence that can correct a mutation(s) in a cell's genome by recombination induced or enhanced by the peptide nucleic acid oligomer.
69. The nanoparticle of paragraphs 67 or 68, wherein the nanoparticles comprise a core and shell.
70. The nanoparticle of paragraph 69, wherein the core comprises a hydrophobic polymer.
71. The nanoparticle of paragraph 70, wherein the hydrophobic polymer is a polyhydroxyester.
72. The nanoparticle of paragraph 71, wherein the polyhydroxyester is selected from poly(lactic acid), poly(glycolic acid), and poly(lactic acid-co-glycolic acid).
73. The nanoparticle of paragraph 72, wherein the polyhydroxyester is poly(lactic acid).
74. The nanoparticle of any one of paragraphs 69-73, wherein the shell is a hyperbranched polymer.
75. The nanoparticle of paragraph 74, wherein the hyperbranched polymer is hyperbranched polyglycerol (HPG).
76. The nanoparticle of paragraph 75, wherein core is poly(lactic acid) (PLA) and the shell is hyperbranched polyglycerol (HPG), optionally according to Table 1, optionally wherein the nanoparticle is P7H9-2.
77. A pharmaceutical composition comprising an effective amount of the PNA oligomer of any one of paragraphs 51-66.
78. The pharmaceutical composition of paragraph 77 further comprising a donor oligonucleotide comprising a sequence that can correct a mutation(s) in a cell's genome by recombination induced or enhanced by the peptide nucleic acid oligomer.
79. A pharmaceutical composition comprising an effective amount of the nanoparticle of any one of paragraphs 67-76.
80. The pharmaceutical composition of any one of paragraphs 77-79 further comprising a targeting moiety, a cell penetrating peptide, or a combination thereof associated with, linked, conjugated, or otherwise attached directly or indirectly to the PNA oligomer or the nanoparticles.
81. The pharmaceutical composition of any one of paragraphs 77-80 further comprising a potentiating agent to increase the frequency of recombination of the donor oligonucleotide at a target site in the genome of a population of cells.
82. A method of modifying the genome of cells comprising contacting the cells with the pharmaceutical composition of any one of paragraphs 77-81.
83. The method of paragraph 82 wherein the contacting occurs in vitro, ex vivo, or in vivo.
84. The method of paragraph 83, wherein the contacting occurs in vivo in a subject with Sickle Cell Disease.
85. The method of paragraph 84, wherein the pharmaceutical composition is administered to the subject in an effective amount to correct a Sickle Cell Disease mutation in an effective number of cells to reduce one or more symptoms of the disease or disorder.
86. The method of paragraph 83, wherein the contacting occurs ex vivo, the cells are autologous cells to a subject, and the cells are administered to the subject in an effective amount to treat Sickle Cell Disease.
87. The method of any one of paragraphs 82-86 further comprising contacting the cells with an effective amount of a potentiating agent to increase the frequency of recombination of the donor oligonucleotide at a target site in the genome of the cells.
88. The method of paragraph 87, wherein the potentiating agent is a Rad51 modulator.
89. The method of paragraph 88, wherein potentiating agent stimulates or increases Rad51 expression.
90. The method of paragraph 88, wherein the potentiating agent decreases or inhibits Rad51 expression.
91. The method of paragraph 87, wherein the potentiating agent is a histone deacetylase inhibitor.
92. The method of paragraph 91, wherein the histone deacetylase inhibitor is vorinostat.
93. A nanoparticle comprising a poly(lactic acid) (PLA) core and hyperbranched polyclycerol (HPG) shell according Table 1 comprising a peptide nucleic acid oligomer encapsulating or entrapping a triplex-forming peptide nucleic acid oligomer.
94. The nanoparticle of paragraph 93, further comprising a donor oligonucleotide.
95. The nanoparticle of paragraphs 93 and 94 wherein the nanoparticle is P7H9-2.
96. A nanoparticle comprising
a core comprising a polyhydroxyester polymer selected from poly(lactic acid), poly(glycolic acid), and poly(lactic acid-co-glycolic acid);
a shell comprising a hyperbranched polyglycerol (HPG); and
a plurality of a peptide nucleic acid (PNA) oligomer entrapped or encapsulated therein, the PNA oligomer comprising
a Hoogsteen binding peptide nucleic acid segment comprising PNA residues comprising the nucleic acid sequence TTJJTJT and a Watson-Crick binding PNA segment comprising PNA residues comprising the nucleic acid sequence TCTCCTTAAACCTGT (SEQ ID NO:1), TCTCCTTAAACCTGTCTT (SEQ ID NO:2), or
a variant thereof comprising a combination of up to 5 nucleic acid sequence substitutions, additions, insertions, or deletions in the Hoogsteen binding PNA segment, the Watson-Crick binding segment, or the combination thereof,
wherein the two segments can bind or hybridize to a target region in the β-globin gene and induce strand invasion, displacement, and formation of a triple-stranded molecule among the two PNA segments and the target region.
97. The nanoparticle of paragraph 96, wherein the PNA oligomer comprises the nucleic acid sequence TTJJTJT-linker-TCTCCTTAAACCTGT (SEQ ID NO:3) or TTJJTJT-linker-TCTCCTTAAACCTGTCTT (SEQ ID NO:4), wherein "linker" is a flexible linker, linking the Hoogsteen binding segment to the Watson-Crick binding segment.
or a variant thereof comprising a combination of up to 5 nucleic acid sequence substitutions, additions, insertions, or deletions in the Hoogsteen binding PNA segment, the Watson-Crick binding segment or the combination thereof.
98. The nanoparticle of paragraphs 96 or 97, wherein the PNA oligomer comprises the nucleic acid sequence TTJJTJT-linker-TCTCCTTAAACCTGT (SEQ ID NO:3) or TTJJTJT-linker-TCTCCTTAAACCTGTCTT (SEQ ID NO:4), wherein "linker" is a flexible linker, linking the Hoogsteen binding segment to the Watson-Crick binding segment.

99. The nanoparticle any one of paragraphs 96-98, wherein the PNA oligomer comprises the nucleic acid sequence TTJJTJT-linker-TCTCCTTAAACCT GTCTT (SEQ ID NO:4), wherein "linker" a flexible linker.

100. The nanoparticle of any one of paragraphs 96-99, wherein the PNA oligomer is free from gamma (γ) modifications in the PNA residues.

101. The nanoparticle of paragraph 100, wherein the PNA oligomer comprises the nucleic acid sequence lys-lys-lys-TTJJTJT-OOO-TCTCCTTAAACCTGTCTT-lys-lys-lys (SEQ ID NO:5).

102. The nanoparticle of any one of paragraphs 96-99, wherein one or more of the PNA residues in the Hoogsteen binding segment, the Watson-Crick binding segment, or a combination thereof comprises a substitution at the gamma (γ) position of one or more PNA residues.

103. The nanoparticle of paragraph 102, wherein the PNA oligomer comprises the nucleic acid sequence lys-lys-lys-TTJJTJT-OOO-T̲ C̲T̲ C̲c̲ T̲T̲ A̲a̲ A̲c̲ C̲T̲ G̲T̲ C T̲ T-lys-lys-lys (SEQ ID NO:5), wherein the bolded and underlined residues are γ modified PNA.

104. The nanoparticle of paragraph 103, wherein the γ modification is miniPEG.

105. The nanoparticle of paragraph 103, wherein the γ modification is serine.

106. The nanoparticle of any one of paragraphs 96-105, wherein core is poly(lactic acid) (PLA).

107. The nanoparticle of paragraph 106, wherein the shell comprises a low molecular weight HPG.

108. The nanoparticle of paragraph 107, wherein the number average molecular weight (Mn) of the PLA is about 12 kDa and optionally is 12.7 kDa, and the number average molecular weight (Mn) of the HPG is about 5 kDa, and optionally is 5.4 kDa.

109. The nanoparticle of paragraph 108, wherein the conjugation ratio is about 1 and is optionally 1.3, the HPG (wt %) is about 40% and is optionally 38%, or a combination thereof.

110. The nanoparticle of paragraph 109, where the PNA oligomer comprises the nucleic acid sequence lys-lys-lys-TTJJTJT-OOO-TCTCCTTAAACCTGTCTT-lys-lys-lys (SEQ ID NO:5).

111. The nanoparticle of paragraph 110, wherein the PNA oligomer comprises the nucleic acid sequence lys-lys-lys-TTJJTJT-OOO-T̲ C̲T̲ C̲c̲ T̲T̲ A̲a̲ A̲c̲ C̲T̲ G̲T̲ C T̲ T-lys-lys-lys (SEQ ID NO:5), wherein the bolded and underlined residues are serine γ modified PNA.

112. The nanoparticle of any one of paragraphs 96-111 further comprising a targeting moiety, a cell penetrating peptide, or a combination thereof associated with, linked, conjugated, or otherwise attached thereto.

113. The nanoparticle of any one of paragraphs 96-112 further comprising a donor oligonucleotide entrapped or encapsulated therein, the donor oligonucleotide comprising a sequence that can correct a mutation(s) in a cell's genome by recombination induced or enhanced by the peptide nucleic acid oligomer.

114. A pharmaceutical composition comprising an effective amount of the nanoparticle of any one of paragraphs 96-113.

115. The pharmaceutical composition of paragraph 114, further comprising a potentiating agent to increase the frequency of recombination of the donor oligonucleotide at a target site in the genome of a population of cells.

116. The pharmaceutical composition of paragraphs 114 or 115, wherein the potentiating agent is selected from vorinostat, 2,4-Pyridinedicarboxylic Acid, Garcinol, Splitomycin, BML-210, Apicidin, Suberoyl bis Hydroxamic acid, Scriptaid, Nullscript, 5-Aza-2-deoxycitidine, Zebularine, ITSA1, Phenylbutyrate Na, Tranylcypromine, Valproic acid, EX-527, Resveratrol, M-344, Nicotinamide, BML-266, Piceatannol, AGK2, Salermide, MC-1293, Anacardic acid, B2, BIX-01294, Butyrolactone 3, CTPB, Oxamflatin, Sirtinol, NCH-51, CI-994, NSC-3852, Aminoresveratrol, BML-281, Triacetylresveratrol, Trichostatin A, Iso-Nicotinamide, Valproxam, BML-278, SAHA, Fluoro-SAHA, and Suramin Na.

117. The pharmaceutical composition of paragraph 116, wherein the PNA oligomer comprises the nucleic acid sequence lys-lys-lys-TTJJTJT-OOO-TCTCCT-TAAACCTGTCTT-lys-lys-lys (SEQ ID NO:5);
the number average molecular weight (Mn) of the PLA is about 12 kDa and optionally is 12.7 kDa, and the number average molecular weight (Mn) of the HPG is about 5 kDa, and optionally is 5.4 kDa; and the potentiating agent is vorinostat, RI-1, B0-2, or 3E10 antibody or a fragment thereof.

118. The pharmaceutical composition of paragraph 117, wherein the PNA oligomer comprises the nucleic acid sequence lys-lys-lys-TTJJTJT-OOO-T̲ C̲T̲ C̲c̲ T̲T̲ A a̲ A̲c̲ C̲T̲ G̲T̲ C T̲ T-lys-lys-lys (SEQ ID NO:5), wherein the bolded and underlined residues are serine γ modified PNA.

119. The pharmaceutical composition of paragraph 118, wherein the potentiating agent is vorinostat.

120. A method of modifying the genome of cells comprising contacting the cells with the pharmaceutical composition of any one of paragraphs 114-120.

121. The method of paragraph 120 wherein the contacting occurs in vitro, ex vivo, or in vivo.

122. The method of paragraph 121, wherein the contacting occurs in vivo in a subject with Sickle Cell Disease.

123. The method of paragraph 122, wherein the pharmaceutical composition is administered to the subject in an effective amount to correct a Sickle Cell Disease mutation in an effective number of cells to reduce one or more symptoms of the disease or disorder.

124. The method of paragraph 121, wherein the contacting occurs ex vivo, the cells are autologous cells to a subject, and the cells are administered to the subject in an effective amount to treat Sickle Cell Disease.

125. The method of any of paragraphs 120-124 further comprising contacting the cells with an effective amount of a potentiating agent to increase the frequency of recombination of the donor oligonucleotide at a target site in the genome of the cells.

EXAMPLES

Example 1: PNA Sequences are Safe, and can Target and Correct the Sickle Cell Disease (SCD) Mutation PNA Sequences were designed to target the sickle-cell β-globin locus. FIG. 1 is a schematic illustrating tcPNA binding to sites near the SCD mutation, and sequences of tcPNAs targeting the SCD mutation. The sequences are exemplary tcPNAs targeting the SCD mutation with alternating mini-PEG modified bases along the Watson-Crick domain: SCD-tcPNA 1A: H-KKK-JJTJTTJ-OOO-c̲ T̲t̲ C T C c A c A g G A G T CA g -KKK-NH2 (SEQ ID NO:14); SCD-tcPNA 2A: H-KKK-TTJJTJT-OOO-T C T C c T T A A A g C T G T C T T-KKK-NH2 (SEQ ID NO:5); SCD-tcPNA 3A: H-KKK-TJTJTTJT-OOO-T C T T c T c T g T c T c C A C A T-KKK-NH2 (SEQ ID NO:21). K indicates lysine; J, pseudoisocytosine (for C) for pH-independent triplex formation. O, 8-amino-2,6,10-trioxaoctanoic acid linkers connecting the Hoogsteen and Watson-Crick domains of the tcPNAs, mini-PEG modified bases (bold and underlined) along the Watson-Crick domain.

In sickle cell disease (SCD), the mutation (GAG→GTG) at codon 6 results in glutamic acid changed to valine. The following donor DNA was utilized for gene correction.

(SEQ ID NO: 22)
T(s)T(s)G(s)CCCCACAGGGCAGTAACGGCAGACTTCTCCTCAGGAGTC

AGGTGCACCATGGTGTCTGT(s)T(s)T(s)G, wherein "(s)" indicates a phosphorothiate internucleoside linkage.

Figure 2:
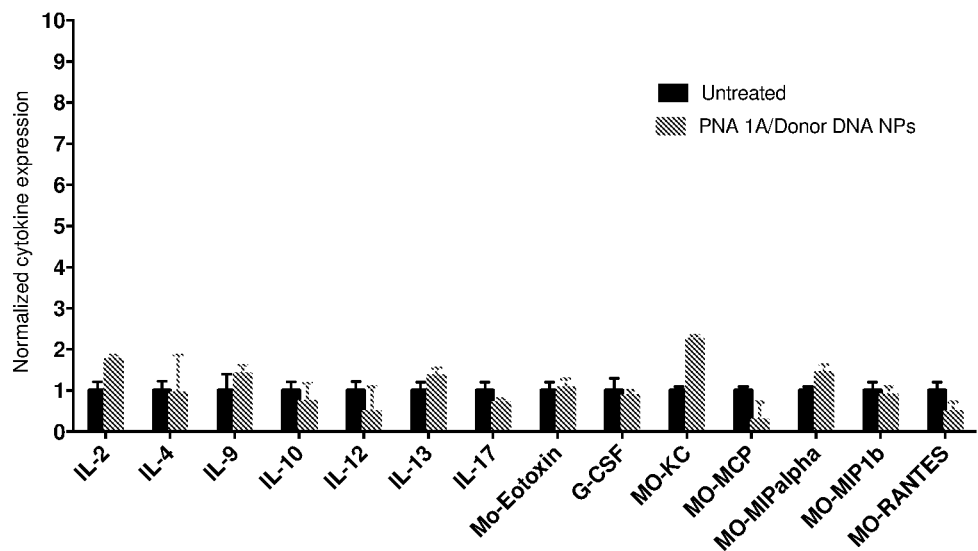
FIG. 2 is a bar graph showing cytokine expression in primary bone marrow cells treated with PLGA NPs encapsulating tcPNA 1A and correcting donor DNA.

The toxicity and safety of PNA/donor DNA delivery using nanoparticles were investigated. Primary mouse bone marrow cells were treated with PLGA nanoparticles (NPs) encapsulating tcPNA 1A and correcting donor DNA. 48 hours after treatment cells were spun, media collected, and assayed for cytokine expression. Under these conditions, treatment with tcPNA NPs did not produce inflammatory cytokine expression. These results are shown in FIG. 2.

Figure 3:
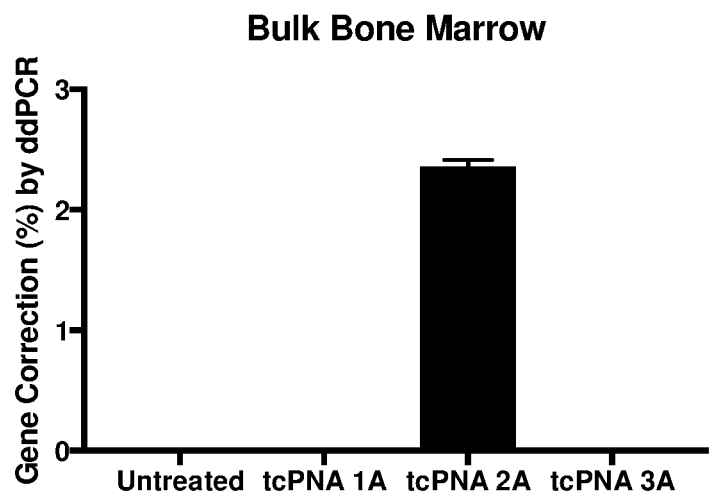
FIG. 3 is a bar graph showing SCD gene correction (%) as measured by droplet digital ddPCR of genomic DNA (gDNA) from bulk mouse bone marrow cells treated with PLGA NPs encapsulating tcPNA 1A, 2A, 3A and correcting donor DNA molecules.

Bulk mouse bone marrow cells were treated with PLGA NPs encapsulating tcPNA 1A, 2A, 3A and correcting donor DNA molecules. These results, illustrated in FIG. 3, indicate that tcPNA can correct the SCD mutation. tcPNA 2A demonstrated the highest level of gene editing as measured by ddPCR.

Figure 4:
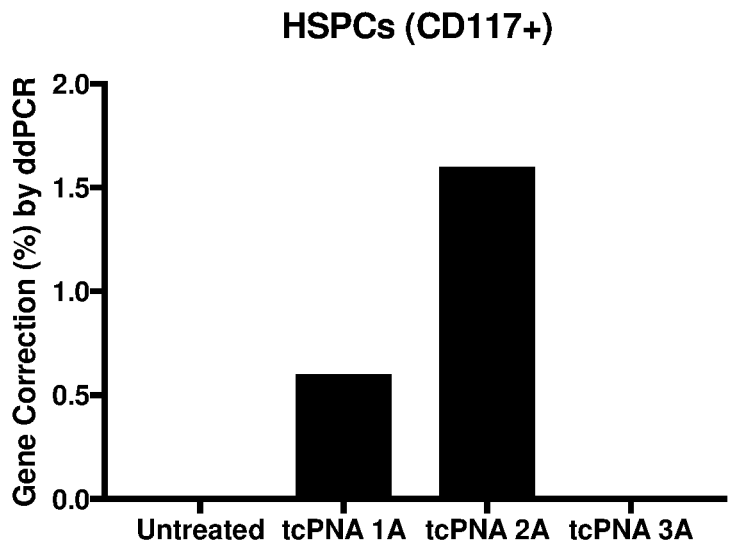
FIG. 4 is a bar graph showing SCD gene correction (%) as measured by ddPCR of gDNA from CD117+ HSPCs isolated from a mouse model of human SCD treated with PLGA NPs encapsulating tcPNA 1A, 2A, 3A and correcting donor DNA molecules.

Bulk bone marrow cells were treated with PLGA NPs encapsulating tcPNA 1A, 2A, 3A and correcting donor DNA molecules. 72 hours after treatment, HSPCs were isolated by CD117+ selection. gDNA was harvested from these cells and assayed for gene correction via ddPCR. These results, illustrated in FIG. 4, show that PNAs can correct the SCD mutation in HSPCs. Again, tcPNA 2A demonstrated the highest level of gene editing as measured by ddPCR.

Example 2: Unmodified tcPNA 2 Induces a Higher Level of Gene Editing than Mini-PEG Modified tcPNA 2A Experiments were designed to compare the levels of gene editing between mini-PEG modified SCD-tcPNA 2A: H-KKK-TTJJTJT-OOO-T C T C c T T A A A c C T G T C T T-KKK-NH2 (SEQ ID NO:5) and unmodified SCD-tcPNA 2: H-KKK-TTJJTJT-OOO-TCTCCT-TAAACCTGTCTT-KKK-NH2 (SEQ ID NO:5) K indicates lysine; J, pseudoisocytosine (for C) for pH-independent triplex formation. O, 8-amino-2,6,10-trioxaoctanoic acid linkers connecting the Hoogsteen and Watson-Crick domains of the tcPNAs, mini-PEG modified bases (bold and underlined) along the Watson-Crick domain. The following donor DNA was utilized for gene correction.

(SEQ ID NO: 22)
T(s)T(s)G(s)CCCCACAGGGCAGTAACGGCAGACTTCTCCTCAGGAGTC

AGGTGCACCATGGTGTCTGT(s)T(s)T(s)G, wherein "(s)" indicates a phosphorothiate internucleoside linkage.

Figure 5:
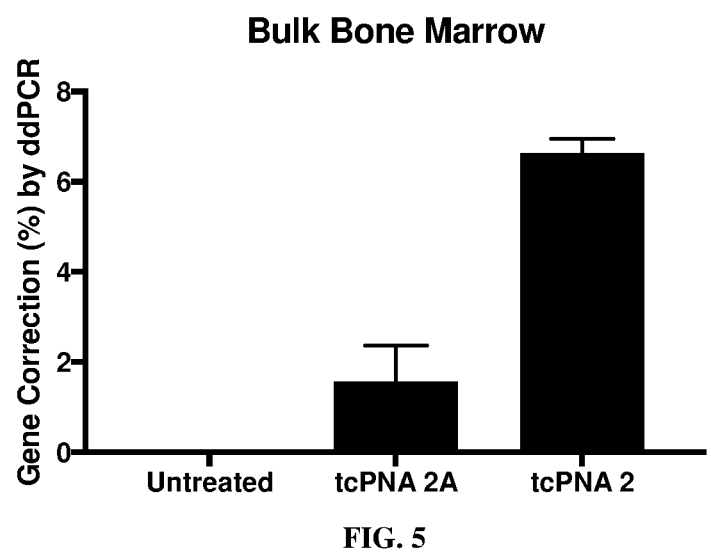
FIG. 5 is a bar graph showing SCD gene correction (%) as measured by ddPCR of gDNA from bulk mouse bone marrow cells treated with PLGA NPs encapsulating mini-PEG modified tcPNA 2A (H-KKK-TTJJTJT-OOO-T CT C c TT AA Ac CT GT CT T-KKK-NH2 (SEQ ID NO:5)) or unmodified tcPNA 2 (H-KKK-TTJJTJT-OOO-TCTCCT-TAAACCTGTCTT-KKK-NH2 (SEQ ID NO:5)), and correcting donor. K indicates lysine; J, pseudoisocytosine (for C) for pH-independent triplex formation. O, 8-amino-2,6,10-trioxaoctanoic acid linkers connecting the Hoogsteen and Watson-Crick domains of the tcPNAs, mini-PEG modified bases (bold and underlined) along the Watson-Crick domain and correcting donor DNA molecules.

Bulk bone marrow cells were treated with PLGA NPs encapsulating modified (tc PNA 2A) and unmodified versions (tc PNA 2) of PNA sequence. 72 hours after treatment, gDNA was isolated and analyzed for editing frequencies by ddPCR. As shown in FIG. 5, unmodified tcPNA 2 resulted in the highest level of editing (Correction of the SCD mutation) in bulk bone marrow cells.

Modified (tcPNA 2A) and unmodified (tcPNA 2) PNAs were incubated with a double-stranded DNA target (200 bp) at indicated temperatures. In both conditions, unmodified PNA demonstrated superior invasion of duplex DNA as indicated by the prominent triplex band.

Figure 6A:
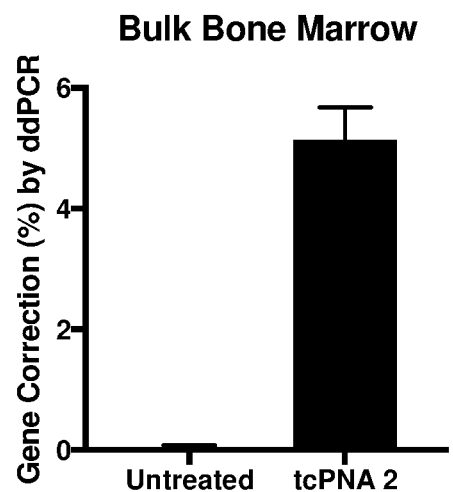
FIGS. 6A-6C are bar graphs showing SCD gene correction (%) as measured by ddPCR of gDNA from bulk mouse bone marrow cells (6A), HSPCs (lin⁻) (6B), and HSPCs (CD117+) (6C) all isolated from mice with the human SCD gene and treated with PLGA NPs encapsulating unmodified tcPNA 2 and correcting donor DNA molecules in ex vivo culture.
Figure 6B:
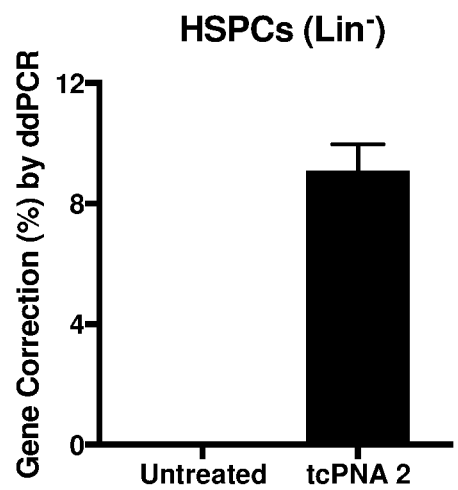
Figure 6C:
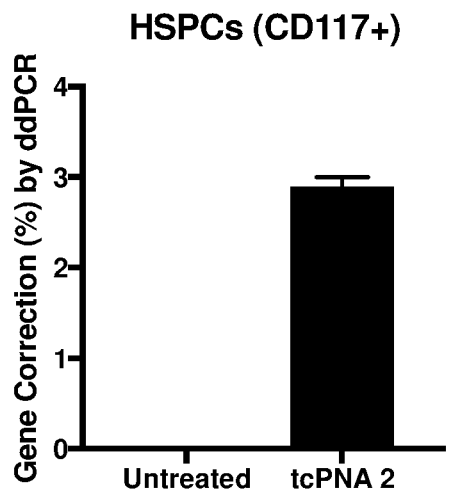

Bulk bone marrow cells were treated with PLGA NPs encapsulating unmodified PNA (tcPNA 2). 72 hours after treatment HSPCs, were isolated from bulk cells via negative and positive selection, and gene editing all three populations was compared. The results are shown in FIGS. 6A-6C. HSPCs isolated via negative selection demonstrated the highest levels of editing, with appreciable editing in both the bulk and CD117+ populations.

Example 3: Gene Editing Frequency of tcPNA 2 can be Further Enhanced

Figure 7A:
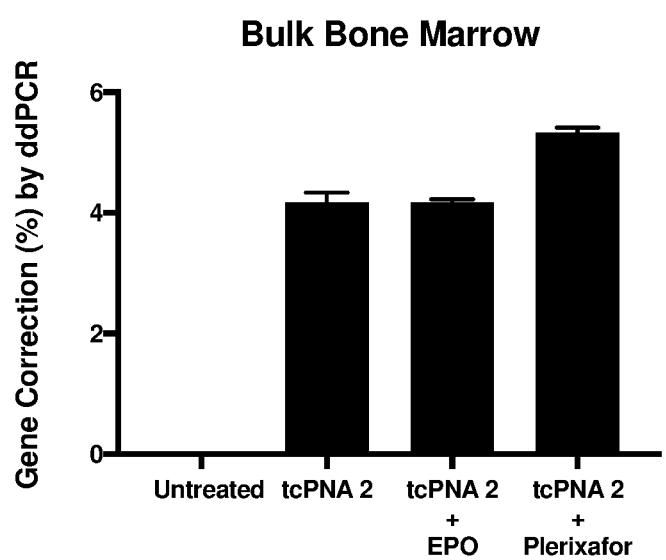
FIGS. 7A-7B are bar graphs showing SCD gene correction (%) as measured by ddPCR of gDNA from bulk bone marrow cells (7A) and HSPCs (lin⁻) (7B) treated ex vivo with PLGA NPs encapsulating unmodified tcPNA 2 and correcting donor DNA molecules in combination with stem cell factor, erythropoietin, and plerixafor.
Figure 7B:
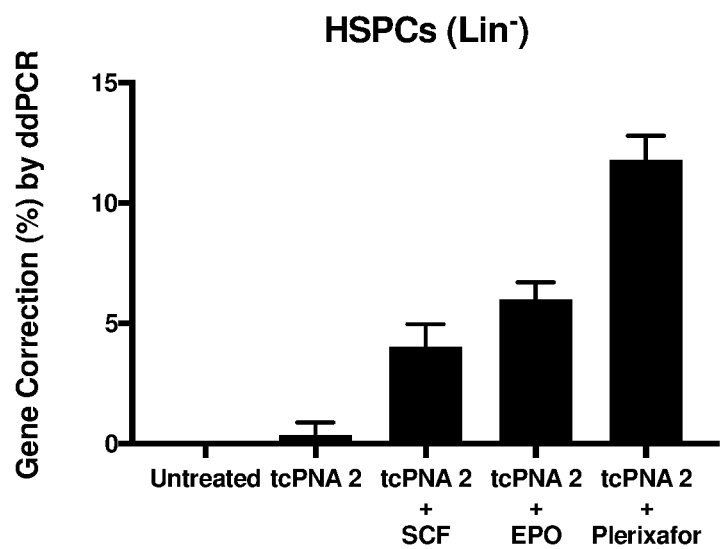

Bulk bone marrow and HSPCs (lin⁻) were treated with tcPNA 2 nanoparticles and combinations of stem cell factor, erythropoietin, and plerixafor. 72 hours after treatment, gDNA was isolated and analyzed for editing frequencies by ddPCR. Notably, SCF, EPO, and Plerixafor all increased gene editing frequencies, particularly in HSPCs. The results are shown in FIG. 7.

Bulk bone marrow cells were treated with tcPNA 2 encapsulated into poly(lactic-co-glycolic acid) (PLGA), or poly(lactic acid)PLA-HPG.

Nanoparticles made from poly(lactic acid) (PLA) conjugated to hyperbranched polyglycerols (HPG), referred to as PLA-HPG, were synthesized using a double emulsion solvent evaporation protocol. Briefly, 50 mg of PLA-HPG was dissolved in 2.4 mL of ethyl acetate and 0.6 mL of DMSO. PNA and donor DNA were heated to 60° C. for 10 minutes, mixed, and immediately added dropwise to the polymer solution under vortex. This 1st emulsion (water-in-oil) was sonicated 3 times at 38% amplitude for 10 seconds using a probe sonicator. Following sonication, the primary emulsion was added dropwise to 4 mL of diH2O, forming the second emulsion (water-in-oil-in-water), which was subsequently sonicated as above. Nanoparticles were further diluted in 20 mL of diH2O. Residual organic solvent was removed using a rotovap. After solvent removal, nanoparticles were collected via centrifugation in Amicon 100K filter tubes. Following a second washing step, nanoparticles were resuspended in diH2O, frozen, and stored as 100 µl aliquots containing 2 mg of nanoparticles. Where indicated, low molecular weight PLA-HPG (P7H9-2) or high molecular weight PLA-HPG (P7H3-18) was used.

A description and characterization of PLA and HPG polymers used for synthesis of PLA-HPG nanoparticles used for delivery of PNA/DNA are in Table 1.

TABLE 1

| A) Polymer | Polymer Source | Inherent Viscosity | Mw (kDa) | Mm (kDa) |
|---|---|---|---|---|
| Poly(lactic acid) (P7) | Lactel | 0.24 | 20.5 | 12.7 |
| Hyperbranched Polyglycerol (PLA-HPG) (H9) | Yale | | | 5.4 |
| Hyperbranched Polyglycerol (PLA-HPG) (H3) | Yale | | | 6.3 |

| B) Polymer | Conjugation Ratio | HPG (wt %) |
|---|---|---|
| P7H9-2 | 1.4 | 38 |
| P7H3-18 | 1.1 | 35 |

Figure 8:
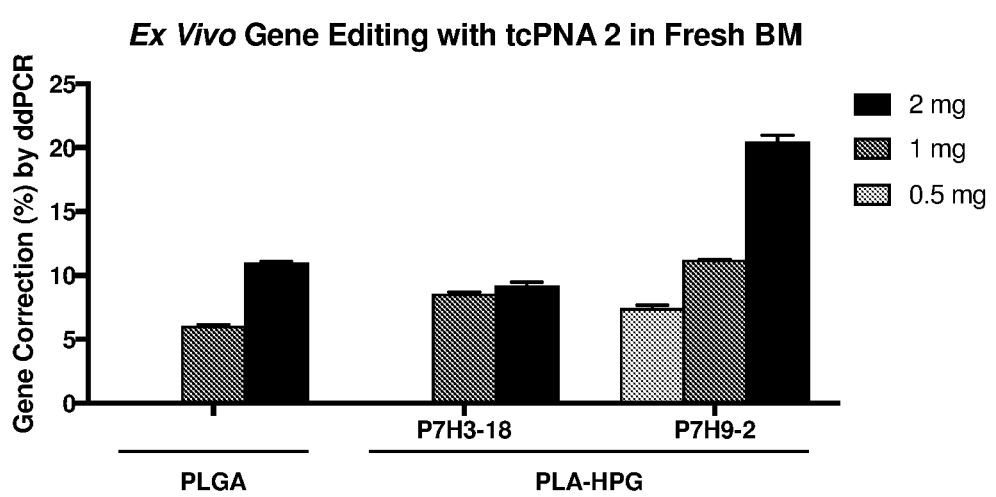
FIG. 8 is a bar graph showing SCD gene correction (%) as measured by ddPCR of gDNA from bulk bone marrow cells treated ex vivo with tcPNA 2 and correcting donor DNA molecules encapsulated into PLGA, or PLA-HPG (P7H9-2) or PLA-HPG (P7H3-18) at 0.5, 1, and 2.0 mg doses.

Of the polymers tested, PLA-HPG (P7H9-2) showed higher levels of editing in a dose dependent fashion. Notably, P7H3-18 also demonstrated higher levels of editing when compared to PLGA NPs at a 1 mg dose. These results, illustrated in FIG. 8, show that PLA-HPG improves PNA-mediated gene editing.

Experiments were designed to test other gamma PNA modifications. tc PNA 2 sequence was modified with a hydroxymethyl (serine) group at the γ position: H-KKK-TTJJTJT-OOO-T CT Cc TT AA Ac CT GT CT T-KKK-NH2 (SEQ ID NO:5), and compared to unmodified SCD-tcPNA 2: H-KKK-TTJJTJT-OOO-TCTCCTTAAAC CTGTCTT-KKK-NH2 (SEQ ID NO:5) K indicates lysine; J, pseudoisocytosine (for C) for pH-independent triplex formation. O, 8-amino-2,6,10-trioxaoctanoic acid linkers connecting the Hoogsteen and Watson-Crick domains of the tcPNAs, serine modified bases (bold and underlined) along the Watson-Crick domain. The following donor DNA was utilized for gene correction.

(SEQ ID NO: 22)
T(s)T(s)G(s)CCCCACAGGGCAGTAACGGCAGACTTCTCCTCAGGAGTC

AGGTGCACCATGGTGTCTGT(s)T(s)T(s)G, wherein "(s)" indicates a phosphorothiate internucleoside linkage.

Figure 9A:
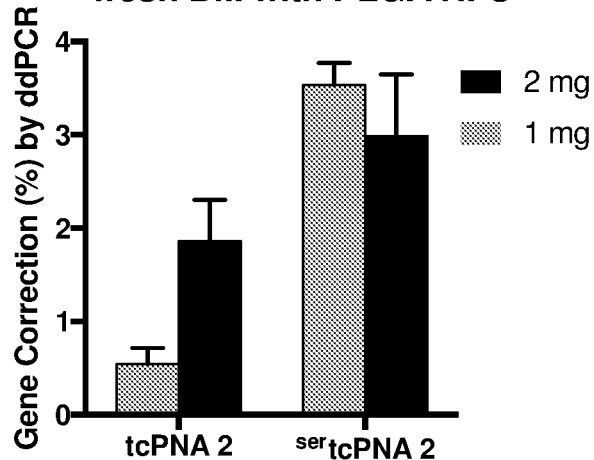
FIGS. 9A-9B are bar graphs showing SCD gene correction (%) as measured by ddPCR of gDNA from bulk bone marrow cells treat ex vivo with PLGA (9A) or PLA-HPG (9B) nanoparticles encapsulating unmodified tcPNA 2 and serine modified $^{ser}$tcPNA 2 along with correcting donor DNA molecules.
Figure 9B:
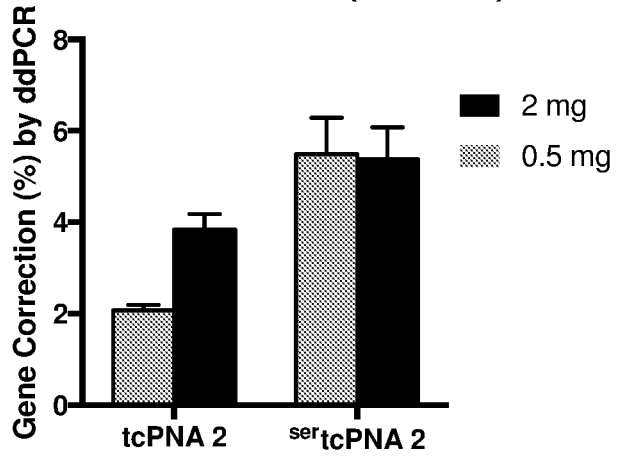

Bulk bone marrow cells were treated with PLGA or PLA-HPG nanoparticles encapsulating unmodified (tcPNA 2) and serine modified (*ser*tcPNA 2) along with correcting donor DNA molecules. In both cases, modified *ser*tcPNA 2 increased gene editing appreciably, even at lower NP doses. These results, illustrated in FIGS. 9A and 9B, show that serine-modified tcPNA 2 improves gene editing relative to unmodified tcPNA 2.

Figure 10:
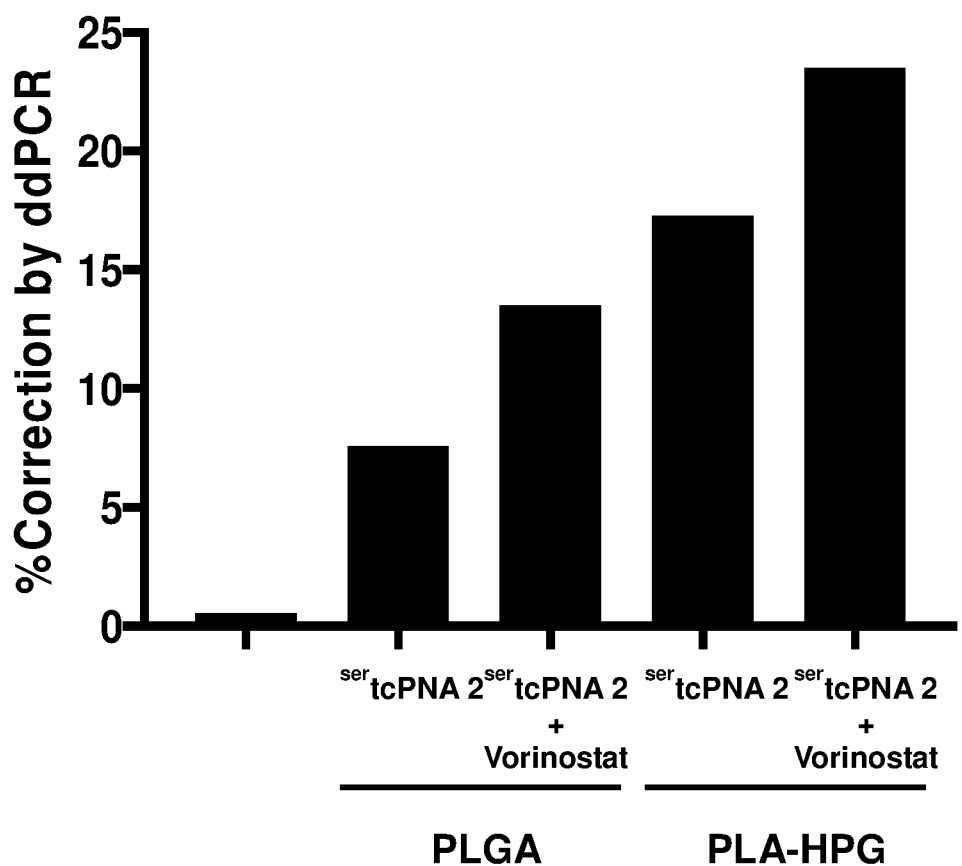
FIG. 10 is a bar graph showing SCD gene correction (%) as measured by ddPCR of gDNA from bulk bone marrow cells treated with PLGA or PLA-HPG NPs tcPNA 2 or $^{ser}$tcPNA 2 and correcting donor DNA molecules, with or without an FDA-approved HDAC inhibitor (Vorinostat).

To test for further enhancement of gene editing, bulk bone marrow cells were treated with PLGA or PLA-HPG NPs encapsulating *ser*tcPNA 2, with or without an FDA-approved HDAC inhibitor (Vorinostat). In all cases, the addition of Vorinostat substantially increased gene editing frequencies. The results are illustrated in FIG. 10 and show that gene editing is enhanced through HDAC inhibition.

Figure 11:
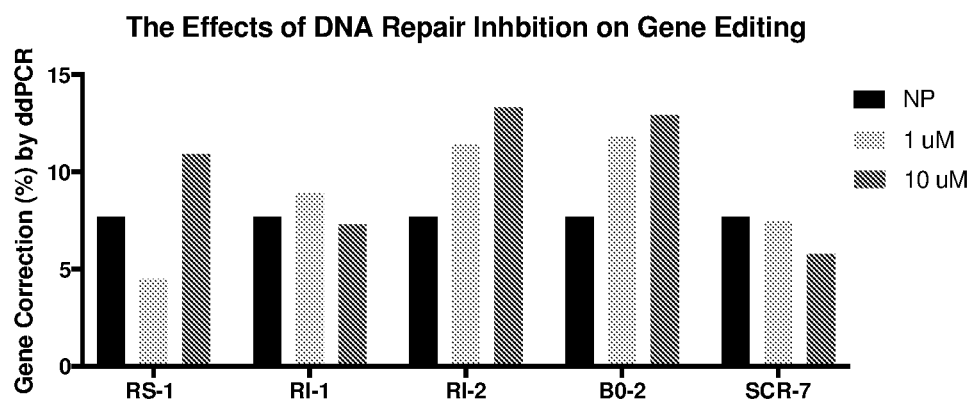
FIG. 11 is a bar graph showing SCD gene correction (%) as measured by ddPCR of gDNA from bulk bone marrow cells treated ex vivo with PLA-HPG nanoparticles encapsulating tcPNA 2 or $^{ser}$tcPNA 2 and correcting donor DNA molecules, with or without the addition of small molecule modulators of DNA repair.

Experiments were designed to test the effects of DNA repair inhibition on gene editing. Bulk bone marrow cells were treated with PLA-HPG nanoparticles encapsulating tcPNA 2 or *ser*tcPNA 2, with or without the addition of small molecule modulators of DNA repair: RS-1, RI-1, RI-2, B0-2, or SCR-7. B0-2 and RS-2, known inhibitors of RAD51, increased gene editing frequencies to levels as high as ~12%, from ~7% (NP only). RI-1, an irreversible inhibitor of RAD51, showed higher levels of editing at a 1 uM dose, but reduced levels at a 10 uM dose. Treatment of cells with RS-1, a stimulator of RAD51, reduced editing frequencies at a 1 uM dose, but showed higher levels of editing at a 10 uM dose. SCR-7, an inhibitor of DNA Ligase IV, decreased PNA-mediated gene editing at 1 and 10 uM doses. The results are illustrated in FIG. 11.

Figure 12:
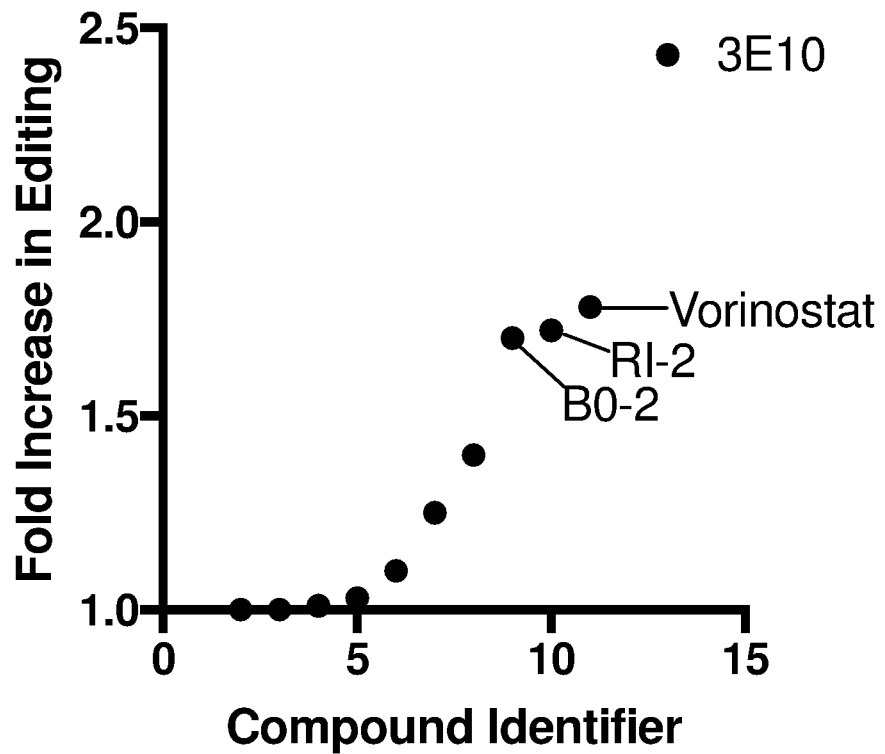
FIG. 12 is a plot showing the results of aggregate analysis of compounds affecting PNA-mediated gene editing. All results in this plot were normalized to treatment with nanoparticles encapsulating PNA and donor DNA alone.

All results in this plot were normalized to treatment with nanoparticles encapsulating PNA and donor DNA alone. Aggregate analysis of potentiating agent compounds affecting PNA-mediated gene editing including B0-2, RI-2, vorinostat, and 3E10 antibody are illustrated in FIG. 12 Three of the top four molecules shown to increase editing are known inhibitors of RAD51.

Example 4: TcPNA 2 can Drive Gene Editing In Vivo

Figure 13:
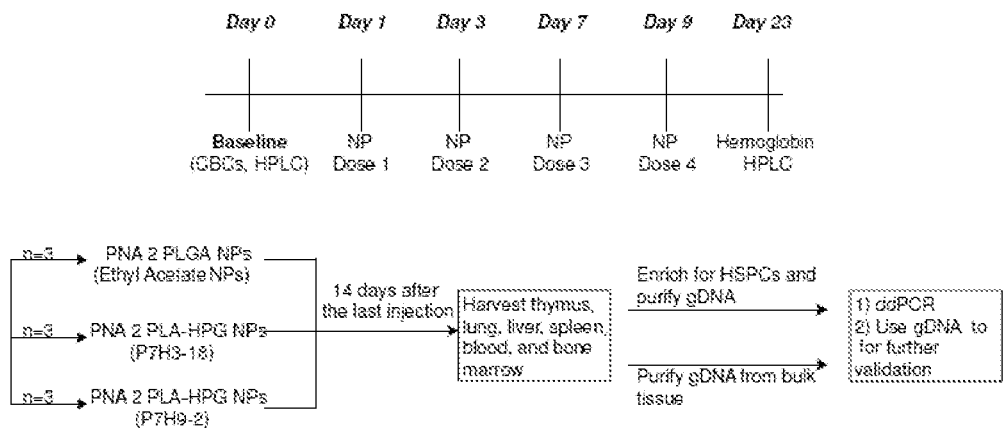
FIG. 13 is a schematic of in vivo dosing schedule and experimental groups.

Experiments were designed to test the ability of tcPNA 2 to drive gene editing in vivo. A schematic of in vivo dosing schedule and experimental groups is shown in FIG. 13.

Berk hemizygous mice treated with nanoparticles encapsulating unmodified SCD-tcPNA 2: H-KKK-TTJJTJT-OOO-TCTCCTTAAACCTGTCTT-KKK-NH2 (SEQ ID NO:5) K indicates lysine; J, pseudoisocytosine (for C) for pH-independent triplex formation. O, 8-amino-2,6,10-trioxaoctanoic acid linkers connecting the Hoogsteen and Watson-Crick domains of the tcPNAs, serine modified bases (bold and underlined) along the Watson-Crick domain and donor DNA:

(SEQ ID NO: 22)
T(s)T(s)G(s)CCCCACAGGGCAGTAACGGCAGACTTCTCCTCAGGAGTC

AGGTGCACCATGGTGTCTGT(s)T(s)T(s)G, wherein "(s)" indicates a phosphorothiate internucleoside linkage.

Figure 14A:
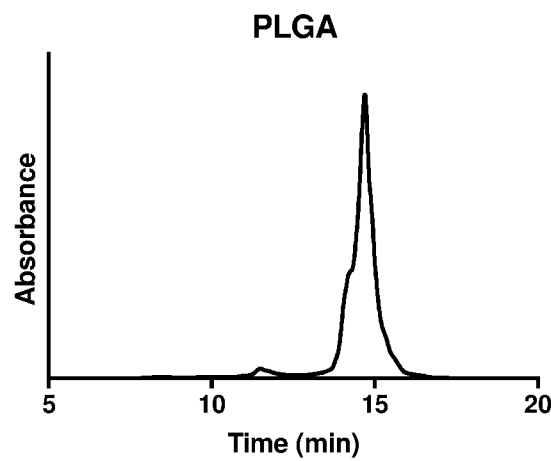
FIGS. 14A-14C are representative hemoglobin HPLC traces of blood from Berk hemizygous mice treated with PLGA (14A), PLA-HPG (P7H3-18) (14B), or PLA-HPG (P7H9-2) (14C) nanoparticles encapsulating tcPNA 2 and correcting donor DNA molecules.
Figure 14B:
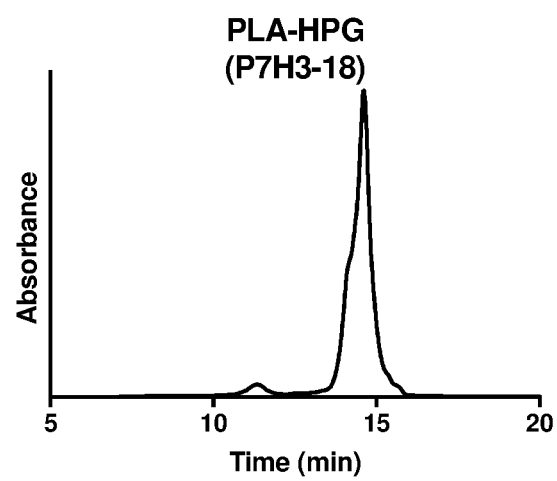
Figure 14C:
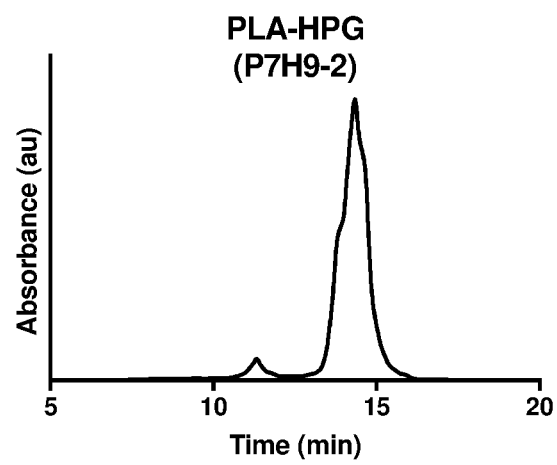
Figure 15:
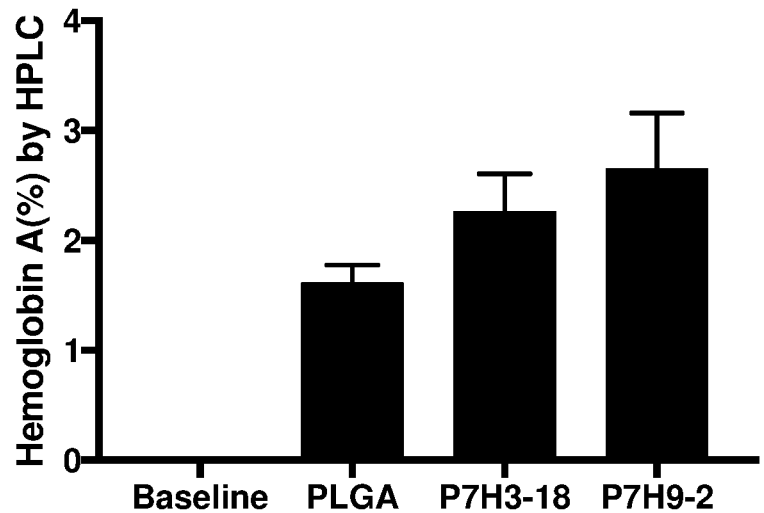
FIG. 15 is a bar graph showing quantification of functional hemoglobin correction (HbA) in vivo following treatment of mice with nanoparticles encapsulating tcPNA 2 and correcting donor DNA.
Figure 16A:
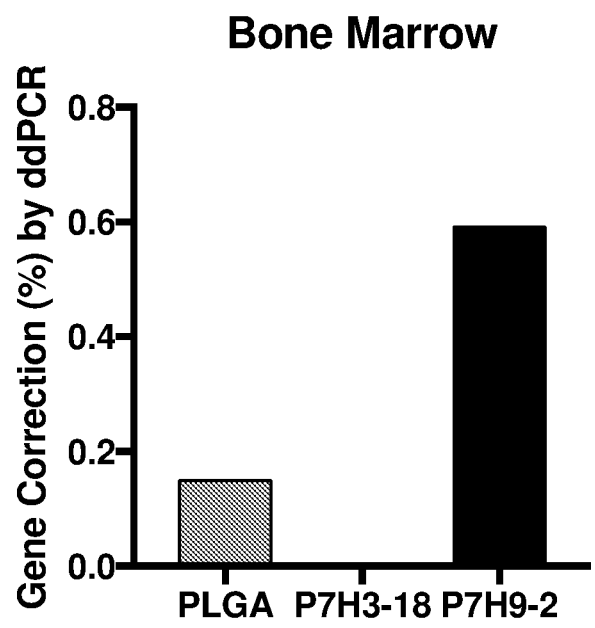
FIGS. 16A-16I are bar graphs showing in vivo gene editing frequencies (SCD gene correction (%) as measured by ddPCR) achieved in bulk bone marrow and CD117+ cells and from various tissues of Berk hemizygous mice treated in vivo by intravenous administration with tcPNA 2 and correcting donor DNA as depicted in FIG. 13.
Figure 16B:
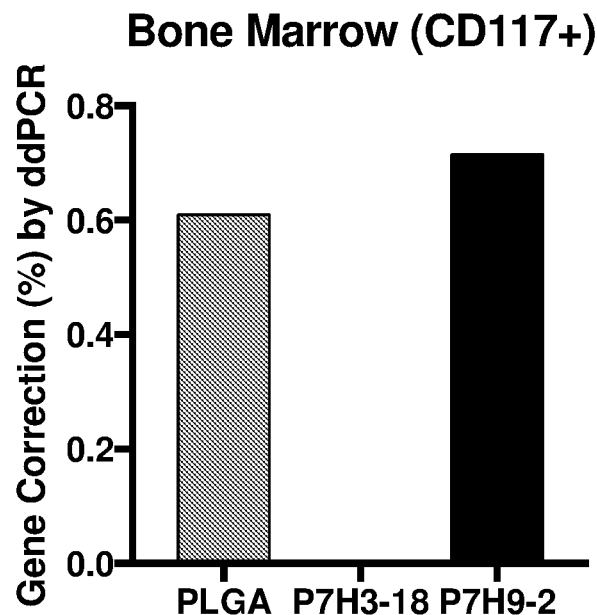
Figure 16C:
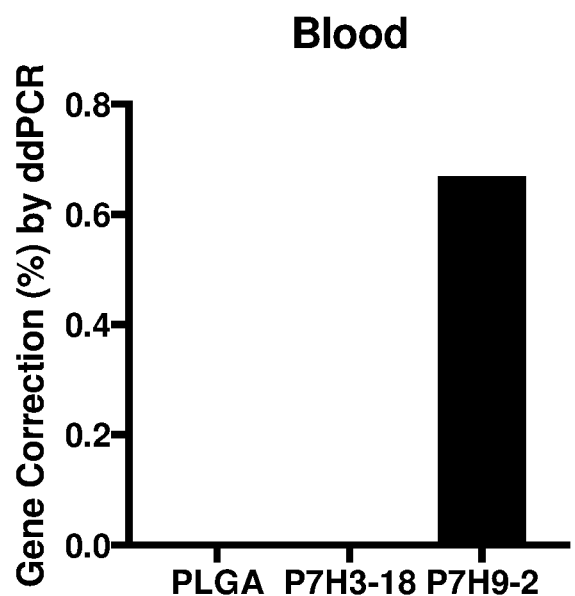
Figure 16D:
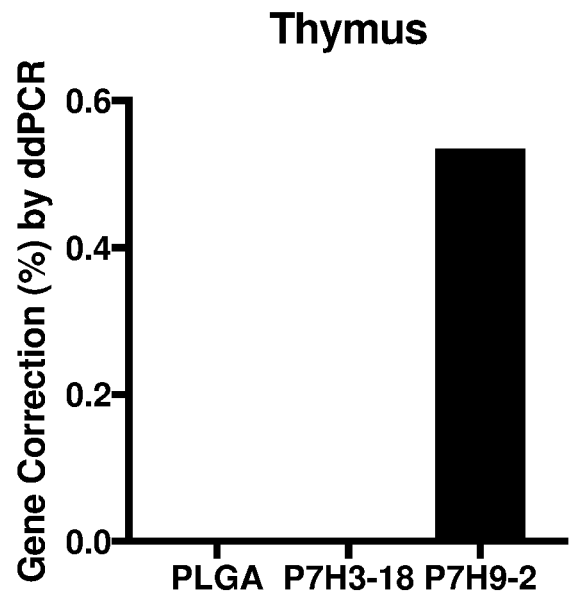
Figure 16E:
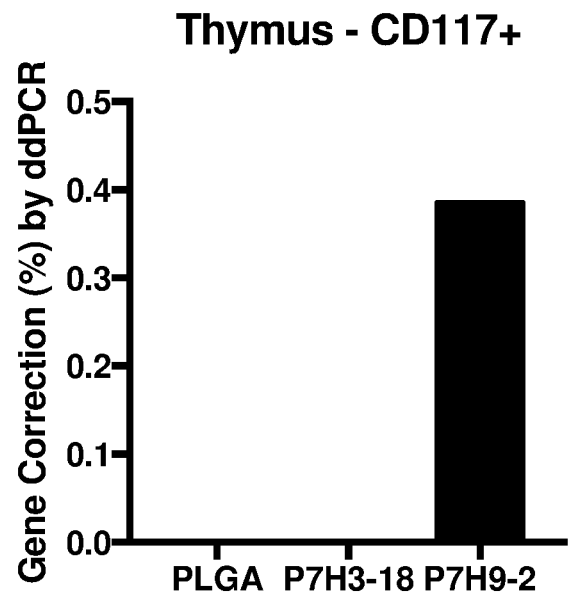
Figure 16F:
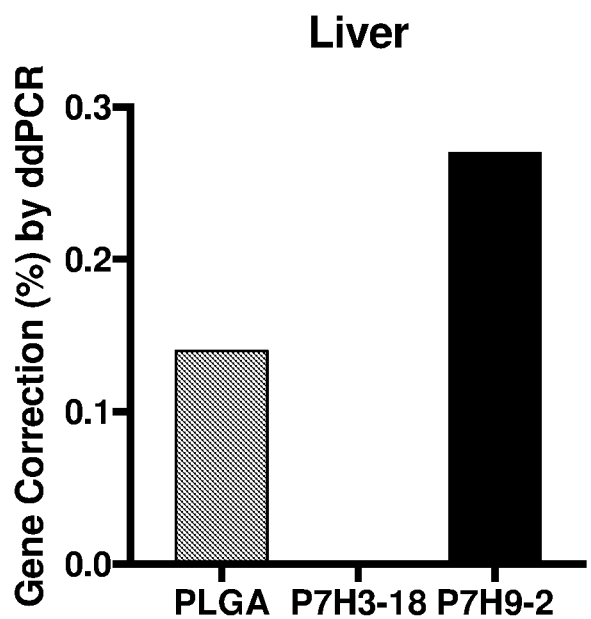
Figure 16G:
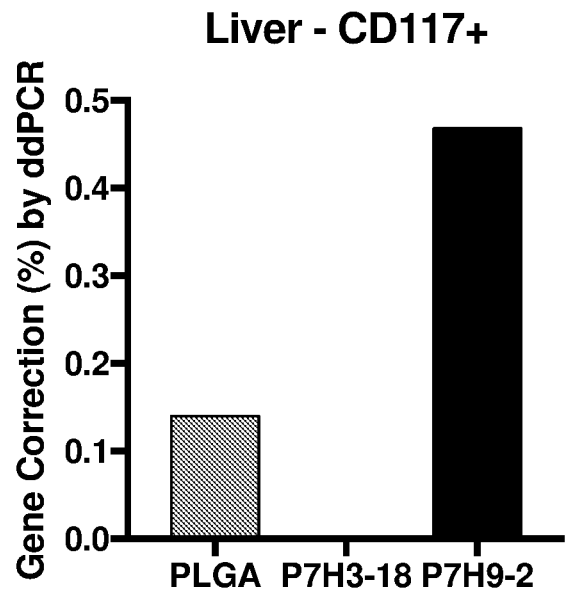
Figure 16H:
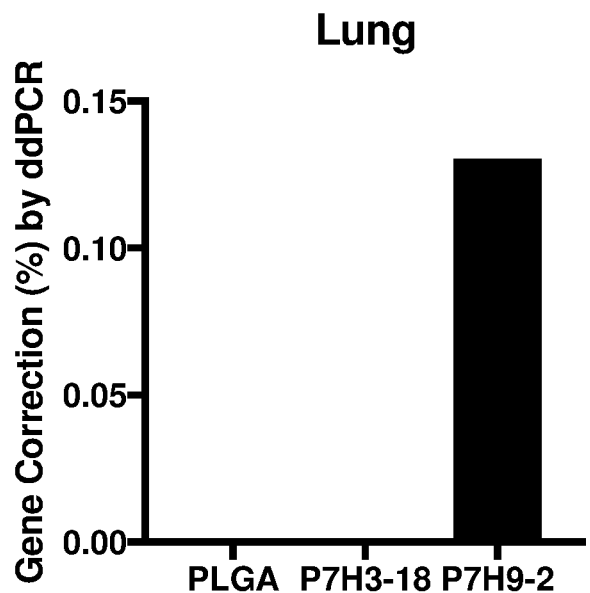
Figure 16I:
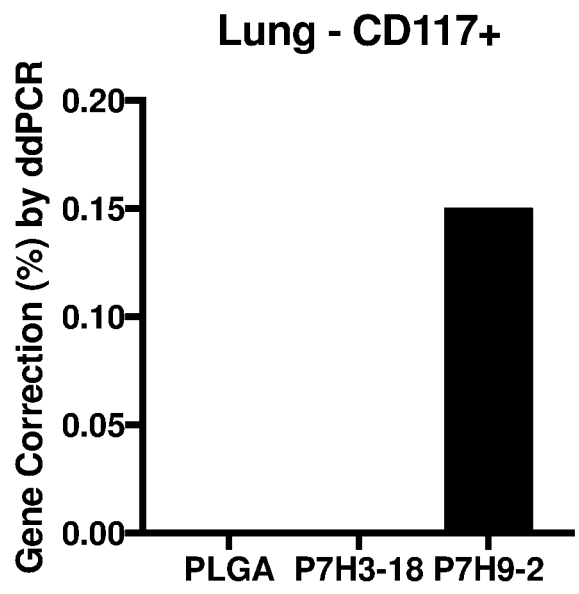

FIGS. 14A-14C shows representative hemoglobin HPLC traces of Berk hemizygous mice treated with nanoparticles encapsulating tcPNA 2 and correcting donor DNA molecules. FIG. 15 shows quantification of functional hemoglobin correction (HbA) in vivo following treatment with nanoparticles encapsulating tcPNA 2 and correcting donor DNA.

FIGS. 16A-16I shows in vivo gene editing frequencies achieved in various tissues of Berk hemizygous mice treated with tcPNA 2 and correcting donor DNA as depicted in FIG. 14.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A nanoparticle comprising
a core comprising poly(lactic acid) (PLA) comprising a number average molecular weight (Mn) of about 12 kDa;
a shell comprising a hyperbranched polyglycerol (HPG) comprising a number average molecular weight (Mn) of about 5 kDa; and
a plurality of a peptide nucleic acid (PNA) oligomer entrapped or encapsulated therein, the PNA oligomer comprising
a Hoogsteen binding peptide nucleic acid segment and a Watson-Crick binding PNA segment collectively totaling no more than 50 nucleobases in length,
wherein the two segments can bind or hybridize to a target region in genomic DNA and induce strand invasion, displacement, and formation of a triple-stranded molecule among the two PNA segments and the target region.

2. The nanoparticle of claim 1, wherein the Hoogsteen binding peptide nucleic acid segment comprises PNA residues comprising the nucleic acid sequence TTJJTJT and the Watson-Crick binding PNA segment comprises PNA residues comprising the nucleic acid sequence TCTCCT-TAAACCTGT (SEQ ID NO: 1), TCTCCT-TAAACCTGTCTT (SEQ ID NO:2), wherein "J" is pseudoisocytosine.

3. The nanoparticle of claim 2, wherein the PNA oligomer comprises the nucleic acid sequence TTJJTJT-linker-TCTCCTTAAACCTGT (SEQ ID NO: 3) or TTJJTJT-linker-TCTCCTTAAACCTGTCTT (SEQ ID NO:4), wherein "linker" is a flexible linker, linking the Hoogsteen binding segment to the Watson-Crick binding segment and "J" is pseudoisocytosine.

4. The nanoparticle of claim 3, wherein the PNA oligomer is free from gamma (γ) modifications in the PNA residues.

5. The nanoparticle of claim 1, wherein one or more of the PNA residues in the Hoogsteen binding segment, the Watson-Crick binding segment, or a combination thereof comprises a substitution at the gamma (γ) position of one or more PNA residues.

6. The nanoparticle of claim 5, wherein the PNA oligomer comprises the nucleic acid sequence lys-lys-lys-TTJJTJT-OOO-T CT Cc TT AA Ac CT GT CT T-lys-lys-lys (SEQ ID NO:5), wherein the bolded and underlined residues are γ modified PNA and "J" is pseudoisocytosine.

7. The nanoparticle of claim 6, wherein the γ modification is serine.

8. The nanoparticle of claim 1, wherein core is poly (lactic acid) (PLA).

9. The nanoparticle of claim 8, wherein the shell comprises a low molecular weight HPG.

10. The nanoparticle of claim 9, wherein the number average molecular weight (Mn) of the PLA is 12.7 kDa, and the number average molecular weight (Mn) of the HPG is 5.4 kDa.

11. The nanoparticle of claim 1, wherein the conjugation ratio is about 1 and is optionally 1.3, the HPG (wt %) is about 40% and is optionally 38%, or a combination thereof.

12. The nanoparticle of claim 11, where the PNA oligomer comprises the nucleic acid sequence lys-lys-lys-TTJJTJT-OOO-TCTCCTTAAACCTGTCTT-lys-lys-lys (SEQ ID NO:5), wherein "J" is pseudoisocytosine.

13. The nanoparticle of claim 12, wherein the PNA oligomer comprises the nucleic acid sequence lys-lys-lys-TTJJTJT-OOO-T CT Cc TT Ac Ac CT GT CT T-lys-lys-lys (SEQ ID NO:5), wherein the bolded and underlined residues are serine γ modified PNA and "J" is pseudoisocytosine.

14. The nanoparticle of claim 1 further comprising a donor oligonucleotide entrapped or encapsulated therein, the donor oligonucleotide comprising a sequence that can correct a mutation(s) in a cell's genome by recombination induced or enhanced by the peptide nucleic acid oligomer.

15. A pharmaceutical composition comprising an effective amount of the nanoparticle of claim 1.

16. The pharmaceutical composition of claim 15, further comprising a potentiating agent to increase the frequency of recombination of the donor oligonucleotide at a target site in the genome of a population of cells.

17. The pharmaceutical composition of claim 16, wherein the potentiating agent is selected from vorinostat, 2,4-Pyridinedicarboxylic Acid, Garcinol, Splitomycin, BML- 210, Apicidin, Suberoyl bis Hydroxamic acid, Scriptaid, Nullscript, 5-Aza-2-deoxycitidine, Zebularine, ITSA1, Phenylbutyrate Na, Tranylcypromine, Valproic acid, EX-527, Resveratrol, M-344, Nicotinamide, BML-266, Piceatannol, AGK2, Salermide, MC-1293, Anacardic acid, B2, BIX-01294, Butyrolactone 3, CTPB, Oxamflatin, Sirtinol, NCH-51, CI-994, NSC-3852, Aminoresveratrol, BML-281, Triacetylresveratrol, Trichostatin A, Iso-Nicotinamide, Valproxam, BML-278, SAHA, Fluoro-SAHA, and Suramin Na.

18. The pharmaceutical composition of claim 16, wherein the PNA oligomer comprises the nucleic acid sequence lys-lys-lys-TTJJTJT-OOO-TCTCCTTAAACCTGTCTT-lys-lys-lys (SEQ ID NO:5), wherein "J" is pseudoisocytosine;
    the number average molecular weight (Mn) of the PLA is about 12 kDa and optionally is 12.7 kDa, and the number average molecular weight (Mn) of the HPG is about 5 kDa, and optionally is 5.4 kDa; and
    the potentiating agent is vorinostat, RI-1, B0-2, or 3E10 antibody or a fragment thereof.

19. The pharmaceutical composition of claim 18, wherein the PNA oligomer comprises the nucleic acid sequence lys-lys-lys-TTJJTJT-OOO-T CT Cc TT Ac Ac CT GT C T T-lys-lys-lys (SEQ ID NO:5), wherein the bolded and underlined residues are serine γ modified PNA and "J" is pseudoisocytosine.

\* \* \* \* \*

SEQUENCE LISTING

<160> NUMBER OF SEQ ID NOS: 30

<210> SEQ ID NO 1
<211> LENGTH: 15
<212> TYPE: DNA
<213> ORGANISM: Artificial Sequence
<220> FEATURE:
<223> OTHER INFORMATION: synthetic polynucleotide

<400> SEQUENCE: 1
tctccttaaa cctgt                                                    15

<210> SEQ ID NO 2
<211> LENGTH: 18
<212> TYPE: DNA
<213> ORGANISM: Artificial Sequence
<220> FEATURE:
<223> OTHER INFORMATION: synthetic polynucleotide

<400> SEQUENCE: 2
tctccttaaa cctgtctt                                                 18

<210> SEQ ID NO 3
<211> LENGTH: 22
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (3)..(4)
<223> OTHER INFORMATION: n = pseudoisocytosine
<220> FEATURE:
<221> NAME/KEY: misc_feature
<222> LOCATION: (6)..(6)
<223> OTHER INFORMATION: n = pseudoisocytosine
<220> FEATURE:
<221> NAME/KEY: misc_feature
<222> LOCATION: (7)..(8)
<223> OTHER INFORMATION: linked by a linker

<400> SEQUENCE: 3
ttnntnttct ccttaaacct gt                                            22

<210> SEQ ID NO 4
<211> LENGTH: 25
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (3)..(4)
<223> OTHER INFORMATION: n = pseudoisocytosine
<220> FEATURE:
<221> NAME/KEY: misc_feature
<222> LOCATION: (6)..(6)
<223> OTHER INFORMATION: n = pseudoisocytosine
<220> FEATURE:
<221> NAME/KEY: misc_feature
<222> LOCATION: (7)..(8)
<223> OTHER INFORMATION: linked by a linker

<400> SEQUENCE: 4
ttnntnttct ccttaaacct gtctt                                         25

<210> SEQ ID NO 5
<211> LENGTH: 25
<212> TYPE: DNA
<213> ORGANISM: Artificial Sequence

```
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (3)..(4)
<223> OTHER INFORMATION: n = pseudoisocytosine
<220> FEATURE:
<221> NAME/KEY: misc_feature
<222> LOCATION: (6)..(6)
<223> OTHER INFORMATION: n = pseudoisocytosine
<220> FEATURE:
<221> NAME/KEY: misc_feature
<222> LOCATION: (7)..(8)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (25)..(25)
<223> OTHER INFORMATION: lysine-lysine-lysine

<400> SEQUENCE: 5
ttnntnttct ccttaaacct gtctt                                             25

<210> SEQ ID NO 6
<211> LENGTH: 22
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (3)..(4)
<223> OTHER INFORMATION: n = pseudoisocytosine
<220> FEATURE:
<221> NAME/KEY: misc_feature
<222> LOCATION: (6)..(6)
<223> OTHER INFORMATION: n = pseudoisocytosine
<220> FEATURE:
<221> NAME/KEY: misc_feature
<222> LOCATION: (7)..(8)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (22)..(22)
<223> OTHER INFORMATION: lysine-lysine-lysine

<400> SEQUENCE: 6
ttnntnttct ccttaaacct gt                                                22

<210> SEQ ID NO 7
<211> LENGTH: 15
<212> TYPE: DNA
<213> ORGANISM: Artificial Sequence
<220> FEATURE:
<223> OTHER INFORMATION: synthetic polynucleotide

<400> SEQUENCE: 7
cttctccaca ggagt                                                        15

<210> SEQ ID NO 8
<211> LENGTH: 18
<212> TYPE: DNA
```

<213> ORGANISM: Artificial Sequence
<220> FEATURE:
<223> OTHER INFORMATION: synthetic polynucleotide

<400> SEQUENCE: 8
cttctccaca ggagtcag                                                    18

<210> SEQ ID NO 9
<211> LENGTH: 22
<212> TYPE: DNA
<213> ORGANISM: Artificial Sequence
<220> FEATURE:
<223> OTHER INFORMATION: synthetic polynucleotide

<400> SEQUENCE: 9
cttctccaca ggagtcaggt gc                                               22

<210> SEQ ID NO 10
<211> LENGTH: 22
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (7)..(8)
<223> OTHER INFORMATION: linked by a linker

<400> SEQUENCE: 10
nntnttnctt ctccacagga gt                                               22

<210> SEQ ID NO 11
<211> LENGTH: 25
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (7)..(8)
<223> OTHER INFORMATION: linked by a linker

<400> SEQUENCE: 11
nntnttnctt ctccacagga gtcag                                            25

<210> SEQ ID NO 12
<211> LENGTH: 29

```
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (7)..(8)
<223> OTHER INFORMATION: linked by a linker

<400> SEQUENCE: 12
nntnttnctt ctccacagga gtcaggtgc                                    29

<210> SEQ ID NO 13
<211> LENGTH: 22
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (1)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (7)..(8)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (22)..(22)
<223> OTHER INFORMATION: lysine-lysine-lysine

<400> SEQUENCE: 13
nntnttnctt ctccacagga gt                                           22

<210> SEQ ID NO 14
<211> LENGTH: 25
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (1)..(2)
<223> OTHER INFORMATION: n = pseudoisocytosine
<220> FEATURE:
```

```
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (7)..(8)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (25)..(25)
<223> OTHER INFORMATION: lysine-lysine-lysine

<400> SEQUENCE: 14 nntnttncttctccacaggagtcag                                          25

<210> SEQ ID NO 15
<211> LENGTH: 29
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (1)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (7)..(8)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (29)..(29)
<223> OTHER INFORMATION: lysine-lysine-lysine

<400> SEQUENCE: 15 nntnttncttctccacaggagtcaggtgc                                      29

<210> SEQ ID NO 16
<211> LENGTH: 16
<212> TYPE: DNA
<213> ORGANISM: Artificial Sequence
<220> FEATURE:
<223> OTHER INFORMATION: synthetic polynucleotide

<400> SEQUENCE: 16 tcttctctgtctccac                                                   16

<210> SEQ ID NO 17
<211> LENGTH: 18
<212> TYPE: DNA
<213> ORGANISM: Artificial Sequence
<220> FEATURE:
<223> OTHER INFORMATION: synthetic polynucleotide
```

```
<400> SEQUENCE: 17
tcttctctgt ctccacat                                                   18

<210> SEQ ID NO 18
<211> LENGTH: 24
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (2)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (8)..(9)
<223> OTHER INFORMATION: linked by a linker

<400> SEQUENCE: 18
tntnttnttc ttctctgtct ccac                                            24

<210> SEQ ID NO 19
<211> LENGTH: 26
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (2)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (8)..(9)
<223> OTHER INFORMATION: linked by a linker

<400> SEQUENCE: 19
tntnttnttc ttctctgtct ccacat                                          26

<210> SEQ ID NO 20
<211> LENGTH: 24
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (2)..(2)
<223> OTHER INFORMATION: n = pseudoisocytosine
<220> FEATURE:
<221> NAME/KEY: misc_feature
<222> LOCATION: (4)..(4)
```

```
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (8)..(9)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (24)..(24)
<223> OTHER INFORMATION: lysine-lysine-lysine

<400> SEQUENCE: 20
tntnttnttc ttctctgtct ccac                                           24

<210> SEQ ID NO 21
<211> LENGTH: 26
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(1)
<223> OTHER INFORMATION: lysine-lysine-lysine
<220> FEATURE:
<221> NAME/KEY: misc_feature
<222> LOCATION: (2)..(2)
<223> OTHER INFORMATION: n = pseudoisocytosine
<220> FEATURE:
<221> NAME/KEY: misc_feature
<222> LOCATION: (4)..(4)
<223> OTHER INFORMATION: n = pseudoisocytosine
<220> FEATURE:
<221> NAME/KEY: misc_feature
<222> LOCATION: (7)..(7)
<223> OTHER INFORMATION: n = pseudoisocytosine
<220> FEATURE:
<221> NAME/KEY: misc_feature
<222> LOCATION: (8)..(9)
<223> OTHER INFORMATION: linked by three 8-amino-3,6-dioxaoctanoic acid,
      6-aminohexanoic acid, or 8-amino-2, 6, 10-trioxaoctanoic acid
      moieties
<220> FEATURE:
<221> NAME/KEY: misc_feature
<222> LOCATION: (26)..(26)
<223> OTHER INFORMATION: lysine-lysine-lysine

<400> SEQUENCE: 21
tntnttnttc ttctctgtct ccacat                                         26

<210> SEQ ID NO 22
<211> LENGTH: 65
<212> TYPE: DNA
<213> ORGANISM: Artificial Sequence
<220> FEATURE:
<223> OTHER INFORMATION: synthetic polynucleotide

<400> SEQUENCE: 22
ttgccccaca gggcagtaac ggcagacttc tcctcaggag tcaggtgcac catggtgtct    60
gtttg                                                                65

<210> SEQ ID NO 23
<211> LENGTH: 51
<212> TYPE: DNA
<213> ORGANISM: Artificial Sequence
<220> FEATURE:
<223> OTHER INFORMATION: synthetic polynucleotide
```

```
<400> SEQUENCE: 23
acagacacca tggtgcacct gactcctgag gagaagtctg ccgttactgc c        51

<210> SEQ ID NO 24
<211> LENGTH: 70
<212> TYPE: DNA
<213> ORGANISM: Artificial Sequence
<220> FEATURE:
<223> OTHER INFORMATION: synthetic polynucleotide

<400> SEQUENCE: 24
cttgccccac agggcagtaa cggcagattt ttcttccggc gttaaatgca ccatggtgtc    60
tgtttgaggt                                                          70

<210> SEQ ID NO 25
<211> LENGTH: 11
<212> TYPE: PRT
<213> ORGANISM: Artificial Sequence
<220> FEATURE:
<223> OTHER INFORMATION: synthetic polypeptide

<400> SEQUENCE: 25

Tyr Gly Arg Lys Lys Arg Arg Gln Arg Arg Arg
1               5                   10

<210> SEQ ID NO 26
<211> LENGTH: 9
<212> TYPE: PRT
<213> ORGANISM: Artificial Sequence
<220> FEATURE:
<223> OTHER INFORMATION: synthetic polypeptide

<400> SEQUENCE: 26

Arg Lys Lys Arg Arg Gln Arg Arg Arg
1               5

<210> SEQ ID NO 27
<211> LENGTH: 16
<212> TYPE: PRT
<213> ORGANISM: Artificial Sequence
<220> FEATURE:
<223> OTHER INFORMATION: synthetic polypeptide

<400> SEQUENCE: 27

Arg Gln Ile Lys Ile Trp Phe Gln Asn Arg Arg Met Lys Trp Lys Lys
1               5                   10                  15

<210> SEQ ID NO 28
<211> LENGTH: 19
<212> TYPE: PRT
<213> ORGANISM: Artificial Sequence
<220> FEATURE:
<223> OTHER INFORMATION: synthetic polypeptide

<400> SEQUENCE: 28

His His His His Arg Lys Lys Arg Arg Gln Arg Arg Arg His His
1               5                   10                  15

His His His

<210> SEQ ID NO 29
<211> LENGTH: 30
<212> TYPE: PRT
<213> ORGANISM: Artificial Sequence
<220> FEATURE:
```

-continued

```
<223> OTHER INFORMATION: synthetic polypeptide

<400> SEQUENCE: 29

Met Val Lys Ser Lys Ile Gly Ser Trp Ile Leu Val Leu Phe Val Ala
1               5                   10                  15

Met Trp Ser Asp Val Gly Leu Cys Lys Lys Arg Pro Lys Pro
            20                  25                  30

<210> SEQ ID NO 30
<211> LENGTH: 27
<212> TYPE: PRT
<213> ORGANISM: Artificial Sequence
<220> FEATURE:
<223> OTHER INFORMATION: synthetic polypeptide

<400> SEQUENCE: 30

Gly Ala Leu Phe Leu Gly Phe Leu Gly Ala Ala Gly Ser Thr Met Gly
1               5                   10                  15

Ala Trp Ser Gln Pro Lys Lys Lys Arg Lys Val
            20                  25
```